(12) United States Patent
Hendricks

(10) Patent No.: US 7,716,349 B1
(45) Date of Patent: May 11, 2010

(54) ELECTRONIC BOOK LIBRARY/BOOKSTORE SYSTEM

(75) Inventor: John S. Hendricks, Potomac, MD (US)

(73) Assignee: Discovery Communications, Inc., Bethesda, MD (US)

(*) Notice: Subject to any disclaimer, the term of this patent is extended or adjusted under 35 U.S.C. 154(b) by 1247 days.

(21) Appl. No.: 09/722,742

(22) Filed: Nov. 28, 2000

Related U.S. Application Data

(60) Continuation of application No. 09/237,825, filed on Jan. 27, 1999, now abandoned, which is a division of application No. 08/336,247, filed on Nov. 7, 1994, now Pat. No. 5,986,690, which is a continuation-in-part of application No. 07/991,074, filed on Dec. 9, 1992, and a continuation-in-part of application No. 08/160,194, filed on Dec. 2, 1993, now Pat. No. 5,990,927.

(51) Int. Cl.
    *G06F 15/16* (2006.01)
(52) U.S. Cl. ........................... 709/229; 709/219
(58) Field of Classification Search ............ 709/203, 709/217, 219, 232, 229, 212, 216, 226; 715/513, 715/528; 345/751, 776, 744, 745, 901
    See application file for complete search history.

(56) References Cited

U.S. PATENT DOCUMENTS

| 3,860,873 A | 1/1975 | Ringstad |
| 3,891,792 A | 6/1975 | Kimura ....................... 348/622 |
| 3,978,470 A | 8/1976 | McGuire |

(Continued)

FOREIGN PATENT DOCUMENTS

| CA | 2044574 | 12/1992 |

(Continued)

OTHER PUBLICATIONS

Rawlins, "The New Publishing—Technology's impact on the publishing industry over the next decade", Nov. 12, 1991, pp. 1-65.*

(Continued)

*Primary Examiner*—Yemane Mesfin
(74) *Attorney, Agent, or Firm*—Arent Fox LLP

(57) ABSTRACT

The invention, an electronic book selection and delivery system, is a new way to distribute books and other textual information to bookstores, libraries and consumers. The primary components of the system are a subsystem for placing text in a video signal format and a subsystem for receiving and selecting text that is placed in the video signal format. The system configuration for consumer use contains additional components and optional features that enhance the system, namely: (1) an operations center, (2) a video distribution system, (3) a home subsystem, including reception, selection, viewing, transacting and transmission capabilities, and (4) a billing and collection system. The operations center and/or video distribution points perform the functions of manipulation of text data, security and coding of text, cataloging of books, messaging center, and uplink functions. The electronic books may be provided to an intermediate point such as a library or a bookstore. From the library or bookstore, electronic books may be provided to consumers for viewing on the home subsystem. The library may store electronic books for lending on a file server. The library may incorporate security features to prevent unauthorized copying of the electronic books, such as including a time out feature that disables the electronic book after a specified period.

12 Claims, 40 Drawing Sheets

U.S. PATENT DOCUMENTS

| | | | |
|---|---|---|---|
| 4,023,408 A * | 5/1977 | Ryan et al. ............... 73/170.24 |
| 4,071,697 A | 1/1978 | Bushnell et al. |
| 4,159,417 A | 6/1979 | Rubincam |
| 4,160,242 A | 7/1979 | Fowler |
| 4,179,212 A | 12/1979 | Lahr |
| 4,197,590 A | 4/1980 | Sukomich et al. ........... 345/781 |
| 4,272,819 A | 6/1981 | Katsumata et al. |
| 4,298,793 A | 11/1981 | Melis et al. |
| 4,302,193 A | 11/1981 | Haynes |
| 4,361,848 A | 11/1982 | Poigner et al. .............. 348/468 |
| 4,381,522 A | 4/1983 | Lambert |
| 4,398,216 A | 8/1983 | Field et al. |
| 4,405,829 A | 9/1983 | Rivest et al. |
| 4,406,626 A | 9/1983 | Anderson et al. |
| 4,429,385 A | 1/1984 | Cichelli et al. |
| 4,455,570 A | 6/1984 | Saeki et al. |
| 4,484,217 A | 11/1984 | Block et al. |
| 4,488,179 A | 12/1984 | Kruger et al. |
| 4,513,390 A | 4/1985 | Walter et al. |
| 4,517,598 A | 5/1985 | Van Vaulkenburg ......... 348/478 |
| 4,528,589 A | 7/1985 | Block et al. |
| 4,528,643 A | 7/1985 | Freeny, Jr. |
| 4,532,540 A | 7/1985 | Wine |
| 4,533,948 A | 8/1985 | McNamara et al. |
| 4,546,382 A | 10/1985 | McKenna et al. |
| 4,567,512 A | 1/1986 | Abraham |
| 4,578,531 A | 3/1986 | Everhart et al. |
| 4,579,533 A | 4/1986 | Anderson et al. |
| 4,587,520 A | 5/1986 | Astle .......................... 345/160 |
| 4,602,279 A | 7/1986 | Freeman |
| 4,605,964 A | 8/1986 | Chard ......................... 725/28 |
| 4,616,263 A | 10/1986 | Eichelberger |
| 4,621,282 A | 11/1986 | Ahern |
| 4,625,076 A | 11/1986 | Okamoto et al. |
| 4,625,235 A | 11/1986 | Watson |
| 4,633,462 A | 12/1986 | Stifle et al. |
| 4,639,225 A | 1/1987 | Washizuka .................. 434/208 |
| 4,644,470 A | 2/1987 | Feigenbaum et al. |
| 4,653,100 A | 3/1987 | Barnett et al. |
| 4,668,218 A | 5/1987 | Virtanen |
| 4,673,976 A | 6/1987 | Wreford-Howard |
| 4,688,218 A | 8/1987 | Blineau et al. .............. 370/513 |
| 4,688,246 A | 8/1987 | Eilers et al. |
| 4,694,483 A | 9/1987 | Cheung |
| 4,694,490 A | 9/1987 | Harvey et al. |
| 4,697,209 A | 9/1987 | Kiewit et al. |
| 4,706,121 A | 11/1987 | Young |
| 4,712,105 A | 12/1987 | Kohler |
| 4,712,130 A | 12/1987 | Casey |
| 4,724,491 A | 2/1988 | Lambert |
| 4,731,840 A | 3/1988 | Mniszewski et al. |
| 4,739,510 A | 4/1988 | Jeffers et al. |
| 4,751,578 A | 6/1988 | Reiter et al. |
| 4,768,087 A | 8/1988 | Taub et al. |
| 4,774,655 A | 9/1988 | Kollin et al. |
| 4,776,011 A | 10/1988 | Busby |
| 4,792,972 A | 12/1988 | Cook, Jr. |
| 4,796,220 A | 1/1989 | Wolfe |
| 4,805,014 A | 2/1989 | Sahara et al. |
| 4,816,901 A | 3/1989 | Music et al. |
| 4,816,904 A | 3/1989 | McKenna et al. |
| 4,820,167 A | 4/1989 | Nobles et al. |
| D301,037 S | 5/1989 | Matsuda |
| 4,829,372 A | 5/1989 | McCalley et al. |
| 4,829,558 A | 5/1989 | Welsh |
| 4,829,569 A | 5/1989 | Seth-Smith et al. ......... 380/234 |
| 4,835,607 A | 5/1989 | Keith |
| 4,854,878 A | 8/1989 | Malvino |
| 4,855,725 A | 8/1989 | Fernandez .................. 345/175 |
| 4,860,379 A | 8/1989 | Schoeneberger et al. |
| 4,866,770 A | 9/1989 | Seth-Smith |
| 4,876,736 A | 10/1989 | Kiewit |
| 4,885,803 A | 12/1989 | Hermann et al. |
| 4,890,319 A | 12/1989 | Seth-Smith et al. |
| 4,890,321 A | 12/1989 | Seth-Smith |
| 4,891,838 A | 1/1990 | Faber |
| 4,899,292 A | 2/1990 | Montagna |
| 4,920,432 A | 4/1990 | Eggers et al. .................. 386/96 |
| 4,924,513 A | 5/1990 | Herbison et al. |
| 4,928,168 A | 5/1990 | Iwashita |
| 4,928,177 A | 5/1990 | Martinez |
| 4,930,160 A | 5/1990 | Vogel |
| 4,941,089 A | 7/1990 | Fischer |
| 4,941,125 A | 7/1990 | Boyne |
| 4,947,244 A | 8/1990 | Fenwick et al. |
| 4,947,429 A | 8/1990 | Bestler et al. |
| 4,949,187 A | 8/1990 | Cohen |
| 4,959,810 A | 9/1990 | Darbee et al. |
| 4,961,109 A | 10/1990 | Tanaka |
| 4,965,819 A | 10/1990 | Kannes |
| 4,965,825 A | 10/1990 | Harvey et al. |
| 4,975,951 A | 12/1990 | Bennett |
| 4,977,455 A | 12/1990 | Young |
| 4,982,344 A | 1/1991 | Jordan |
| 4,985,697 A | 1/1991 | Boulton ................... 707/500.1 |
| D314,383 S | 2/1991 | Hafner |
| 4,995,078 A | 2/1991 | Monslow et al. |
| 4,996,597 A | 2/1991 | Duffield |
| 5,001,554 A | 3/1991 | Johnson et al. |
| 5,003,384 A | 3/1991 | Durden et al. |
| 5,003,591 A | 3/1991 | Kauffman et al. |
| 5,010,499 A | 4/1991 | Yee |
| 5,014,125 A | 5/1991 | Pocock et al. |
| 5,015,829 A | 5/1991 | Eilert et al. |
| 5,020,129 A | 5/1991 | Martin et al. |
| 5,027,400 A | 6/1991 | Baji et al. |
| 5,036,394 A | 7/1991 | Morii et al. .................. 348/468 |
| 5,036,537 A | 7/1991 | Jeffers et al. |
| 5,038,402 A | 8/1991 | Robbins |
| 5,046,093 A | 9/1991 | Wachob |
| 5,047,867 A | 9/1991 | Strubbe et al. |
| 5,049,862 A | 9/1991 | Dao |
| 5,049,990 A | 9/1991 | Kondo et al. |
| 5,054,984 A | 10/1991 | Chan et al. |
| 5,056,138 A | 10/1991 | Tyson, Sr. |
| 5,057,917 A | 10/1991 | Shalkauser et al. |
| 5,073,930 A | 12/1991 | Green et al. |
| 5,075,771 A | 12/1991 | Hashimoto |
| 5,077,607 A | 12/1991 | Johnson et al. |
| 5,078,019 A | 1/1992 | Aoki |
| 5,089,956 A | 2/1992 | MacPhail |
| 5,091,782 A | 2/1992 | Krause et al. |
| 5,093,718 A | 3/1992 | Hoarty et al. |
| 5,099,319 A | 3/1992 | Esch et al. |
| 5,099,331 A | 3/1992 | Truong |
| D325,581 S | 4/1992 | Schwartz |
| 5,103,314 A | 4/1992 | Keenan |
| 5,105,268 A | 4/1992 | Yamanouchi et al. |
| D326,446 S | 5/1992 | Wong |
| 5,115,426 A | 5/1992 | Spanke |
| 5,121,476 A | 6/1992 | Yee |
| 5,124,980 A | 6/1992 | Maki |
| 5,128,662 A | 7/1992 | Failla |
| 5,130,792 A | 7/1992 | Tindell et al. |
| 5,130,924 A | 7/1992 | Barker et al. |
| 5,132,789 A | 7/1992 | Ammon et al. ............. 725/146 |
| 5,132,992 A | 7/1992 | Yurt et al. |
| 5,133,079 A | 7/1992 | Ballantyne et al. |
| 5,140,419 A | 8/1992 | Galumbeck et al. |
| D329,238 S | 9/1992 | Grasso et al. |
| 5,144,663 A | 9/1992 | Kudelski et al. |
| 5,144,665 A | 9/1992 | Takaragi et al. |
| 5,146,552 A | 9/1992 | Cassorla et al. |
| 5,146,600 A * | 9/1992 | Sugiura ................... 707/104.1 |

| Patent | Type | Date | Inventor |
|---|---|---|---|
| 5,148,957 | A | 9/1992 | Searle |
| 5,150,118 | A | 9/1992 | Finkle et al. |
| 5,151,782 | A | 9/1992 | Ferraro |
| 5,151,789 | A | 9/1992 | Young |
| 5,152,011 | A | 9/1992 | Schwob |
| 5,155,591 | A | 10/1992 | Wachob |
| 5,157,783 | A | 10/1992 | Anderson |
| 5,159,452 | A | 10/1992 | Kinoshita et al. |
| 5,159,669 | A | 10/1992 | Trigg et al. |
| 5,166,886 | A | 11/1992 | Molnar et al. |
| D331,760 | S | 12/1992 | Renk, Jr. |
| 5,172,413 | A | 12/1992 | Bradley et al. |
| 5,173,051 | A | 12/1992 | May et al. |
| 5,182,639 | A | 1/1993 | Jutamulia et al. |
| 5,185,667 | A | 2/1993 | Zimmermann |
| 5,199,104 | A | 3/1993 | Hirayama |
| 5,202,817 | A | 4/1993 | Koenck et al. |
| 5,204,947 | A | 4/1993 | Bernstein et al. |
| 5,206,722 | A | 4/1993 | Kwan |
| 5,206,929 | A | 4/1993 | Langford et al. |
| 5,206,954 | A | 4/1993 | Inoue et al. |
| 5,208,665 | A | 5/1993 | McCalley et al. |
| 5,208,745 | A | 5/1993 | Quentin et al. |
| 5,210,611 | A | 5/1993 | Yee et al. |
| 5,212,553 | A | 5/1993 | Maruoka |
| 5,216,515 | A | 6/1993 | Steele et al. ............... 386/55 |
| 5,220,438 | A * | 6/1993 | Yamamoto ............... 358/404 |
| 5,220,649 | A | 6/1993 | Forcier |
| 5,221,962 | A | 6/1993 | Backus et al. |
| 5,222,136 | A | 6/1993 | Rasmussen et al. |
| 5,223,924 | A | 6/1993 | Strubbe |
| 5,231,631 | A | 7/1993 | Buhrke |
| 5,233,333 | A | 8/1993 | Borsuk |
| 5,235,419 | A | 8/1993 | Krause |
| 5,235,619 | A | 8/1993 | Beyers et al. |
| 5,235,680 | A | 8/1993 | Bijnagte |
| 5,237,311 | A | 8/1993 | Mailey et al. |
| 5,237,610 | A | 8/1993 | Gammie et al. |
| 5,237,614 | A * | 8/1993 | Weiss ............... 713/159 |
| 5,239,665 | A * | 8/1993 | Tsuchiya ............... 345/776 |
| 5,241,671 | A | 8/1993 | Reed et al. |
| 5,247,347 | A | 9/1993 | Litteral et al. |
| 5,247,575 | A | 9/1993 | Sprague et al. |
| 5,251,324 | A | 10/1993 | McMullan |
| 5,253,066 | A | 10/1993 | Vogel |
| 5,253,275 | A | 10/1993 | Yurt et al. |
| 5,253,341 | A | 10/1993 | Rozmanith et al. |
| 5,256,067 | A | 10/1993 | Gildea |
| 5,257,185 | A | 10/1993 | Farley et al. |
| 5,260,778 | A | 11/1993 | Kauffman et al. ............... 725/33 |
| 5,260,788 | A | 11/1993 | Takano et al. |
| 5,262,875 | A | 11/1993 | Mincer |
| 5,282,028 | A | 1/1994 | Johnson et al. |
| 5,283,639 | A | 2/1994 | Esch et al. |
| 5,285,272 | A | 2/1994 | Bradley et al. |
| 5,289,271 | A | 2/1994 | Watson |
| 5,289,288 | A | 2/1994 | Silverman et al. |
| 5,291,554 | A | 3/1994 | Morales |
| 5,293,540 | A | 3/1994 | Trani et al. |
| 5,293,633 | A | 3/1994 | Robbins |
| 5,301,172 | A | 4/1994 | Richards et al. |
| D346,620 | S | 5/1994 | McSorley |
| 5,315,711 | A | 5/1994 | Barone et al. |
| 5,318,450 | A | 6/1994 | Carver |
| 5,319,454 | A | 6/1994 | Schutte |
| 5,319,455 | A | 6/1994 | Hoarty et al. |
| 5,319,542 | A | 6/1994 | King et al. |
| 5,319,649 | A | 6/1994 | Raghavan et al. |
| 5,319,707 | A | 6/1994 | Wasilewski et al. |
| 5,321,846 | A | 6/1994 | Yokota et al. |
| 5,323,240 | A | 6/1994 | Amano et al. |
| 5,327,554 | A | 7/1994 | Palazzi, III et al. |
| 5,329,590 | A | 7/1994 | Pond |
| D349,923 | S | 8/1994 | Billings et al. |
| 5,339,091 | A | 8/1994 | Yamazaki et al. |
| 5,339,239 | A | 8/1994 | Manake ............... 708/1 |
| 5,339,315 | A | 8/1994 | Maeda et al. |
| 5,341,166 | A | 8/1994 | Garr et al. |
| 5,341,425 | A | 8/1994 | Wasilewski et al. |
| 5,341,426 | A | 8/1994 | Barney et al. |
| 5,341,474 | A | 8/1994 | Gelman et al. |
| 5,343,239 | A | 8/1994 | Lappington et al. |
| 5,343,516 | A | 8/1994 | Callele et al. |
| 5,345,580 | A | 9/1994 | Tamaru et al. |
| 5,345,594 | A | 9/1994 | Tsuda |
| 5,349,638 | A | 9/1994 | Pitroda et al. |
| 5,351,075 | A | 9/1994 | Herz et al. |
| 5,353,121 | A | 10/1994 | Young et al. |
| 5,355,162 | A | 10/1994 | Yazolino et al. |
| 5,357,276 | A | 10/1994 | Banker et al. |
| 5,365,265 | A | 11/1994 | Shibata et al. |
| 5,365,434 | A | 11/1994 | Figliuzzi |
| 5,367,330 | A | 11/1994 | Haave et al. |
| 5,367,571 | A | 11/1994 | Bowen et al. |
| 5,367,621 | A | 11/1994 | Cohen et al. |
| 5,367,643 | A | 11/1994 | Chang et al. |
| 5,371,532 | A | 12/1994 | Gelman et al. |
| 5,373,324 | A | 12/1994 | Kuroda et al. |
| 5,375,068 | A | 12/1994 | Palmer et al. |
| 5,375,160 | A | 12/1994 | Guidon et al. |
| 5,379,057 | A | 1/1995 | Clough et al. |
| 5,383,112 | A | 1/1995 | Clark |
| 5,384,588 | A | 1/1995 | Martin et al. |
| 5,388,101 | A | 2/1995 | Dinkins |
| 5,388,196 | A * | 2/1995 | Pajak et al. ............... 345/751 |
| 5,390,348 | A | 2/1995 | Magin et al. |
| 5,392,387 | A | 2/1995 | Fitzpatrick et al. |
| 5,396,546 | A | 3/1995 | Remillard |
| 5,400,401 | A | 3/1995 | Wasilewski et al. |
| 5,404,393 | A | 4/1995 | Remillard |
| 5,404,505 | A | 4/1995 | Levinson |
| 5,408,258 | A | 4/1995 | Kolessar |
| 5,408,465 | A | 4/1995 | Gusella et al. |
| 5,410,326 | A | 4/1995 | Goldstein |
| 5,410,344 | A | 4/1995 | Graves et al. |
| 5,412,416 | A | 5/1995 | Nemirofsky |
| 5,414,426 | A | 5/1995 | O'Donnell et al. |
| 5,416,508 | A | 5/1995 | Sakuma et al. |
| 5,417,575 | A | 5/1995 | McTaggart |
| 5,418,559 | A | 5/1995 | Blahut |
| 5,418,957 | A | 5/1995 | Narayan |
| 5,420,974 | A | 5/1995 | Morris et al. |
| 5,424,770 | A | 6/1995 | Schmelzer et al. |
| 5,425,102 | A | 6/1995 | Moy |
| 5,426,594 | A | 6/1995 | Wright et al. |
| 5,428,529 | A | 6/1995 | Hartrick et al. |
| 5,432,542 | A | 7/1995 | Thibadeau et al. |
| 5,432,561 | A | 7/1995 | Strubbe |
| 5,437,552 | A | 8/1995 | Baer et al. |
| 5,438,372 | A | 8/1995 | Tsumori et al. |
| 5,440,632 | A | 8/1995 | Bacon et al. |
| 5,442,626 | A | 8/1995 | Wei |
| 5,444,853 | A | 8/1995 | Lentz |
| 5,446,488 | A | 8/1995 | Vogel |
| 5,446,490 | A | 8/1995 | Blahut et al. ............... 725/97 |
| 5,446,919 | A | 8/1995 | Wilkins |
| D362,429 | S * | 9/1995 | Lande et al. ............... D14/364 |
| 5,453,796 | A | 9/1995 | Duffield et al. |
| 5,461,667 | A | 10/1995 | Remillard |
| 5,465,213 | A | 11/1995 | Ross |
| 5,465,401 | A | 11/1995 | Thompson |
| 5,466,158 | A | 11/1995 | Smith, III |
| 5,467,102 | A | 11/1995 | Kuno et al. |
| 5,469,206 | A | 11/1995 | Strubbe et al. |
| 5,473,362 | A | 12/1995 | Fitzgerald et al. |
| 5,475,398 | A | 12/1995 | Yamazaki et al. |

| Patent No. | Date | Inventor(s) | Ref |
|---|---|---|---|
| 5,475,399 A | 12/1995 | Borsuk | |
| 5,475,585 A | 12/1995 | Bush | |
| 5,475,682 A | 12/1995 | Choudhury et al. | |
| 5,477,262 A | 12/1995 | Banker et al. | |
| 5,477,263 A | 12/1995 | O'Callaghan et al. | |
| 5,479,268 A | 12/1995 | Young | |
| 5,479,508 A | 12/1995 | Bestler et al. | |
| 5,479,615 A | 12/1995 | Ishii et al. | |
| 5,481,294 A | 1/1996 | Thomas et al. | |
| 5,481,296 A | 1/1996 | Cragun et al. | |
| 5,481,542 A | 1/1996 | Logston | |
| 5,483,278 A | 1/1996 | Strubbe et al. | |
| 5,484,292 A | 1/1996 | McTaggart | |
| 5,485,176 A | 1/1996 | Ohara et al. | |
| 5,485,221 A | 1/1996 | Banker et al. | |
| 5,486,686 A * | 1/1996 | Zdybel et al. | 235/375 |
| 5,495,581 A | 2/1996 | Tsai | |
| 5,497,187 A | 3/1996 | Banker et al. | |
| 5,497,459 A | 3/1996 | Tanihira et al. | |
| 5,499,330 A | 3/1996 | Lucas et al. | |
| 5,500,794 A | 3/1996 | Fujita et al. | |
| 5,502,576 A * | 3/1996 | Ramsay et al. | 358/444 |
| 5,506,902 A | 4/1996 | Kubota | |
| 5,509,074 A | 4/1996 | Choudhury et al. | |
| 5,512,934 A | 4/1996 | Kochanski | |
| 5,515,098 A | 5/1996 | Carles | |
| 5,517,254 A | 5/1996 | Monta et al. | |
| 5,521,631 A | 5/1996 | Budow et al. | |
| 5,524,193 A | 6/1996 | Covington et al. | |
| 5,524,201 A * | 6/1996 | Shwarts et al. | 715/763 |
| 5,526,035 A | 6/1996 | Lappington et al. | |
| 5,526,469 A | 6/1996 | Brindle et al. | |
| 5,528,281 A | 6/1996 | Grady et al. | |
| 5,528,490 A | 6/1996 | Hill | |
| 5,532,920 A * | 7/1996 | Hartrick et al. | 715/500 |
| 5,534,888 A * | 7/1996 | Lebby et al. | 345/672 |
| 5,544,320 A | 8/1996 | Konrad | |
| 5,544,342 A | 8/1996 | Dean | |
| 5,550,863 A | 8/1996 | Yurt et al. | |
| 5,553,216 A | 9/1996 | Yoshioka et al. | |
| 5,555,441 A | 9/1996 | Haddad | |
| 5,557,722 A | 9/1996 | DeRose et al. | |
| 5,557,744 A | 9/1996 | Kobayakawa et al. | |
| 5,561,708 A | 10/1996 | Remillard | |
| 5,561,803 A | 10/1996 | Kilis | |
| 5,565,908 A | 10/1996 | Ahmad | |
| 5,565,999 A * | 10/1996 | Takahashi | 358/406 |
| 5,570,126 A | 10/1996 | Blahut et al. | |
| 5,572,625 A | 11/1996 | Raman et al. | |
| 5,579,055 A | 11/1996 | Hamilton et al. | |
| 5,579,057 A | 11/1996 | Banker et al. | |
| 5,581,560 A | 12/1996 | Shimada et al. | |
| 5,581,686 A | 12/1996 | Koppolu et al. | |
| 5,585,858 A | 12/1996 | Harper et al. | |
| 5,586,235 A | 12/1996 | Kauffman | |
| 5,587,724 A | 12/1996 | Matsuda | |
| 5,598,209 A | 1/1997 | Cortjens et al. | |
| 5,598,279 A | 1/1997 | Ishii et al. | |
| 5,598,351 A | 1/1997 | Chater et al. | |
| 5,598,523 A | 1/1997 | Fujita | |
| 5,600,368 A | 2/1997 | Matthews, III | |
| 5,600,573 A | 2/1997 | Hendricks et al. | |
| 5,602,596 A | 2/1997 | Claussen et al. | |
| 5,604,824 A | 2/1997 | Chui et al. | |
| 5,608,449 A | 3/1997 | Swafford et al. | |
| 5,613,109 A | 3/1997 | Yamauchi et al. | |
| 5,621,456 A | 4/1997 | Florin et al. | |
| 5,621,658 A * | 4/1997 | Jackson et al. | 704/275 |
| 5,624,265 A | 4/1997 | Redford et al. | |
| 5,625,833 A | 4/1997 | Levine et al. | |
| 5,630,103 A | 5/1997 | Smith et al. | |
| 5,630,125 A | 5/1997 | Zellweger | |
| 5,631,693 A | 5/1997 | Wunderlich et al. | |
| 5,632,022 A | 5/1997 | Warren et al. | |
| 5,634,064 A * | 5/1997 | Warnock et al. | 715/513 |
| 5,635,918 A | 6/1997 | Tett | |
| 5,636,036 A | 6/1997 | Ashbey | |
| 5,640,193 A | 6/1997 | Wellner | |
| 5,640,196 A | 6/1997 | Behrens et al. | |
| 5,644,354 A | 7/1997 | Thompson et al. | |
| 5,646,675 A | 7/1997 | Copriviza et al. | |
| 5,649,230 A | 7/1997 | Lentz | |
| 5,657,414 A | 8/1997 | Lett et al. | |
| 5,661,516 A | 8/1997 | Carles | |
| 5,663,757 A | 9/1997 | Morales | |
| 5,666,493 A | 9/1997 | Wojcik et al. | |
| 5,682,206 A | 10/1997 | Wehmeyer et al. | |
| 5,689,641 A | 11/1997 | Ludwig et al. | |
| 5,689,648 A | 11/1997 | Diaz et al. | |
| 5,689,663 A | 11/1997 | Williams | |
| 5,691,777 A | 11/1997 | Kassatly | |
| 5,696,906 A | 12/1997 | Peters et al. | |
| 5,696,982 A * | 12/1997 | Tanigawa et al. | 715/528 |
| 5,697,793 A | 12/1997 | Huffman et al. | |
| 5,710,887 A | 1/1998 | Chelliah et al. | |
| 5,715,314 A | 2/1998 | Payne et al. | |
| 5,721,832 A | 2/1998 | Westrope et al. | |
| 5,721,908 A | 2/1998 | Lagarde et al. | |
| 5,721,956 A | 2/1998 | Martin et al. | |
| 5,722,418 A | 3/1998 | Bro | |
| 5,724,091 A | 3/1998 | Freeman et al. | |
| 5,724,521 A | 3/1998 | Dedrick | |
| 5,726,909 A | 3/1998 | Krikorian | |
| 5,727,065 A | 3/1998 | Dillon | |
| 5,734,719 A | 3/1998 | Tsevdos et al. | |
| 5,734,823 A | 3/1998 | Saigh et al. | |
| 5,734,891 A | 3/1998 | Saigh | |
| 5,737,725 A * | 4/1998 | Case | 704/260 |
| 5,737,747 A | 4/1998 | Vishlitzky et al. | |
| 5,739,814 A | 4/1998 | Ohara et al. | |
| 5,740,549 A | 4/1998 | Reilly et al. | |
| 5,742,680 A | 4/1998 | Wilson | |
| 5,748,441 A | 5/1998 | Loritz et al. | |
| 5,754,172 A | 5/1998 | Kubota et al. | |
| 5,758,257 A | 5/1998 | Herz et al. | |
| 5,761,468 A | 6/1998 | Emberson | |
| 5,761,485 A | 6/1998 | Munyan | 345/839 |
| 5,761,606 A | 6/1998 | Wolzien | |
| 5,764,276 A | 6/1998 | Martin et al. | |
| 5,767,896 A | 6/1998 | Nemirofsky | |
| 5,768,521 A | 6/1998 | Dedrick | |
| 5,771,354 A * | 6/1998 | Crawford | 709/229 |
| 5,774,170 A | 6/1998 | Hite et al. | |
| 5,787,171 A | 7/1998 | Kubota et al. | |
| 5,788,504 A | 8/1998 | Rice et al. | |
| 5,790,176 A | 8/1998 | Craig | |
| 5,790,935 A | 8/1998 | Payton | |
| 5,793,414 A | 8/1998 | Shaffer | 725/133 |
| 5,798,785 A | 8/1998 | Hendricks et al. | |
| 5,799,071 A | 8/1998 | Azar et al. | |
| 5,799,157 A | 8/1998 | Escallon | 705/27 |
| 5,802,465 A | 9/1998 | Hamalainen et al. | |
| 5,802,526 A | 9/1998 | Fawcett et al. | |
| 5,805,204 A | 9/1998 | Thompson et al. | |
| 5,815,671 A | 9/1998 | Morrison | |
| 5,819,301 A | 10/1998 | Rowe et al. | |
| 5,835,732 A | 11/1998 | Kikinis et al. | |
| 5,844,600 A | 12/1998 | Kerr | |
| 5,844,890 A | 12/1998 | Delp et al. | |
| 5,850,218 A | 12/1998 | LaJoie et al. | |
| 5,850,629 A | 12/1998 | Holm et al. | |
| 5,859,594 A | 1/1999 | King et al. | |
| 5,862,325 A | 1/1999 | Reed et al. | |
| 5,862,329 A | 1/1999 | Aras et al. | |
| 5,864,823 A | 1/1999 | Levitan | |
| 5,870,717 A | 2/1999 | Wiecha | |

| | | |
|---|---|---|
| 5,877,755 A | 3/1999 | Hellhake |
| 5,877,801 A | 3/1999 | Martin et al. ............... 348/36 |
| 5,881,269 A | 3/1999 | Dobbelstein |
| 5,890,122 A | 3/1999 | Van Kleeck et al. |
| 5,892,900 A | 4/1999 | Ginter et al. |
| 5,892,915 A | 4/1999 | Duso et al. |
| 5,893,109 A | 4/1999 | DeRose et al. |
| 5,893,132 A | 4/1999 | Huffman et al. |
| 5,898,852 A | 4/1999 | Petolino et al. |
| 5,903,319 A | 5/1999 | Busko et al. |
| 5,903,652 A | 5/1999 | Mital |
| 5,903,901 A | 5/1999 | Kawakura et al. |
| 5,914,706 A | 6/1999 | Kono |
| 5,917,543 A | 6/1999 | Uehara |
| 5,917,915 A | 6/1999 | Hirose |
| 5,929,848 A | 7/1999 | Albukerk et al. |
| 5,930,768 A | 7/1999 | Hooban |
| 5,933,498 A | 8/1999 | Schneck et al. |
| 5,940,073 A | 8/1999 | Klosterman et al. |
| 5,956,034 A | 9/1999 | Sachs et al. |
| 5,957,695 A | 9/1999 | Redford et al. |
| 5,963,246 A | 10/1999 | Kato |
| 5,986,677 A | 11/1999 | Jones et al. |
| 5,986,690 A | 11/1999 | Hendricks ............... 725/60 |
| 5,990,927 A | 11/1999 | Hendricks et al. |
| 5,999,214 A | 12/1999 | Inagaki |
| 6,012,890 A | 1/2000 | Celorio Garrido |
| 6,014,184 A | 1/2000 | Knee et al. |
| 6,016,484 A | 1/2000 | Williams et al. |
| 6,025,837 A | 2/2000 | Matthews, III et al. |
| 6,025,871 A | 2/2000 | Kantor et al. |
| 6,029,045 A | 2/2000 | Picco et al. |
| 6,034,680 A | 3/2000 | Kessenich ............... 345/733 |
| 6,052,717 A | 4/2000 | Reynolds et al. ............ 709/218 |
| 6,091,823 A | 7/2000 | Hosomi et al. |
| 6,091,930 A | 7/2000 | Mortimer et al. |
| 6,101,485 A | 8/2000 | Fortenberry et al. |
| 6,112,049 A | 8/2000 | Sonnenfeld |
| 6,115,040 A | 9/2000 | Bladow et al. |
| 6,163,796 A * | 12/2000 | Yokomizo ............... 709/203 |
| 6,195,667 B1 | 2/2001 | Duga et al. |
| 6,204,885 B1 | 3/2001 | Kwoh ............... 348/564 |
| 6,229,694 B1 | 5/2001 | Kono |
| 6,243,071 B1 * | 6/2001 | Shwarts et al. ............. 345/823 |
| 6,249,785 B1 | 6/2001 | Paepke |
| 6,252,879 B1 | 6/2001 | Zhang |
| 6,260,024 B1 | 7/2001 | Shkedy |
| 6,269,483 B1 | 7/2001 | Broussard |
| 6,279,017 B1 | 8/2001 | Walker |
| 6,281,986 B1 | 8/2001 | Form |
| 6,295,542 B1 | 9/2001 | Corbin |
| 6,298,441 B1 | 10/2001 | Handelman et al. |
| 6,320,591 B1 | 11/2001 | Griencewic |
| 6,331,865 B1 | 12/2001 | Sachs et al. |
| 6,331,867 B1 | 12/2001 | Eberhard et al. |
| 6,335,678 B1 | 1/2002 | Heutschi |
| 6,351,750 B1 | 2/2002 | Duga et al. |
| 6,363,418 B1 | 3/2002 | Conboy et al. |
| 6,385,614 B1 | 5/2002 | Vellandi |
| 6,411,973 B1 * | 6/2002 | Yianilos ............... 715/512 |
| 6,415,316 B1 | 7/2002 | Van Der Meer |
| 6,438,233 B1 | 8/2002 | Yoshimune et al. |
| 6,452,614 B1 | 9/2002 | King et al. |
| 6,460,036 B1 | 10/2002 | Herz |
| 6,462,729 B2 | 10/2002 | Morita |
| 6,493,734 B1 | 12/2002 | Sachs et al. |
| 6,507,342 B1 | 1/2003 | Hirayama |
| 6,535,505 B1 | 3/2003 | Hwang et al. |
| 6,546,016 B1 | 4/2003 | Gerszberg et al. |
| 6,556,561 B1 | 4/2003 | Himbeault et al. |
| 6,557,173 B1 | 4/2003 | Hendricks |
| 6,606,603 B1 | 8/2003 | Joseph |
| 6,611,531 B1 | 8/2003 | Chen et al. |
| 6,634,028 B2 | 10/2003 | Handelman |
| 6,664,754 B2 | 12/2003 | Misumi |
| 6,675,384 B1 | 1/2004 | Block et al. |
| 6,714,238 B2 | 3/2004 | Urisaka et al. |
| 6,725,203 B1 | 4/2004 | Seet et al. |
| 6,813,249 B1 | 11/2004 | Lauffenburger et al. |
| 6,886,000 B1 | 4/2005 | Aggarwal et al. |
| 2002/0120635 A1 | 8/2002 | Joao |
| 2003/0018543 A1 | 1/2003 | Alger et al. |
| 2003/0093336 A1 | 5/2003 | Ukita et al. |
| 2003/0093382 A1 | 5/2003 | Himeno et al. |
| 2003/0198932 A1 | 10/2003 | Stuppy |
| 2005/0144133 A1 | 6/2005 | Hoffman |

FOREIGN PATENT DOCUMENTS

| | | |
|---|---|---|
| CA | 2257659 | 11/1993 |
| CA | 2458564 | 6/1995 |
| DE | 3423846 | 1/1986 |
| DE | 3935294 | 4/1991 |
| DE | 42 12 184 | 10/1993 |
| DK | DE 3423846 A1 | 1/1986 |
| EP | 0103438 | 3/1984 |
| EP | 140302 | 5/1985 |
| EP | 0145063 | 6/1985 |
| EP | 0149536 | 7/1985 |
| EP | 0158548 | 10/1985 |
| EP | 0158767 | 10/1985 |
| EP | 0167237 | 1/1986 |
| EP | 0243312 | 10/1987 |
| EP | 0243312 A2 | 10/1987 |
| EP | 0277014 | 8/1988 |
| EP | 0281293 | 9/1988 |
| EP | 0299830 | 1/1989 |
| EP | 0314572 | 5/1989 |
| EP | 0328440 | 8/1989 |
| EP | 0340643 | 11/1989 |
| EP | 0355 697 | 2/1990 |
| EP | 0377334 | 7/1990 |
| EP | 0384986 | 9/1990 |
| EP | 0396186 | 11/1990 |
| EP | 0399200 | 11/1990 |
| EP | 0402 809 | 12/1990 |
| EP | 0420 123 | 4/1991 |
| EP | 0187 961 | 5/1991 |
| EP | 0424 648 | 5/1991 |
| EP | 0425 834 | 5/1991 |
| EP | 0450841 | 10/1991 |
| EP | 0539106 A2 | 10/1991 |
| EP | 0472070 | 2/1992 |
| EP | 0472070 A2 | 2/1992 |
| EP | 0506 435 | 9/1992 |
| EP | 0513 763 | 11/1992 |
| EP | 0516533 | 12/1992 |
| EP | 0539106 | 4/1993 |
| EP | 0567800 | 11/1993 |
| EP | 0570785 | 11/1993 |
| EP | 09322877 | 11/1993 |
| EP | 0586954 | 3/1994 |
| EP | 0620689 | 10/1994 |
| EP | 0646856 | 4/1995 |
| EP | 0702491 | 3/1996 |
| EP | 0810534 A | 12/1997 |
| EP | 0810534 A2 | 12/1997 |
| EP | 0838798 | 4/1998 |
| EP | 0838798 A1 | 4/1998 |
| EP | 0892388 | 1/1999 |
| EP | 0924629 A | 6/1999 |
| EP | 0924687 | 6/1999 |
| GB | 1204190 | 9/1970 |
| GB | 2168227 A | 11/1984 |
| GB | 2149544 | 6/1985 |
| GB | 2168227 | 6/1986 |

| | | | | | | |
|---|---|---|---|---|---|---|
| GB | 2 177 873 A | 1/1987 | | WO | WO 94/01964 | 1/1994 |
| GB | 2269302 A | 2/1994 | | WO | WO 94/07327 A1 | 3/1994 |
| GB | 2344009 | 5/2000 | | WO | WO 94/13107 | 6/1994 |
| JP | 060-143086 | 7/1985 | | WO | WO 94/14282 | 6/1994 |
| JP | 61-028150 | 2/1986 | | WO | WO 94/16527 | 7/1994 |
| JP | 61-60150 | 3/1986 | | WO | WO94/23537 | 10/1994 |
| JP | 061060150 | 3/1986 | | WO | WO95/15649 | 6/1995 |
| JP | 62-24777 | 2/1987 | | WO | WO 9515649 A | 6/1995 |
| JP | 62-140134 | 6/1987 | | WO | WO 96/08109 | 3/1996 |
| JP | 62-245167 | 10/1987 | | WO | WO 96/17306 | 6/1996 |
| JP | 62245167 | 10/1987 | | WO | WO 96/25006 | 8/1996 |
| JP | 64-086778 | 3/1989 | | WO | WO 96/41473 | 12/1996 |
| JP | 01-130683 | 5/1989 | | WO | WO 97/13368 | 4/1997 |
| JP | 01-142918 | 6/1989 | | WO | WO 97/18665 | 5/1997 |
| JP | 64-007786 | 11/1989 | | WO | WO 97/12105 | 6/1997 |
| JP | 02-284571 | 11/1990 | | WO | WO 97/20224 | 6/1997 |
| JP | 03225445 | 4/1991 | | WO | WO97/20274 | 6/1997 |
| JP | 03-114375 | 5/1991 | | WO | WO 97/20274 | 6/1997 |
| JP | 03-198119 | 8/1991 | | WO | WO 97/22049 | 6/1997 |
| JP | 04-170183 | 6/1992 | | WO | WO97/22049 | 6/1997 |
| JP | 05-046045 | 2/1993 | | WO | WO 97/22062 | 6/1997 |
| JP | 05056405 | 3/1993 | | WO | WO97/22062 | 6/1997 |
| JP | 05-236437 | 9/1993 | | WO | WO97/22063 | 6/1997 |
| JP | 05236437 | 9/1993 | | WO | WO 97/22063 | 6/1997 |
| JP | 05250106 | 9/1993 | | WO | WO 97/22064 | 6/1997 |
| JP | 5250106 | 9/1993 | | WO | WO97/22064 | 6/1997 |
| JP | 05233547 | 10/1993 | | WO | WO 97/22065 | 6/1997 |
| JP | 05-334167 A | 12/1993 | | WO | WO97/22065 | 6/1997 |
| JP | 05334167 A * | 12/1993 | | WO | WO 97/22067 | 6/1997 |
| JP | 06-068339 A | 3/1994 | | WO | WO 97/22067 | 6/1997 |
| JP | 06068339 A * | 3/1994 | | WO | WO 97/22079 | 6/1997 |
| JP | 6134489 | 5/1994 | | WO | WO97/22079 | 6/1997 |
| JP | 06134489 | 5/1994 | | WO | WO97/22080 | 6/1997 |
| JP | 07-230466 A | 8/1995 | | WO | WO 97/22080 | 6/1997 |
| JP | 7230466 | 8/1995 | | WO | WO 97/22097 | 6/1997 |
| JP | 07-235909 | 9/1995 | | WO | WO97/22097 | 6/1997 |
| JP | 08-008850 A | 1/1996 | | WO | WO 97/22099 | 6/1997 |
| JP | 08-051614 A | 2/1996 | | WO | WO97/22099 | 6/1997 |
| JP | 08-228328 | 9/1996 | | WO | WO97/22100 | 6/1997 |
| JP | 09-227193 | 9/1997 | | WO | WO 97/22100 | 6/1997 |
| JP | 09-284571 | 10/1997 | | WO | WO97/22101 | 6/1997 |
| JP | 10-285568 A | 10/1998 | | WO | WO 97/22101 | 6/1997 |
| JP | 11-068770 | 3/1999 | | WO | WO 97/22102 | 6/1997 |
| TW | 234223 | 11/1994 | | WO | WO97/22102 | 6/1997 |
| TW | 235358 | 12/1994 | | WO | WO 97/22103 | 6/1997 |
| TW | 235359 | 12/1994 | | WO | WO97/22103 | 6/1997 |
| TW | 236065 | 12/1994 | | WO | WO97/22104 | 6/1997 |
| TW | 236744 | 12/1994 | | WO | WO 97/22104 | 6/1997 |
| TW | 238461 | 1/1995 | | WO | WO97/22105 | 6/1997 |
| WO | WO 80/00209 | 2/1980 | | WO | WO 97/22105 | 6/1997 |
| WO | WO 83/03020 | 9/1983 | | WO | WO 97/22106 | 6/1997 |
| WO | WO 84/00237 | 1/1984 | | WO | WO97/22106 | 6/1997 |
| WO | WO 86/01962 | 3/1986 | | WO | WO 97/22107 | 6/1997 |
| WO | WO 87/01481 | 3/1987 | | WO | WO97/22107 | 6/1997 |
| WO | WO 88/01463 | 2/1988 | | WO | WO97/22108 | 6/1997 |
| WO | WO 89/09528 | 10/1989 | | WO | WO 97/22108 | 6/1997 |
| WO | WO 89/12370 | 12/1989 | | WO | WO 97/22109 | 6/1997 |
| WO | WO 90/10988 | 9/1990 | | WO | WO97/22109 | 6/1997 |
| WO | WO 9100670 | 1/1991 | | WO | WO 97/22110 | 6/1997 |
| WO | WO 91/03112 | 3/1991 | | WO | WO97/22110 | 6/1997 |
| WO | WO 91/11769 | 8/1991 | | WO | WO 97/22111 | 6/1997 |
| WO | WO 91/15841 | 10/1991 | | WO | WO97/22111 | 6/1997 |
| WO | WO 92/10040 | 6/1992 | | WO | WO97/22112 | 6/1997 |
| WO | WO 92/11713 | 7/1992 | | WO | WO 97/22112 | 6/1997 |
| WO | WO 92/12599 | 7/1992 | | WO | WO 97/12819 | 7/1997 |
| WO | WO 92/17027 | 10/1992 | | WO | WO 97/23819 | 7/1997 |
| WO | WO 92/21206 | 11/1992 | | WO | WO97/23819 | 7/1997 |
| WO | WO 93/06692 | 4/1993 | | WO | WO 97/41688 A1 | 11/1997 |
| WO | WO 93/09490 | 5/1993 | | WO | WO 97/45798 | 12/1997 |
| WO | WO 93/09631 | 5/1993 | | WO | WO 98/02836 | 1/1998 |
| WO | WO93/15466 | 8/1993 | | WO | WO98/08344 | 2/1998 |
| WO | WO 93/22877 | 11/1993 | | WO | WO 9808344 A | 2/1998 |
| WO | 94/01964 A1 | 1/1994 | | WO | WO98/18086 | 4/1998 |

| | | |
|---|---|---|
| WO | WO 9818086 | 4/1998 |
| WO | WO 98/48566 | 10/1998 |
| WO | WO 98/53581 | 11/1998 |
| WO | WO 00/62228 A3 | 1/1999 |
| WO | WO 99/12349 | 3/1999 |
| WO | WO 99/18701 A1 | 4/1999 |
| WO | WO 99/26415 | 5/1999 |
| WO | WO99/44144 | 9/1999 |
| WO | WO 99/45491 | 9/1999 |
| WO | WO 9944144 A | 9/1999 |
| WO | WO 99/52285 | 10/1999 |
| WO | WO 99/66719 | 12/1999 |
| WO | WO 01/18665 | 3/2001 |
| WO | WO 01/18665 A1 | 3/2001 |
| WO | WO2007/022107 | 2/2007 |

OTHER PUBLICATIONS

"The Internet bookstore opens for business", Medford: Jul./Aug. 1994. vol. 11, Iss. 4; p. 21 (1 page).*
Basch, Reva, "Books Online: Visions, Plans, and Perspectives for Electronic Text", Online. Medford: Jul. 1991. vol. 15, Iss. 4; 13 (11 pages).*
Valauskas, Edward J, "Electronic books as databases", Database. Aug. 1993. vol. 16, Iss. 4; p. 84 (3 pages).*
O'Gorman, "Image and document processing techniques for the RightPages electronic library system", Conference B: Pattern Recognition Methodology and Systems, Proceedings, 11th IAPR International Conference on Aug. 30-Sep. 3, 1992 Page(s): 260-263.*
Broering, "The Electronic Library And IAIMS at Georgetown University", Policy Issues in Information and Communication Technologies in Medical Applications, 1988. Symposium Record Sep. 29-30, 1988 Page(s): 27-29.*
Pobiak, "Adjustable access electronic books", Computing Applications to Assist Persons with Disabilities, 1992, Proceedings of the Johns Hopkins National Search for Feb. 1-5, 1995 Page(s): 90-94.*
Endo et al., "Electronic Book in 3.5 Floppy Disk", Consumer Electronics, 1994. Digest of Technical Papers, IEEE 1994 International Conference on Jun. 21-23, 1994 Page(s): 316-317.*
Schatz, "Building and electronic scientific community", System Sciences, 1991. Proceedings of the Twenty-Fourth Annual Hawaii International Conference on vol. iii, Jan. 8-11, 1991 Page(s):739-748 vol. 3.*
Antelman et al., "Collection Development in the Electronic Library", Proceedings of the 21st annual ACM SIGUCCS conference on User services, San Diego, California, pp. 50 - 56, 1993.*
Rauch, et al.; Enabling the Book Metaphor for the World Wide Web: Disseminating on-line information as dynamic web documents; Jun. 1997; pp. 111-128.
Herron; Teaching With the Internet; 1998; pp. 217-222.
Pasquier-Boltuck, et al. Protoyping an Interactive Electronic Book System Using an Object-Oriented Approach; Aug., 1988; p. 177-190.
Boyle, et al.; A Survey and Classification of Hypertext Documentation Systems; 1992; pp. 90-111.
Goldberg, et al.; World Wide Web -Course tool: An environment for building WWW-based courses; 1996; pp. 1219-1231.
Azuma; Creating Educational Web Sites; Mar. 1999; pp. 109-113.
Bieber, et al.; Fourth Generation Hypermedia: some missing links for the world wide web; Jul. 1997; pp. 31-65.
Hartley, et al.; Enhancing Teaching Using the Internet; Feb. 1996; pp. 218-228.
Czejdo; Using an ER Query and Update Interface for Rapid Prototyping of Hypertext Systems; Feb. 1990; pp. 227-236.
van den Boom; An Interactive Videotext System for Two-Way CATV Networks1986; pp. 397-401.
Speech Technology; Electronic Dictionary Pronounces Over 83,000 Words; 1989; pp. 78-79.
Yankelovich, et al.; Reading and Writing the Electronic Book; Oct. 1985; pp. 15-30.
Van Den Boom; An Interactive Videotex System for Two-Way CATV Networks; 1986; pp. 397-401.

"A Survey and Classification of Hypertext Documentation Systems," Boyle, C. et al.; *IEEE Transactions on Professional* Communication; IEEE Inc.; New York; vol. 35, No. 2; 1 Jun. 1992.
"An Interactive Lesson in the Interactive Course Series" Waite Group Press, MacMillan Computer Publishing, Online! 1996, XP00082591, Retrieved from the Internet: <URL:http//www.waite.com/> retrieved on 1996!.
"Electronic Dictionary Pronounces over 83,000 Words," *Speech Technology*; Man-Machine Voice Communications, U.S., Media Dimensions Inc.; New York, vol. 4, No. 4; 1 Apr. 1989, pp. 78-79.
"Multimedia Systems," *A Dynamic Policy of Segment Replication for Load-Balancing in Video-On-Demand Servers*; Dan, et al.; Jul. 1995.
"Prototyping an Interactive Electronic Book System Using and Object-oriented Approach," Pasquier-Boltuck, J. et al.; *ECOOP*; european Conference on Object-oriented Programming; Aug. 15, 1988; pp. 177-190.
"Reading and Writing the Electronic Book," Computer; U.S. IEEE Computer Society, Long Beach, Calif., U.S. vol. 18, No. 10, Oct. 1, 1995.
"Subscription Teletext for Value Added Services", Dr. G.T. Sharpless, IEEE Transactions on Consumer Electronics, Aug. 1985, No. 3, p. 283.
"The Internet bookstore opens for business", Medford: Jul/Aug. 1994. vol. 11, lss. 4; p. 21 (1 page).
"Using an Er Query and Update Interface for Rapid Prototyping of Hypertext Systems," Czejdo, B.; Proceedings of the Annual Hawaii International Conference on System Sciences; Jan. 1, 1990.
A Store-and-Forward Architecture for Video-on-Demand Service.
A Survey and Classification of Hypertext Documentation Systems, IEEE Transaction on Professional Communication.
A.D. Gelman, et al.; a Store-And-Forward Architecture for Video-On-Demand Service; ICC 91 Conf.; 6/23-26/91;pp. 842-846.
A6, 034,680 Alcatel Teletra: Markets and Products Overview.
Alexander Felman, et al., "An Architecture for Interactive Applications", May 1993, pp. 848-852 An Interactive Lesson . . An interactive lesson in the interactive course series, Aug. 1996.
An Interactive Videotex System for Two-Way CATV Networks.
*Applied Cryptography Protocols, Algorithms, and Source Code in C* (pp. 34-44); Schneier, Bruce; Pub. 199 by John Wiley &.
Azuma J.: "Creating Eduational Web Sites", IEE Communications Magazine, U.S. IEEE Service Center, Piscataway, N. J., vol. 37, No. 3, Mar. 1999 (Mar. 1999), pp. 109-113.
Barnes, 10 Minute Guide to Windows 3.1., Alpha Books, 1992, pp. 60-64.
Basch, Reva, "Books Online: Visions, Plans, and Perspectives for Electronic Text", Online. Medford: Jul 1991. vol. 15, Iss. 4; 13 (11 pages).
Bestler, "Flexible Data Structure and Interface Rituals for Rapid Development of OSD Applications", pp. 223-236, Jun. 1993.
Biber, et al.; Fourth generation hypermedia: some missing links for the World Wide Web; Jul. 1997; pp. 31-65.
Bogdan Czejdo, "Using an ER Query and Update Interface for Rapid Prototyping of Hypertext Systems", Jan. 1990, pp. 227-236.
Boltuck et al.; Prototyping an Interactive Electronic Book System Using an Object-Oriented Approach; Aug. 1988; pp. 1770-7190.
*Books Online . . .* ; Basch; Jul. 1991.
Boom, "An Interactive Videotext System", pp. 397-401, Nov./Dec. 1986.
Boyle C. et al.: "A Survey and Classificatoin of Hypertext Documentation Systems", IEE Transactions on Professional Communications, US, Iee Inc., New York, vol. 35, No. 2, 1 Jun. 1, 1992, pp. 98-111.
Caejdo B.: "Using an Er Query and Update Interface for Rapid Prototyping of Hypertext Systems", Proceedings of the Annual Hawaii International Conference on System Sciences, Jan. 1, 1990, p. 231.
Caitlin Bestler, "Flexible Data Structures and Interface Rituals for Rapid Development of OSD Applications", Jun. 1993, pp. 223-236.
Chan, "Principles, Structure and Format", Immroth's Guide to the Library of Congress Classification, 4th Edition, 1990, Chapter 2, pp. 19-51.
Consumer Digest advertisement; Xpand Your TV's Channel Capability; Fall/Winter 1992; p. 215.

Craig Boyle, et al., "A Survey and Classification of Hypertext Documentation Systems", Jun. 1992, pp. 98-111.
Creating Educational Web Sites Czejdo B.: "Using an ER Query and Update Interface for Rapid Prototyping of Hypertext Systems" Proceedings of the Annual Hawaii International Conference on System Sciences, Jan. 1, 1990, p. 231.
Dan A. et al.: "A Dynamic Policy of Segment Replication for Load-Balancing in Video-on-Demand Servers", Multimedia Systems, Springer Verlag, DE, vol. 3, No. 3, Jul. 1995, pp. 93-103.
Daniel M. Moloney, Digital Compression in Today's Addressable Environment; 1993 NCTA Technical Papers; Jun. 6, 1993; pp. 308-316.
DeBuse, SO That's a Book . . .Advancing Technology and the Library, Mar. 1988, Information Technology and Libraries, vol. 7, Issue 1, pp. 7-18.
Digital Compression in Today's Addressable Environment.
Dinaro et al., "Markets and Products Overview", 1991.
Dr. G. T. Sharpless, IEE Transactions on Consumer Electronics, vol. CE-31, No. 3, Aug. 1985, pp. 283-289.
*Electronic Books as . . .*; Valauskas; Auust 1993 Electronic Dictionary Pronoucnes . . . , Speech Technology.
Enabling the Book Metaphor, IEEE Transactions on Professional Communication.
Enhancing Teaching *Flexibl Data Structures and Interface Rituals for Rapid Development of OSD Applications*, Caitlin Bestler, 93 NCTA Tech. Papers, pp. 223-236; Jun. 6, 1993.
Fourth Generation Hypermedia . . . , Int'l Journal of Human-Computer Sciences Studies.
Fox, et al., Users, user interfaces, and objects: Envision, a Digital Library, Sep. 1993, Journal of the American Society for Information Science, vol. 44, issue 8, p. 480.
Für Geschlossene *Fur Geschlossene*; Funkschau; Aug. 25, 1989
Gelman, et al., "An Architecture for Interactive Applications", May 1993, pp. 848-852.
Goldberg M W et al: "World Wide Web - course tool: An environment for building WWW-based courses" Computer Networks and ISDN Systems, NL, North Holland Publishing. Amsterdam, vol. 28, No. 11, May 1,1996.
Goorfin L.: "Electronic Dictionary Pronounces over 83,000 Words" Speech Technology, Man-Machine Voice Communications, U.S., Media, Dimensions, Inc. New York, vol. 4, No. 4, Apr. 1, 1989, pp. 78-79.
Great Presentations advertisement; Remote, Remote; 1987; p. 32H.
H. Van Den Boom, An Interactive Videotex System for Two-Way CATV Networks, Dec. 1986, pp. 397-401.
Hartley S et al.: "Enhancing Teaching Using the Internet"SIGCSE/SIGCUE Conference on Integrating Technology into Computer Science Education, US, New York, ACM, vol. CONF. 1, Jun. 2, 1996, pp. 218-228.
Henri van den Boom; An Interactive Videotex System for Two-Way CATV Networks; Nov. 1986; pp. 397-401.
Herron T L: "Teaching with the Internet" Internet and Higher Education US, JAI Press, Stamford, CT, vol. 1, No. 3, 1998, pp. 217-222.
Hong Consumer Products From SVI; Nov. 1988; p. 379 Kong Enterprise advertisement; Two Innovative New.
Hong Kong Enterprise; Advertisement Two Innovative New Consumer Products From SVI, Nov. 1988, p. 279.
HP-41 C Operating Manual, Hewlett Packard Co., Dec. 1982.
Human Factors in Telecommunications; Sorce et al. Indian Patent Application 762-Cal-93 Indian Patent Application 765-Cal-93 Inter et al., "The Dewey Decimal Classification", Special Libraries: A Cataloging Guide, 1998, Chapter 11, pp. 211-239.
*Interactive Videotex*; van den Boom, Nov.-Dec. 1986.
John Reimer: Memories in My Pocket; BYTE; Feb. 1991; pp. 251-258.
Junichi Azuma; Creating Education Web Sites; Mar. 1999; pp. 109-113.
Kubota H. et al.: "Terrestrial Data Multiplex Broadcasting News Delivery System and Its Terminal", IEE Transactions on Consumer Electronics, U.S., IEE Inc., New York, Vo.. 43, No. 3, Aug. 1, 1997, pp. 504-509.
Lewis et al.; ("Shared books: collaborative publication management for an office information system"); ACM SIGIOS Bulletin Conference sponsored by ACM SIGOIS and IEECS TC-OA on Office information systems, vol. 9, Issue 2-3, Apr. 1988.
Mann et al.; ("A coherent distributed file cache with directory write-behind") ACM Transactions on Computer Systems (TCOS), vol. 12, Issue 2, May 1994.
Marco Dinaro, Alcatel Telettra; Markets and Products Overview; Revue HF Tijdschrift 15; 1991; pp. 135-148.
Markets and Products Overview; Dinaro et al. Medley, et al.; Enhancing teaching using the Internet; Feb. 1996: pp. 218-228.
Memories in My Pocket; Reimer; Byte, pp. 251, 252, 254, 255, 256, 258, Feb. 1991.
Michael Bieber, et al.; Fourth Generation Hypermedia: some missing links for the World Wide Web; 1997; pp. 31-65.
Miyazawa, et al., An electronic book: APT Book, Aug. 1990, Human-Computer Interaction, INTERACT '90, Proceedings of the IFIP TC 13 Third International Conference, Cambridge, UK, pp. 513-19.
*Multimedia Systems, A Dynaic Policy of Segment Replicatoin for Load-Balancing in Video-On-Demand Servers (see 111)*; Dan et al.; Jul. 1995.
Nicole Yankelovich, et al., "Reading and the Electronic Book", Oct. 1985, pp. 16-30.
Olshansky & Joyce: Subscriber Distribution Networks Using Compressed Digital Video; Journal of Lightwavw Tech; Nov. 1992; pp. 1760-1765.
Pasquier-Boltuck J et al: Prototyping an Interactive Electronic Book System Using An Object-Oriented Approach; ECOOP. European Conference on Object-Oriented Programming. Aug. 15, 1998, pp. 177-190.
Prototyping an Interactive Electronic Book System Raman, T.V., Audio System for Technical Readings, May 1994, Cornell University, pp. 1-129.
Rauch T et al: "Enabling the Book Metaphor for The World-Wide-Web: Disseminating On-Line Information As Dynamic Web Documents" IEEE Transactions on Professional Communiations June 1997. IEEE, USA, vol. 40, No. 2, pp. 111-128.
Rawlins, "The New Publishing - Technology's impact on the publishing industry over the next decade", Nov. 12, 1991, pp. 1-65.
RE 36,207 Re. 36.207 (5,185,667) Reading and Wriring the Electronic Book, IEEE Computer Science.
Reimer; "Memories in My Pocket", Feb. 1991, pp. 251-258.
*Remote, Remote*, Great Presentations advertisement, p. 32H; Nov. 1998.
Schatz, "Building an electronic scientific community", System Sciences, 1991. Proceeding of the Twenty-Fourth Annual Hawaii International Conference on vol. iiiI, Jan. 8-11. 1991 pp. 739-748 vol. 3.
Schepers C.: "Fur Geschlossene Benutzergruppen" Funkschau, De, Franzis-Verlag K.G. Munchen, No. 18, Aug. 25,1989, pp. S53-S54.
Sharpless, Dr. G. T., "Subscription teletext for value added services", IEEE Transactions on Consumer Electronics, vol. CE-31, No. 3, Aug. 1985.
Simpson, Alan, Mastering WORDPERFECT® 5.1 & 5.2 for Windows, 1993, Sybex, Inc., pp. 72-73.
Soloview; ("Prefetching in segmented disk cache for multi-disk systems") Proceedings of the fourth workshop on I/O in parallel and distributed systems: part of the federated computing research conference; May 1996.
Speech Technology, "Electronic Dictionary Pronounces Over 35,000 Words", pp. 78-79 (1989).
Stephen Hartley, et al.; Enhancing Teaching Using the Internet; Feb. 6, 1996; pp. 218-228.
Subscriber Distribution Networks Using Compressed Digital Video.
Subscription Teletex for Value Addes Services.
Teaching with the Internet.
*Technology's Impact on . . .* ; Rawlins; Nov. 21, 1991.
Telman, et al.; A Store-and-Forward Architecture for Video-on-Demand Service; 1991; pp. 842-846.
Terrestrial Data . . . Terri Herron; Teaching with the Internet; 1998; pp. 217-222.
The *Internet* Bookstore . . . ; Jul./Aug. 1994 Thyra Rauch, et al., "Enabling the book metaphor for the World Wide Web: Disseminating on-line information as dynami[c] Web documents", Jun. 1997, pp. 111-128.
Two Innovatice New Consumer Products from SVI.

Using an ER Query ad Upate Interface . . . , Proceedings of the Annual Hawaii.

Valauskas, Edward J, "Electronic books as databases", Database. Aug 1993. vol. 16, Iss. 4; p. 84 (3 pages).

Van Den Boom, "An Interactive Videotex System for Two-Way CATV Networks", vol. 40, No. 6, pp. 397-401, Dec. 1986.

Waite Group Press; AN Interactive Lesson in the Interactive Course Series, 1996.

*World Wide Web - Course Tool*, Goldberg, M.W., et al., May, Xpand your TV's Channel Capability.

Yankelovich N. et al: "Reading and Writing the Electronic Book" Computer, US, IEEE Computer Society. Long Beach, CA, US, vol. 18, No. 10.

Herron T.L., "Teaching with the Internet" Internet and Higher Education, US, Jai Press, Stamford, CT, vol. 1, No. 3, 1998, pp. 217-222, XP002118719, ISSN: 1096-7516.

Azuma J., "Creating Educational Web Sites", IEEE Communications Magazine, US, IEEE Service Center, Piscataway, N.J., vol. 37, No. 3, Mar. 1999, pp. 109-113, XP000823980, ISSN: 0163-6804.

Goldberg, M.W. et al., "World Wide Web-Course tool: An environment for building WWW-based courses", Computer Networks and ISDN Systems, NL, North Holland Publishing, Amsterdam, vol. 28, No. 11, May 1, 1996, pp. 1219-1231, XP004018222, ISSN: 0169-7552.

An Interactive Lesson in the Interactive Course Series, Waite Group Press, Macmillan Computer Publishing, 'Online! 1996, XP000829591, Retrieved from the Internet: URL:http://www.waite.com/> 'retrieved on 1996!

Goorfin, L., "Electronic Dictionary Pronounces over 83,000 Words", Speech Technology, Man-Machine Voice Communications, US, Media Dimensions Inc., New York, vol. 4, No. 4, Apr. 1, 1989, pp. 78-79, XP000033505, ISSN: 0744-1355.

Hartley, S. et al., "Enhancing Teaching Using the Internet", SIGCSE/SIGCUE Conference on Integrating Technology into Computer Science Education, US, New York, ACM vol. CONF. 1, Jun. 2, 1996, pp. 218-228, ISBN: 0-89791-844-4.

Seno, H. et al., "A Consideration of Data Transmission Method for Enhanced Teletext", NHK Science and Technical Research Laboratories, ITEJ Technical Report, vol. 16, No. 71, Oct. 1992, Japan, pp. 1-6.

Technology Update, Wordperfect Corporation Introduces Wordperfect 6.0 for DOS, http://www.nfbnet.org/files/word_processing/WP60.TXT, Mar. 24, 1993.

T.V. Raman, "An Audio View of (LA)Tex Documents," Proceedings of the 1191 Annual Meeting, pp. 1001-1008.

Microsoft Press Computer Dictionary Second Edition, Microsoft Press, 1994, p. 418.

IPER dated Sep. 8, 2001 for PCT/US00/15810, EP 00941287.5.
Office Action Apr. 27, 2007, EP 00925915.1
IPER dated Jan. 2, 2002 for PCT/US00/09541, EP 00925915.1.
Written Opinion dated Aug. 13, 2001, PCT/US00/09541, EP 00925915.1.
Office Action May 30, 2005, EP 00923211.7.
IPER dated Feb. 14, 2001 for PCT/US00/09543, EP 00923211.7.
ISR dated Oct. 24, 2000 for PCT/US00/09543, EP 00923211.7.
Office Action Jun. 8, 2005, EP 00923210.9.
Office Action Jun. 23, 2006, EP 00909966.4.
IPER dated Nov. 1, 2001 for PCT/US00/01708, EP 00909966.4.
Office Action Oct. 13, 2006, EP 00909958.1.
Office Action Sep. 6, 2006, EP 00909958.1.
Office Action Jul. 27, 2005, EP 00909958.1.
Office Action May 14, 2004, EP 00909958.1.
IPER dated Feb. 2, 2001 for PCT/US00/01625, EP 00909958.1.
ISR dated Jul. 24, 2000 for PCT/US00/01625, EP 00909958.1.

The project Gutenberg entitled: "The Bible: Old and New Testaments, King James Version by Anonymous", released on Aug. 1, 1989.

"'Optical Disks' May Be Books of the Future", Steven Kosek and Dennis Lynch; Chicago Tribune, Sep. 15, 1985, p. 31.

"Transmission Control Protocol; Request for Comment 793", Sep. 1981, pp. 1-85.

Systems, Boyle, C. et al.; *IEEE Transactions on Professional Communication*; IEEE Inc.; New York; vol. 35, No. 2; 1 Jun. 1992, pp. 98-111.

"An Interactive Lesson in the Interactive Course Series" Waite Group Press, MacMillan Computer Publishing, Online! 1996, XP00082591, Retrieved from the Internet: Group Press, MacMillan Computer Publishing, Online! 1996, XP00082591, Retrieved from the Internet: <URL:http//www.waite.com/> retrieved in 1996.

"Electronic Dictionary Pronounces over 83,000 Words," Goorfin, L., *Speech Technology*, Man-Machine Voice Communications, U.S., Media Dimensions Inc.; New York, vol. 4, No. 4; Apr. 1,1989, pp. 78-79.

"Enabling the book metaphor for the World-Wide-Web: disseminating on-line information as dynamic Web documents,"Rauch, T. et al.; *IEEE Transactions on Professional Communications*, Communications, Jun. 1997; vol. 40, No. 2, pp. 111-128.

"Fourth generation hypermedia: some missing links for the World Wide Web," Bieber, M. et al., *International Journal of Human-Computer Studies*; U.S.; Academic Press: New York; vol. 47, No. 1, Jul. 1997; pp. 31-65.

"*A Dynamic Policy of Segment Replication for Load-Balancing in Video-On-Demand Servers*," Dan, A. et al.; Multimedia Systems, vol. 3, No. 3, Jul. 1995, pp. 93-103.

"Prototyping an Interactive Electronic Book System Using an Object-oriented Approach," Pasquier-Boltuck, J. et al.; *ECOOP*; European Conference on Object-oriented Programming; Aug. 15, 1988; pp. 177-190.

"Reading and Writing the Electronic Book," Yankelovich, N. et al., *Computer*; U.S. IEEE Computer Society, Long Beach, Calif., U.S. vol. 18, No. 10, Oct. 1, 1985, pp. 15-30.

"Subscription Teletext for Value Added Services", Dr. G.T. Sharpless, IEEE Transactions on Consumer Electronics, Aug. 1985, vol. CE-31, No. 3, pp. 283-289.

"The Internet bookstore opens for business", Medford: Jul./Aug. 1994, vol. 11, Iss. 4; p. 21 (1 page).

"Using an ER Query and Update Interface for Rapid Prototyping of Hypertext Systems," Czejdo, B.; Proceedings of the Annual Hawaii International Conference on System Sciences; Jan. 1, 1990, pp. 227-236.

"A Store-and-Forward Architecture for Video-on-Demand Service," Gelman, A.D. et al., ICC Conference, 1991, pp. 842-846.

Dinaro, M. et al., "Markets and Products Overview," Revue HF Tijdschrift, 1991, vol. 15, No. 3/4, pp. 135-148.

Alexander Gelman, et al., "An Architecture for Interactive Applications", May 1993, pp. 848-852.

Boom, H., "An Interactive Videotex System for Two-Way CATV Networks,", 1986, vol. 40, No. 6, pp. 397-401.

"*Applied Cryptography Protocols, Algorithms, and Source Code in C*,"Schneier, Bruce; 1996 by John Wiley & Sons, pp. 34-44.

Azuma J., "Creating Educational Web Sites", IEE Communications Magazine, U.S. IEEE Service Center, Piscataway, N. J., vol. 37, No. 3, Mar. 1999, pp. 109-113.

Barnes, "10 Minute Guide to Windows 3.1., Alpha Books, 1992, pp. 60-64.

Basch, Reva, "Books Online: Visions, Plans, and Perspectives for Electronic Text", Online, Medford: Jul 1991, vol. 15, Iss. 4; pp. 13-23.

Bestler, C., "Flexible Data Structure and Interface Rituals for Rapid Development of OSD Applications", NCTA Technical Papers, pp. 223-236, Jun. 1993.

Broering, N. C., "The Electronic Library and IAIMS at Georgetown University", Policy Issues in Information and Communication Techniques in Medical Applications, 1988 Symposium Record, Sep. 29-30, 1988, pp. 27-29.

Chan, L. M., "Principles, Structure and Format", Immroth's Guide to the Library of Congress Classification, 4th Edition, 1990 Chapter 2, pp. 19-51.

Consumer Digest advertisement; "Xpand Your TV's Channel Capability;" Fall/Winter 1992; p. 215.

Daniel M. Moloney, "Digital Compression in Today's Addressable Environment;" 1993 NCTA Technical Papers Jun. 6, 1993; pp. 308-316.

DeBuse, R., "So That's a Book . . . Advancing Technology and the Library," Mar. 1988, Information Technology and Libraries, vol. 7, Issue 1, pp. 7-18.

Endo, K. et al., "Electronic Book in 3.5" Floppy Disk, Consumer Electronics, Digest of Technical Papers, IEEE 1994 International Conference on Jun. 21-23, 1994 pp. 316-317.

Fox E. A., et al., "Users, user interfaces, and objects: Envision, a Digital Library," Sep. 1993, Journal of the American Society for Information Science, vol. 44, issue 8, p. 480-491.

Schepers, C., "Für Geschlossene Benutzergruppen" Funkschau DE, Franzis-Verlag K.G. Munchen, No. 18, Aug. 25,1989, pp. S53-S54.

Great Presentations advertisement; "Remote, Remote;" 1987; p. 32H.

Hartley S et al.: "Enhancing Teaching Using the Internet"SIGCSE/SIGCUE Conference on Integrating Technology into Computer Science Education, US, New York, ACM, vol. Conf. 1, Jun. 2,1996, pp. 218-228.

Hong Kong Enterprise; Advertisement, "Two Innovative New Consumer Products From SVI," Nov. 1988, p. 379.

HP-41 C Operating Manual - A Guide for the Experienced User, Hewlett Packard Co., Jun. 1980.

"Applying Interactive Voice Response Technology in Psychiatric Practice", Sorce J. F. et al., Human Factors in Telecommunications; R. V. Decker's Verlag, Heidelberg, Germany, pp. 397-407.

Indian Patent Application 762-Cal-93.

Indian Patent Application 765-Cal-93.

Intner, S. S. et al., "The Dewey Decimal Classification", Special Libraries: A Cataloging Guide, 1998, Chapter 11, pp. 211-239.

John Reimer, "Memories in My Pocket;" BYTE; Feb. 1991; pp. 251-258.

Kubota H. et al.: "Terrestrial Data Multiplex Broadcasting News Delivery System and Its Terminal", IEE Transactions on Consumer Electronics, U.S., IEE Inc., New York, vol. 43, No. 3, Aug. 1, 1997, pp. 504-509.

Lewis, B.T. et al.; "Shared books: collaborative publication management for an office information system"; ACM SIGIOS Bulletin Conference sponsored by ACM SIGIOS and IEEECS TC-OA on Office information systems, vol. 9, Issue 2-3, Apr. 1988, pp. 197-204.

Mann et al.; "A coherent distributed file cache with directory write-behind" ACM Transactions on Computer Systems (TCOS), vol. 12, Issue 2, May 1994.

Miyazawa, M. et al., "An electronic book: Apt Book," Aug. 1990, Human-Computer Interaction, INTERACT '90, Proceedings of the IFIP TC 13 Third International Conference, Cambridge, UK, pp. 513-519.

O'Gorman, L., "Image and document processing techniques for the RightPages electronic library system", Conference B: Pattern Recognition Methodology and Systems, Proceedings, 11th IAP International Conference on Aug. 30-Sep. 3,1992 p. 260-263.

Olshansky R. et al., "Subscriber Distribution Networks Using Compressed Digital Video;" Journal of Lightwave Technology; Nov. 1992; vol. 10, No. 11, pp. 1760-1765.

Pobiak, B.C., "Adjustable access electronic books", Computing Applications to Assist Persons with Disabilities, 1992, Proceedings of the John Hopkins National Search for 1-5 Feb. 1992 pp. 90-94.

Raman, T.V., "Audio System for Technical Readings," May 1994, Cornell University, pp. 1-129

Rawlins, "The New Publishing - Technology's impact on the publishing industry over the next decade", Nov. 12, 1991, pp. 1-65.

Schatz, "Building an electronic scientific community", System Sciences, 1991. Proceeding of the Twenty-Fourth Annual Hawaii International Conference on vol. iii, Jan. 18-11, 991 pp. 739-748 vol. 3.

Simpson, Alan, Mastering Wordperfect® 5.1 & 5.2 for Windows, 1993, Sybex, Inc., pp. 72-73.

Soloview; "Prefetching in segmented disk cache for multi-disk systems" Proceedings of the fourth workshop on I/O in parallel and distributed systems: part of the federated computing research conference; May 1996.

Valauskas, Edward J, "Electronic books as databases", Database, Aug 1993. vol. 16, Iss. 4; p. 84-86.

* cited by examiner

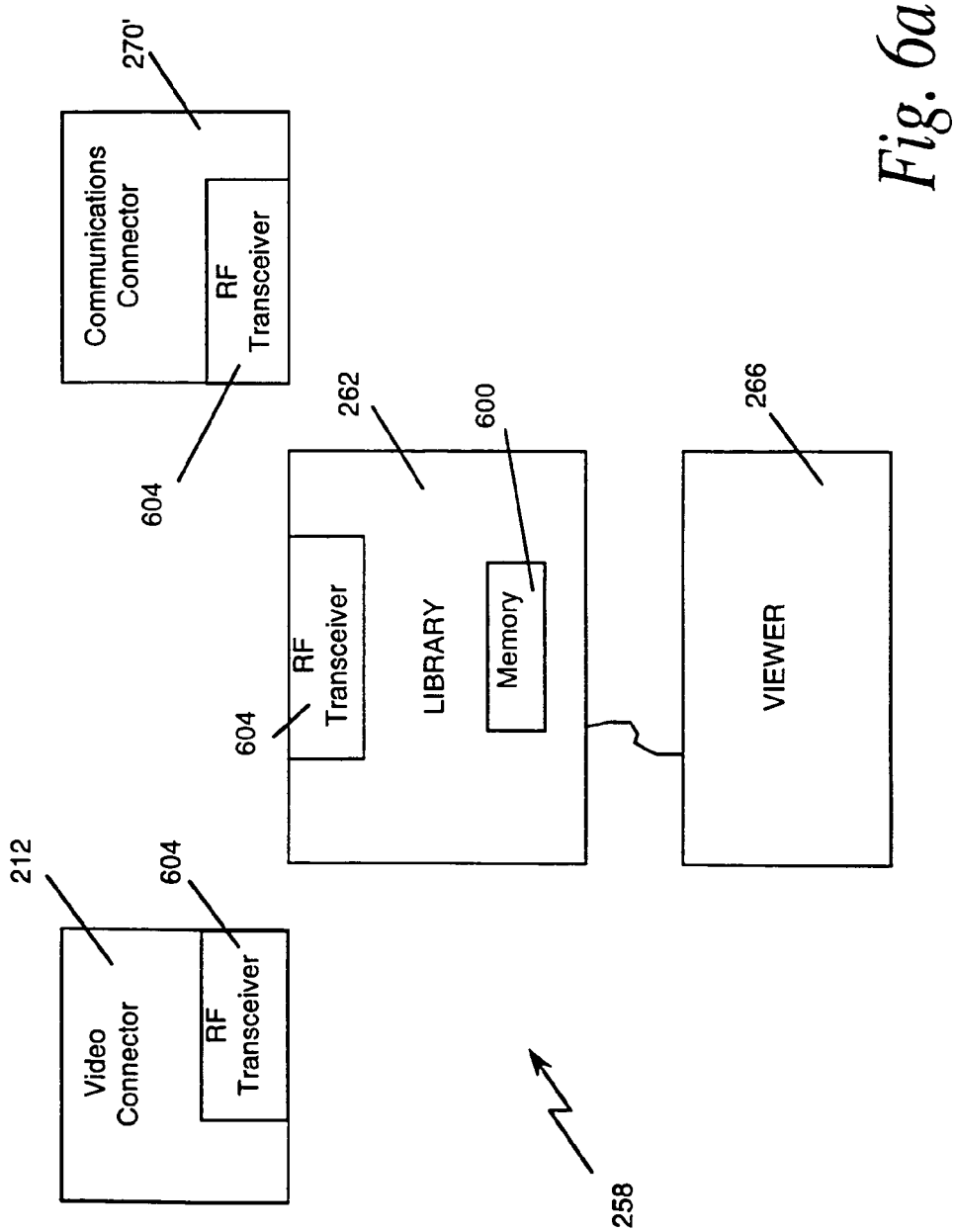

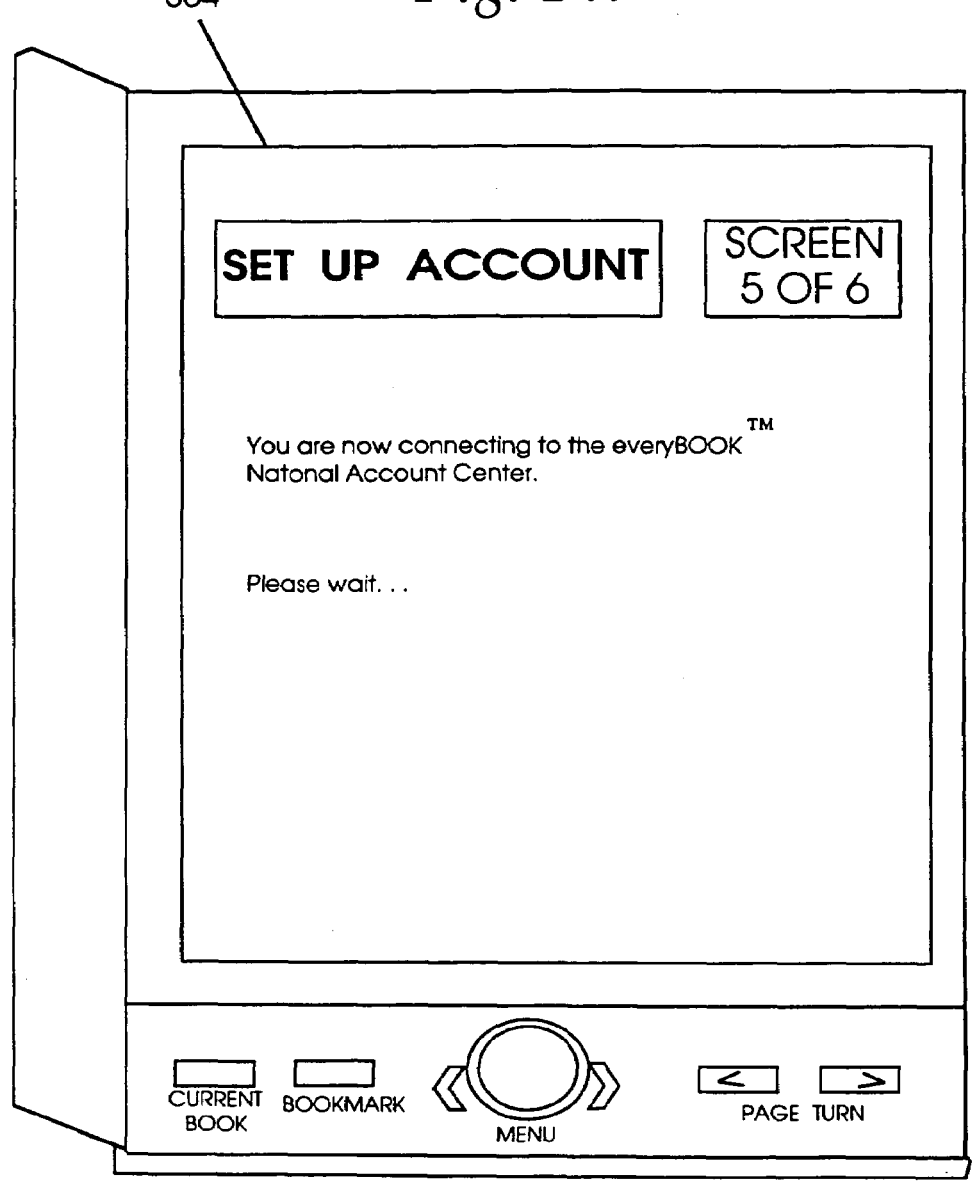

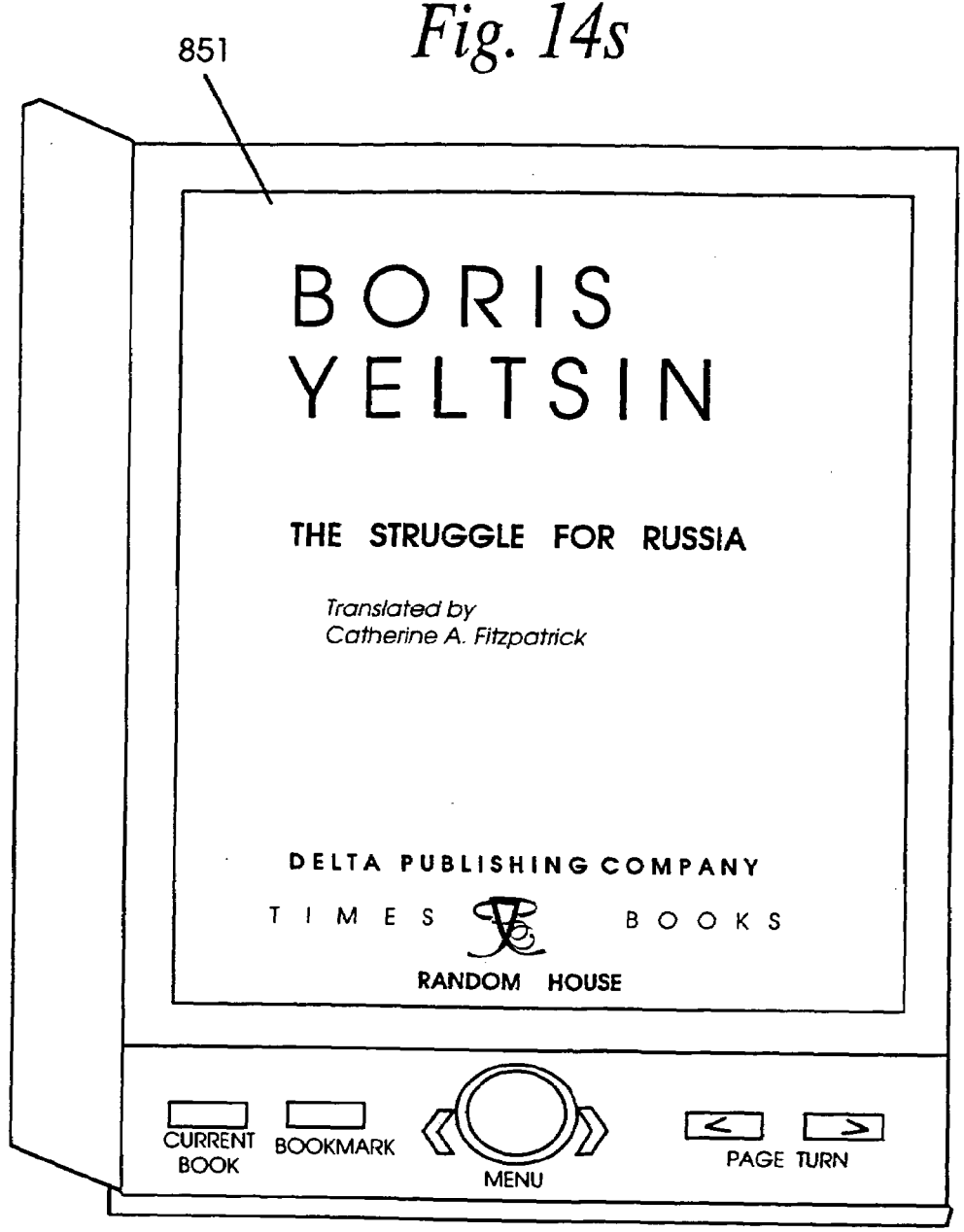

ELECTRONIC BOOK LIBRARY/BOOKSTORE SYSTEM

RELATED APPLICATIONS

This application is a continuation of U.S. application Ser. No. 09/237,825, filed Jan. 27, 1999, entitled ELECTRONIC BOOK SELECTION AND DELIVERY SYSTEM, which is a divisional of U.S. application Ser. No. 08/336,247, filed Nov. 7, 1994, now U.S. Pat. No. 5,986,690 entitled ELECTRONIC BOOK SELECTION AND DELIVERY SYSTEM, which is a continuation-in-part of U.S. application Ser. No. 07/991,074, filed Dec. 9, 1992, entitled REMOTE CONTROL FOR MENU DRIVEN SUBSCRIBER ACCESS TO TELEVISION PROGRAMMING and U.S. application Ser. No. 08/160,194, entitled ADVANCED SET-TOP TERMINAL FOR CABLE TELEVISION DELIVERY SYSTEMS, filed Dec. 2, 1993, now U.S. Pat. No. 5,990,927.

BACKGROUND OF THE INVENTION

Sparked by the concept of an information superhighway, a revolution will take place in the distribution of books. Not since the introduction of Gutenberg's movable typeset printing has the world stood on the brink of such a revolution in the distribution of text material. The definition of the word "book" will change drastically in the near future. Due to reasons such as security, convenience, cost, and other technical problems, book and magazine publishers are currently only able to distribute their products in paper form. This invention solves the problems encountered by publishers.

SUMMARY OF INVENTION

The electronic book selection and delivery system is a new way to distribute books to bookstores, libraries, and consumers. The technological breakthroughs of this invention provide a secure electronic system for both delivering selected books and receiving payments. The system has an unusual combination of features that provides the consumer with a daily use household appliance that has a high tech aura while being very practical, portable, and easy to use.

The clear advantage of the system is that it eliminates the distribution of any physical object such as a paper book or computer memory device from any book distribution system. The purchase of a book becomes a pay-per-read™ event avoiding the overhead, "middle-men," printing costs, and time delay associated with the current book distribution system. Published material and text such as the President's speech, a new law, a court decision on abortion, or O. J. Simpson's testimony can be made immediately available to the consumer at a nominal fee.

The system is a novel combination of new technology involving the television, cable, telephone, and computer industries. It utilities high bandwidth data transmissions, strong security measures, sophisticated digital switching, high resolution visual displays and user friendly interface software.

The primary components of the text delivery system are the subsystem for placing the text onto a video signal and the subsystem for receiving and selecting text that was placed on the video signal. The preferred embodiment of the system includes additional components and optional features that enhance the system. The system may be configured for use by bookstores, libraries, and consumers. The system for consumer use is made up of four subsystems, namely: (1) an Operations Center, (2) a video distribution system, (3) a home subsystem including reception, selection, viewing, transacting and transmission capabilities, and (4) a billing and collection system.

The Operations Center performs several primary functions: manipulating text data (including receiving, formatting and storing of text data), security encoding text, cataloging books, providing a messaging center capability, and performing uplink functions. The system delivers the text from the Operations Center to consumer homes by inserting data within analog video signals. The insertion of text is generally performed with a text generator and an encoder at an uplink site that is within or near the Operations Center. The system can be several lines of the Vertical Blanking Interval (VBI), all the lines of the analog video signal, or a digital video signal to transmit text data. Using the VBI delivery method, the top ten or twenty book titles may be transmitted with video during normal programming utilizing existing cable or broadcast 2 transmission capability without disruption to the subscriber's video reception. Using the entire 3 video signal, thousands of books may be transmitted within just one hour of air time. Nearly 4 any analog or digital video distribution system may be used to deliver the video signal with included text.

The Operations Center may provide electronic books to an intermediate distribution point such as a library or a bookstore, for example. A library may store thousands of electronic book files for lending to its customers. The library may employ file server technology to store and catalog the electronic books. Electronic books supplied by the library may include a time out feature that disables viewing of the electronic book at a specified time. The library may be limited in the number of copies of a particular electronic book that can be lent out at one time. The electronic book viewer may be limited in the number of library-supplied electronic books that can be stored on the viewer at one time.

The billing and collection system performs transaction management, authorizations, collections and publisher payments automatically utilizing the telephone system.

The electronic books may be distributed to consumers and used or viewed in conjunction with an electronic book menu system. Data used to generate the menus may be distributed with the electronic books, such as in the VBI. Alternatively, the menu data may be provided using an alternative delivery path. The electronic book menus may include submenus displaying electronic books available from the Operations Center. Other submenus may display title and other book information for electronic books on a home subsystem. Still other submenus may be used to establish an account to order and pay for electronic books, to provide previews of electronic books, and to provide biographical sketches of authors of electronic books.

DESCRIPTION OF THE DRAWINGS

FIG. 6*a* is a block diagram of the hardware configuration for a four component home subsystem.

DETAILED DESCRIPTION

Figure 1:
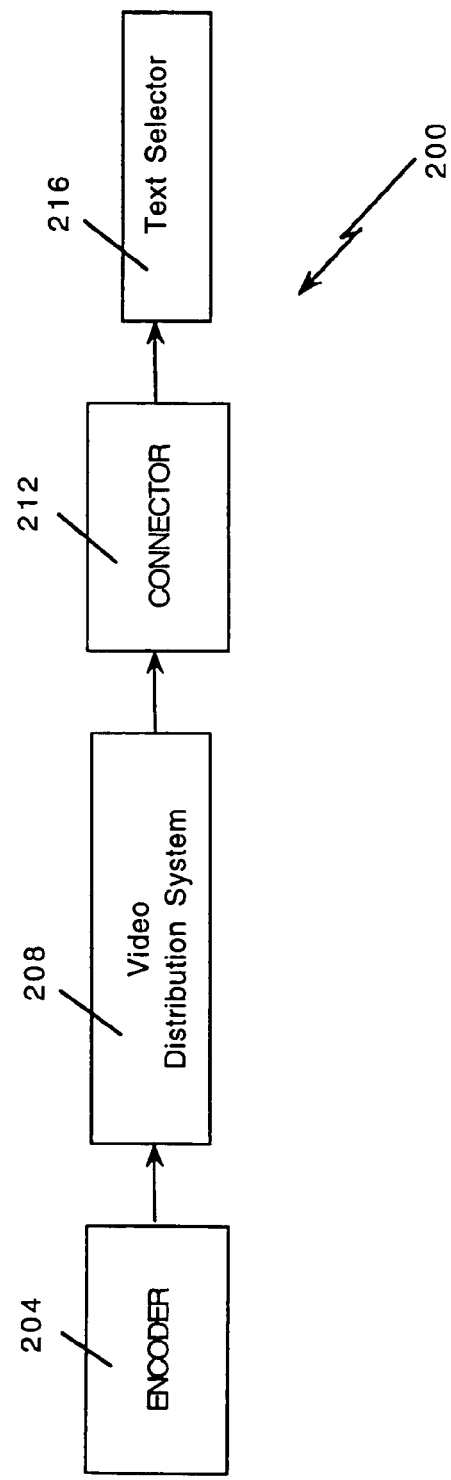
FIG. 1 is a block diagram of the primary components of the electronic book selection and delivery system.

The primary components of the electronic book selection and delivery system 200 are an encoder 204, a video distribution system 208, a connector 212, and a text selector 216 as shown in FIG. 1. The encoder 204 places textual data on a video signal to form a composite signal. A variety of equipment and methods may be used to encode text data onto a video signal. The video distribution system 208 distributes the video signal from the single point of the encoder 204 to multiple locations which have connectors 212. The connector 212 receives the digital or analog video signal from the video distribution system 208 and separates, strips or extracts the text data from the composite video signal. If necessary, the extracted text data is converted into a digital bit stream. Text selector 216 works in connection with the connector 212 to select text.

Using a connector 212 and text selector 216 combination, various methods of selecting and retrieving desired text from a composite or video signal are possible. Text may be preselected, selected as received or selected after being received and stored. The preferred method is for the connector 212 to strip all the text from the video signal and have the text selector 216 screen all the text as received from the connector 212. The text selector 216 only stores text in long term or permanent memory if the text passes a screening process described below.

Figure 2:
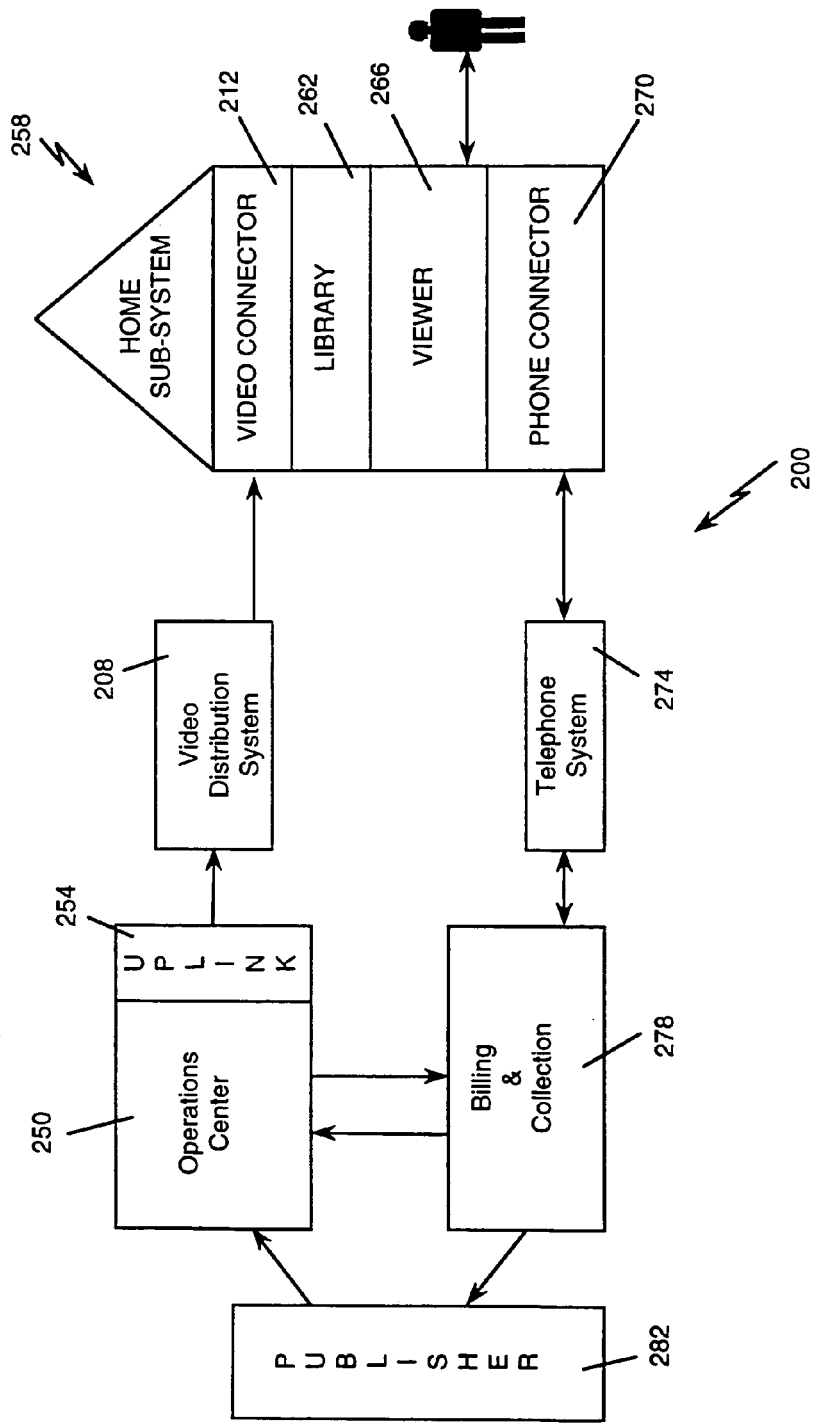
FIG. 2 is a schematic showing an overview of the electronic book selection and delivery system.

An overview of a preferred embodiment is shown in FIG. 2. The system 200 includes: an operations center 250 including an uplink site 254, a video distribution system 208, a home subsystem 258 including a video connector 212, a library 262, a viewer 266, and a phone connector 270, and telephone system 274 and a billing and collection subsystem 278. The operations center receives textual material from outside sources 282 such as publishers, newspapers, and on-line services. The operations center receives this textual material in various digital formats and converts them to a standard compressed format for storage. In so doing, the operations center creates a pool of textual material that is available to be delivered to the home system. Normally, the text material is grouped by books or titles for easy access. The operations center includes an uplink site for placing the text onto a video signal and sending the composite video signal into a video distribution system. The uplink site would generally include an encoder (not shown in FIG. 2) to encode the text onto a video signal.

Many analog and digital video distribution systems 208 can be used with this text delivery system 200, such as, cable television distribution systems, broadcast television distribution systems, video distributed over telephone systems, direct satellite broadcast distribution systems, and other wire and wireless distribution systems. Nearly any distribution system which can deliver a video signal will work with the text delivery system. It is also possible to distribute the text without using a video signal as described below.

The home subsystem performs five primary functions, (1) connecting with a video distribution system, (2) selecting data, (3) storing data, (4) displaying data, and (5) handling transactions. An important optional function of the home sub-system is communicating using a telephone communication system. The home subsystem is made up of primarily four parts: a video connector 212 or similar type of connector for connecting with a video distribution system, a library unit 262 for storing and processing, a viewer unit 266 for viewing menus and text and a telephone connector 270 for connecting with a telephone communications system 274.

The billing and collection subsystem 278 may be co-located with the operations center 250 or located remote from the operations center. The billing and collection subsystem 278 is in communication with the home subsystem via telephone-type communication systems. Any of a number of telephone type communication systems, such as, a cellular system, will operate with the billing and collection system. The billing and collection system records the books or portions of text that are selected or ordered by the subscriber. The collection system will charge a subscriber's credit account or bill the subscriber. In addition, the billing and collection system will monitor that amount due to publishers or other outside sources 282 who have provided textual data or other services such as air time to enable the text delivery system 200 to operate.

Figure 3:
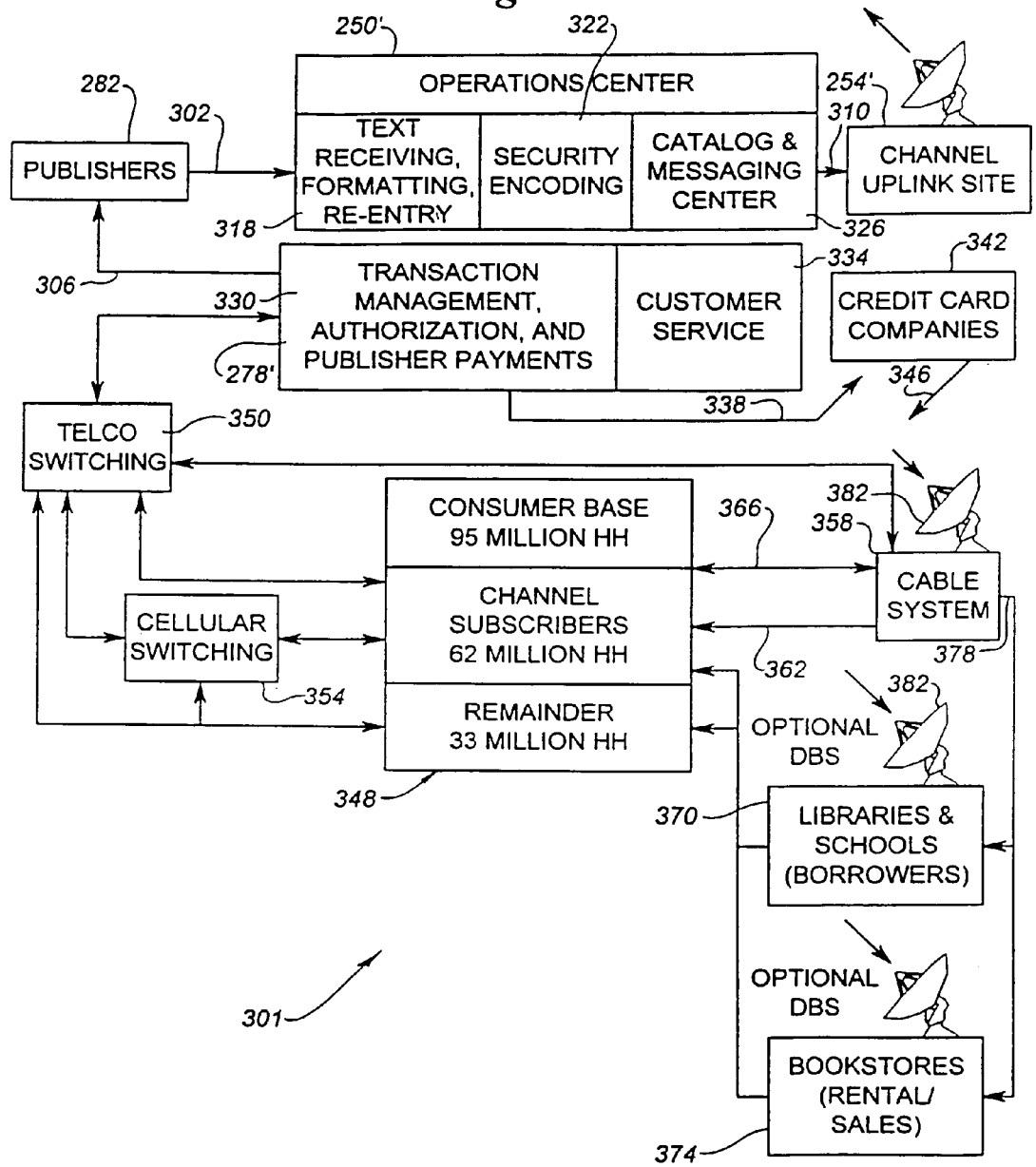
FIG. 3 is a schematic of the delivery plan for the electronic book selection and delivery system.

FIG. 3 is an expanded overview of a preferred delivery plan for the electronic book selection and delivery system. It is a comprehensive delivery plan to support various types of users and various billing systems. FIG. 3 shows that publishers 282 will provide text transfer 302 to the operations center 250' and receive payments 306 from the billing and collection system 278'. A separate channel uplink site 254' is shown in this configuration receiving data 310 from the operations center 250'. The operations center 250' has three separate sections (318, 322, 326) one for text receiving, formatting and re-entry 318, a second for security encoding 322 and a third section for catalog and messaging center functions 326.

The collection and billing system 278' shown has two sections (330, 334) one for transaction management, authorizations and publisher payments 330, and the other for customer service 334. The customer service section 334 provides for data entry and access to customer account information. Transaction accounting information 338 is supplied to credit card companies 342 by the transaction management section 330 of the billing and collection system 278'. The credit card companies 342 provide billing 346 to customers either electronically or by mail.

Three methods for communicating between the subscriber base 348 and the billing and collection system 278' are shown: by telephone switching 350 alone, cellular switching 354 and telephone switching 250 combined, and by use of the cable system 358 and the telephone switching 350. The system shown supports both one-way 362 and two-way cable communication 366 with subscribers. Libraries and schools 370 as well as bookstores 374 may use the delivery system.

Libraries and schools 370 would have a modified system to allow the viewer to be checked-out or borrowed while bookstores 374 would rent or sell the viewer and sell electronic book data. The bookstores 374 as well as the libraries and schools 370 may be serviced by cable 378. Optional direct broadcast systems (DBS) 382 can also be used with the system 200.

I. The Operations Center

Figure 4:
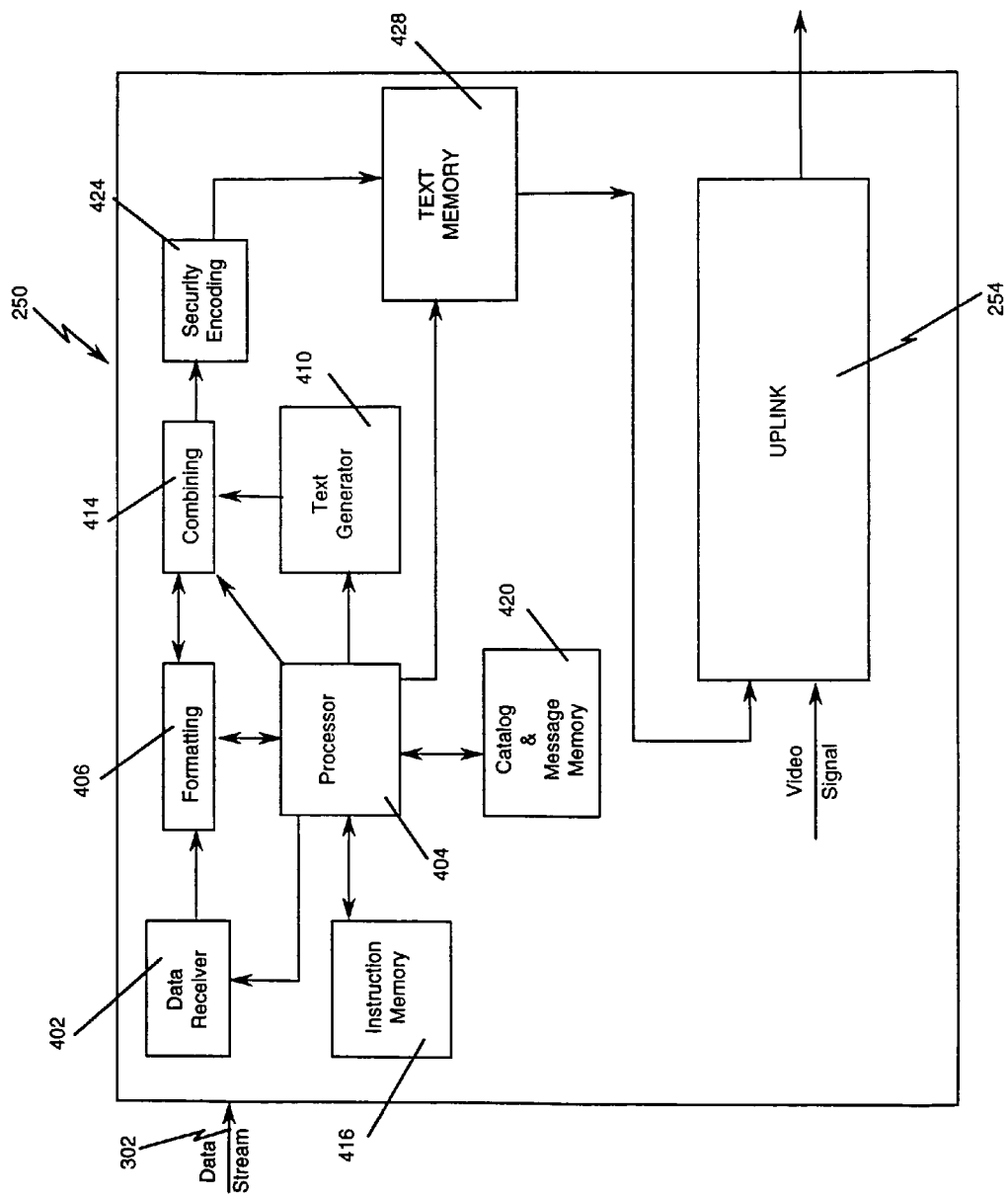
FIG. 4 is a block diagram of the operations center.

FIG. 4 is a schematic of an operations center 250 which includes an uplink 254. The Operations Center 250 gathers text or books by receiving, formatting, storing, and encoding. A data stream 302 containing text is received at the operations center by a data receiver 402. The data receiver 402 is under the control of a processor 404. After reception, the data stream is formatted using digital logic for formatting 406 which is also under the control of the processor 404. If any additional text is being generated at the operation center locally for insertion into the distributed signal, the text generation is handled through text generator hardware 410 which may include a data receiver and a keyboard (not shown). Following processing by the text generator, the additional text can be added to the text received the combining hardware 414 that includes digital logic circuitry (not shown).

The processing at the operations center is controlled by a processor 404 which uses an instruction memory 416. The processor and instruction memory may be supplied by a personal computer or mini-computer. To perform the catalog and messaging functions, the operations center uses a catalog and message memory 420 and the text generator 410 if necessary.

The data stream of text, catalog and messages is preferably encoded by a security ending prior to being sent to the uplink module 424. Various encoding techniques may be used such as the commercial derivative of NSA's encryption algorithm, Data Encryption System (DES), and General Instrument's DigiCipher II may be used by the security encoding module 424. Following encoding, the encoded text may be stored in text memory 428 prior to being sent the uplink 254. It is preferred that a first-in-first-out text memory arrangement is used under the control of the processor 404. Various types of memory may be used for the text memory 428 including RAM. The operations center may use file server technology for the text memory 428 to catalog and spool books for transmission as is described below.

To transmit textual data, the delivery system uses high bandwidth transmission techniques such as those defined by the North American Broadcast Teletext Standard (NABTS) and the World System Teletext (WST) standard. Using the WST format (where each line of the Vertical Blanking Interval contains 266 data bits), a four hundred page book, for example, may be transmitted during programming using four lines of the Vertical Blanking Interval at a rate of approximately one book every 1.6 minutes (63,840 bits per second). Alternatively, books may be transmitted over a dedicated channel, which interrupts programming so that 246 lines of video can be used to transmit approximately 2,250 books every hour (3.9 Mbits per second). A teletext type format is the simplest but possibly the slowest text format to use with the system. In either event, an encoder is utilized at an uplink site to insert textual data into the analog video signal. In many other respects, the delivery of the textual information is completed using existing cable television plants and equipment.

Figures 5A, 5B:
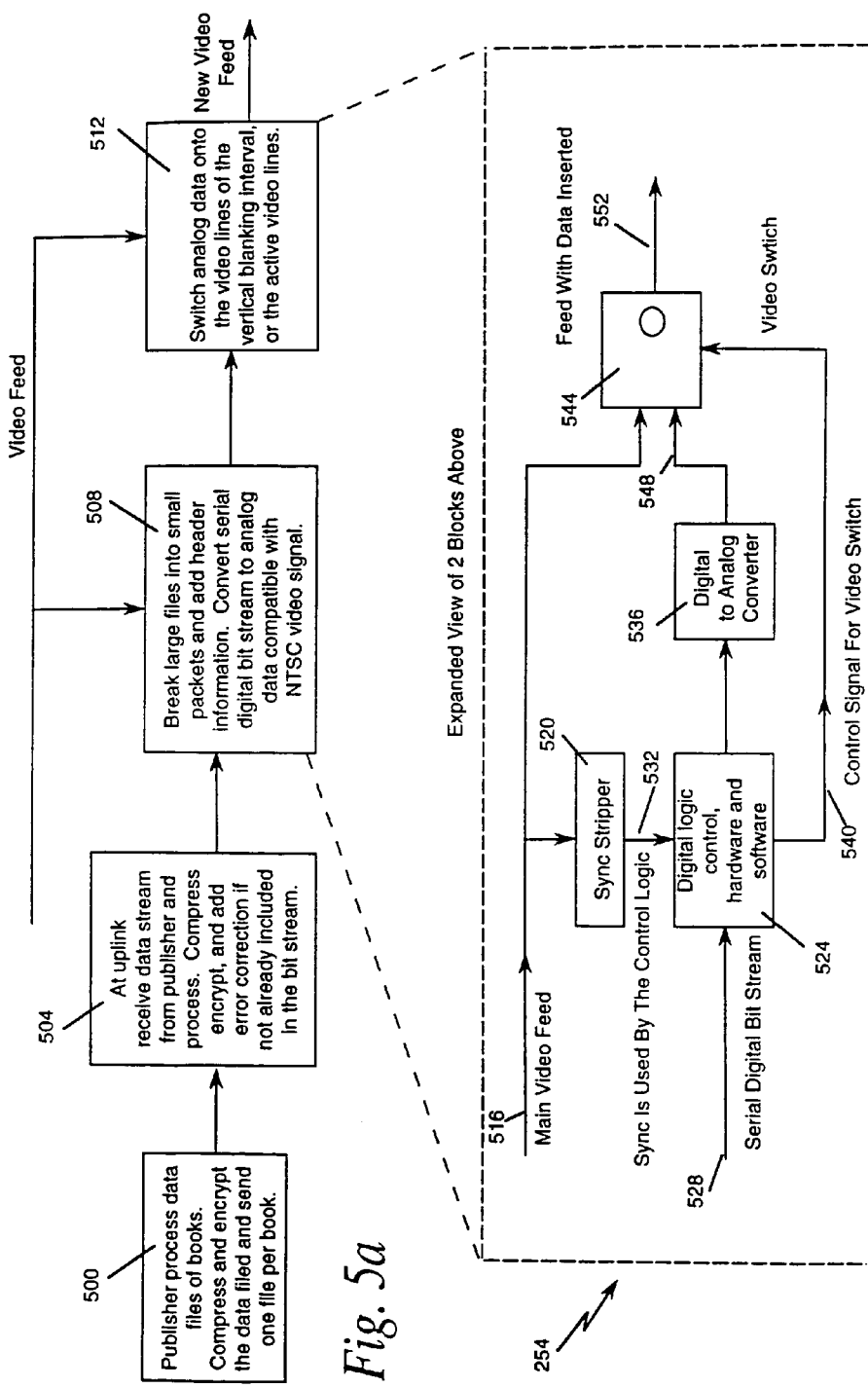
FIG. 5*a* is a flow diagram of the processing at the operations center and uplink.
FIG. 5*b* is a block diagram of the hardware configuration for an uplink site.

FIG. 5a is a flowchart of the steps involved in processing text from the publisher or provider 282 that occurs at the operations center 250. As shown in block 500, the publisher 282 processes data files of text for books, compresses, encrypts and sends the data files to the operations center or uplink. Text files for books are preferably sent one book at a time. As shown in block 504, the uplink 254 or operations center 250 receives and processes the data stream from the publisher 282. Generally, part of this processing includes encryption and error correction.

As shown in block 508, files are broken into smaller packets of information. Header information is added to the packets. The bit stream is converted from a serial digital bit stream to an analog bit stream that is compatible with an NTSC video signal. Block 512 shows the switching of analog data into the video lines of a video signal. The analog data is either placed in the VBI or the active video lines.

FIG. 5b is an example of a hardware configuration to perform some of the functions for blocks 508 and 512. A video feed 516 is received and processed through a sync stripper 520. The sync signal 532 stripped is used by the digital logic control 524. The digital logic control 524 receives the sync signal 532 and a serial digital bit stream 528 for processing. The digital logic control 524 passes the serial digital bit stream to the Digital to Analog converter 536 and outputs a control signal 540 for the video switch 544. The video switch 544 integrates the video feed 516 and analog data stream 548 into a video feed with analog data signal inserted 552.

As an alternative to cable or television delivery methods, the telephone system may be used to transmit books to the subscribers. An average book would take about 7 minutes to transmit over the public telephone system. Using the telephone system, it is not necessary to combine video and text into a composite signal. In most other respects, the operation center would remain similar whether text delivery was by telephone or cable. It is preferred that file server technology (such as that described in U.S. Pat. No. 5,262,875, entitled AUDIO/VIDEO FILE SERVER INCLUDING DECOMPRESSION/PLAYBACK MEANS, issued to Mincer, et al., and, U.S. Pat. No. 5,218,695, entitled FILE SERVER SYSTEM HAVING HIGH-SPEED WRITE EXECUTION, issued to Noveck, et al., incorporated herein by reference) be used at the operation center with a telephone system text delivery method.

II. The Home Subsystem

Figure 6B:
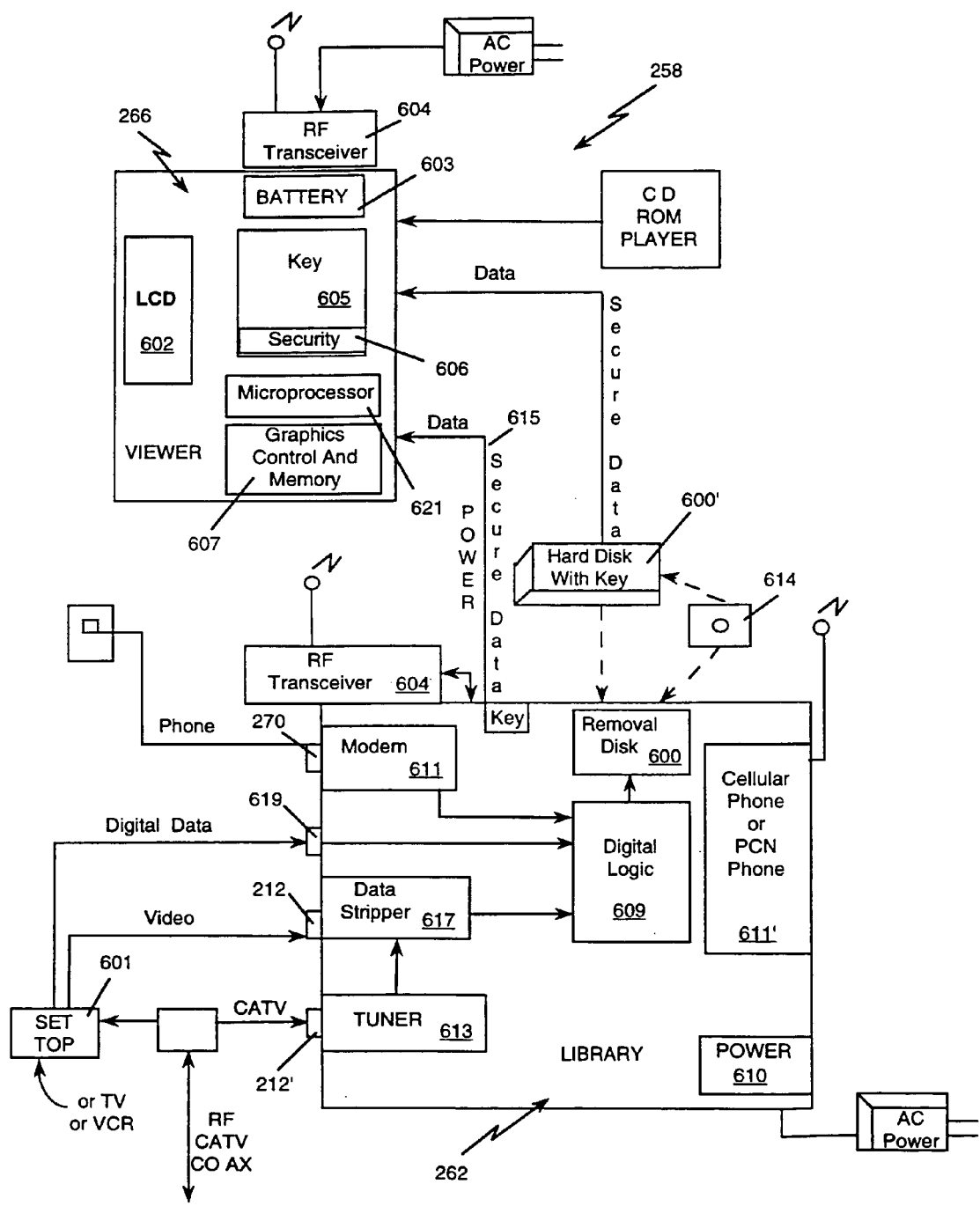
FIG. 6*b* is a schematic of a two unit home subsystem.

The hardware configuration for a four component home subsystem 258 is shown in FIG. 6a. FIG. 6b shows a hardware configuration for a two component home subsystem. The home subsystem 258 performs several functions, such as receiving data and video transmissions, stripping the data from the video signal, screening and storing the data, providing user friendly interface software, displaying menus and text, processing transactions, initiating telephone calls and transmitting billing data. Various hardware configurations may be utilized to achieve the desired functions of the home subsystem. For example, as shown in FIG. 6b, the home subsystem can be configured to utilize the reception and channel tuning capability of the current installed subscriber base of cable converter boxes and televisions 601. The home subsystem can also be designed as an advanced set top terminal converter box with menu generation capability, electronic memory and a telephone modem as described in section V below.

The electronic components which make up the home subsystem can be arranged in a variety of ways. In the four unit subsystem of FIG. 6a the viewer 266 and library 262 are wired together while the remaining components communicate through RF transceivers 604. In the simplest version of the home subsystem there are only two units, a library 262 and a viewer 266. FIG. 6b shows a two unit home subsystem with certain optional features. The viewer 266 is generally equipped with a high resolution viewing area 602, digital logic (including a key 605, security 606, and a microprocessor 621), video graphics control and memory 607, power supply circuitry 602 (not shown), an optional battery 603 and an optional RF transceiver 604. In a two unit arrangement, the library 262 contains the connector function to the video distribution system, connector function to a public telephone communications system, and memory 600 (which may be removable and portable 600'). More specifically, the library would include data stripping functions 617, digital logic 609, memory storage 600, power circuitry 610, optional telephone connections 611 (including cellular or PCN 611'), optional battery (not shown), optional tuner module 613 and an optional RF transceiver 604. The video connector 212 and the public telephone system connection 270, as well as the removable portable memory unit 600 of the library may be broken out into separate components. (FIG. 6b shows a removable portable hard disk memory 600' with removable cartridges 614.) Therefore, the home subsystem may have as many as five separate components which communicate with each other. The two, three, four or five separate components which make up the home subsystem can communicate with each other in a variety of ways, including hardwired connection 615, RF transceiver 604 and other wireless methods.

RF communications are preferred in the home because it allows the separate components to be located throughout the home without restriction.

The data communicated between the units is preferably secure data. In addition, the library 262 may provide power to the viewer 266 through the hard wire communication link 615.

To receive and strip the data from the video signal at the consumer's home, either a cable interface device or cable connector is used. The cable connector device includes a tuner 613, while the cable interface device makes use of existing tuning equipment in the home. In either configuration, data is stripped from the video signal and stored at the subscriber's location in the library 262. The phone connector 270, and modem 611 initiate telephone calls and transmit ordering and billing information to the Operations Center or billing and collection system. The home library 262 is the intelligent component of the home subsystem, incorporating the hardware and software necessary to store the text data, generate menus and effect the purchase transactions. In addition to an RF transceiver 604, the home library 262 also includes the necessary jacks and connections to allow the system to be connected to the viewer 266. As shown in FIG. 6b, the library communicates the text data to the viewer in a secure format which requires a key 605 for decryption. The text is generally only decrypted page by page just before viewing.

a. The Video Connector

Figure 7:
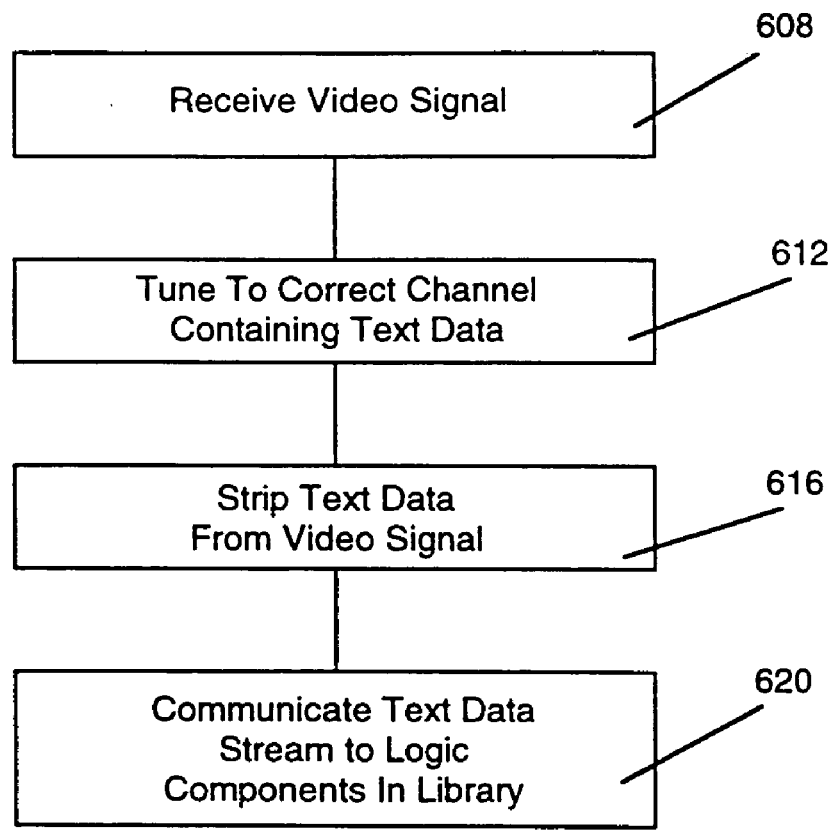
FIG. 7 is a flow diagram of the processes performed by the video connector.

FIG. 7 shows the flow of the processes performed by the video connector 212. The video connector receives the video signal 608, tunes to the channel containing the text data 612, strips the text data from the video signal 616, and communicates the text data stream to logic components in the library 620.

The connection to the video distribution system is preferably a cable connector to a cable television delivery system, as shown in FIG. 6b. The cable connector includes a data stripper circuit 617, which accepts video input from either a set top converter, TV or VCR 601, or an optional tuner block 613 that receives the CATV signal through the cable connector 212'. The data stripper circuit 617 strips data out of the video, and outputs a digital bit stream to the digital logic portion 609 of the library unit 262. The data is embedded in the video signal either in the vertical blanking interval or the active video portion in an encrypted and compressed format. The data stripper circuit 617 can be placed inside the set top converter box 601, TV, or in the library unit. The data stripper circuit 617 outputs the digital bit stream to be used by the library digital logic 609.

The video connector 212 may also contain a channel tuner module 613 that can tune to the video channel and provide access to the video that contains the data to be stripped. Using the optional tuner module 613, a set top converter, VCR, or TV tuner is not needed in the home subsystem. The optional tuner module 613 would instead receive the CATV signal directly through the cable connector 212'.

b. Library

Figure 8:
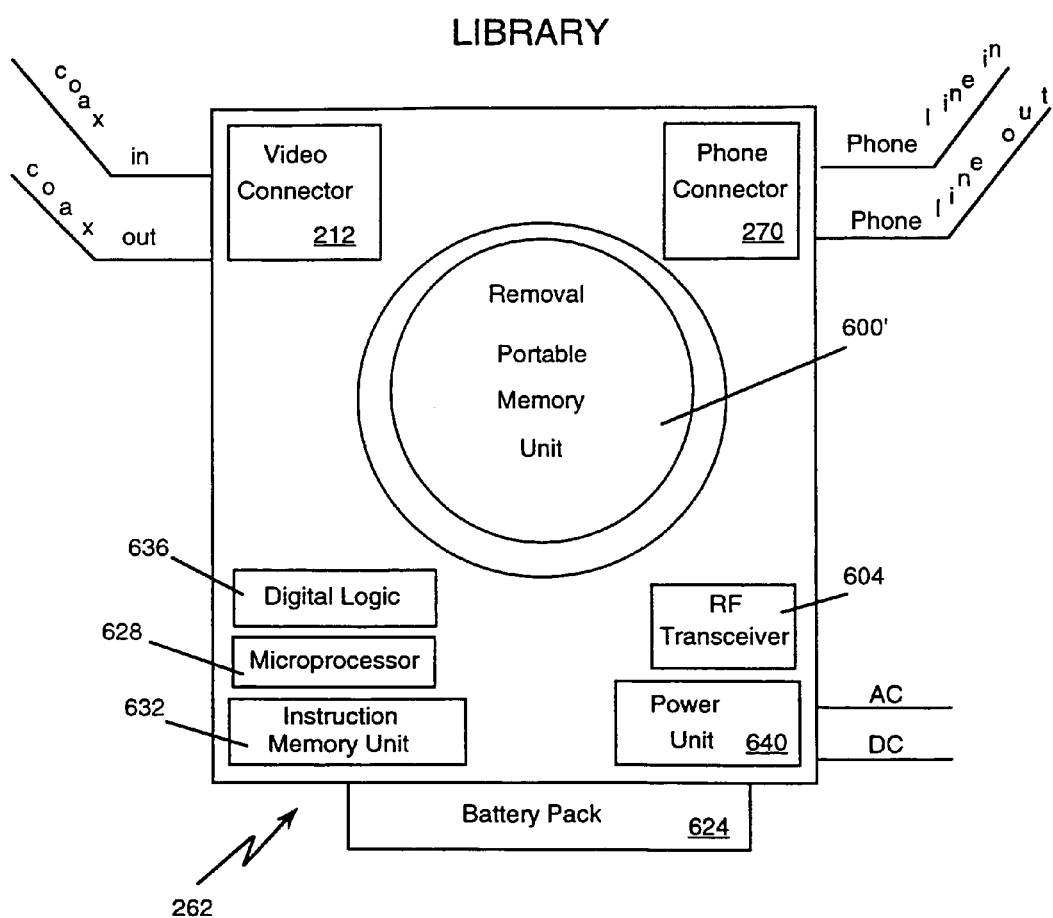
FIG. 8 is a block diagram for an example of a library unit.

An embodiment of the library 212 for a two unit home subsystem is shown in both FIG. 6b and FIG. 8. The embodiment shown includes the following optional parts the video connector 212, phone connector 270, RF transceiver 604, and battery pack 624 in addition to a removal portable memory 600', microprocessor 628, instruction memory unit 632, digital logic 636, and power unit 640.

The library 262 contains a digital logic section 609 (not shown in FIG. 8) which includes the microprocessor 628, the digital logic 636 and the instruction memory unit 632. The microprocessor 628 is preferably a secure microprocessor such as the Mot SC21 device sold by Motorola. The digital logic section 609 will receive the serial digital bit stream from the data stripper circuit 617 and process the data. Error correction will also be performed by the digital logic section 609 and the data will be checked for proper address. If the address of the data is correct and the library 262 is authorized to receive the data, the data will be transferred to the memory storage unit 600, 600'. Authorization to receive the data is provided by the cable headend or another distribution point. An authorization code may be sent in the serial digital bit stream. The digital logic section 609 will send appropriate text and graphical data to the memory storage unit 600, 600'. It transfers this data in a compressed and encrypted format and the data remains stored in a compressed and encrypted format.

i. Memory Storage Unit

The memory storage unit of the library is preferably a removable portable memory unit 600 (as shown in FIGS. 6a, 6b and 8). A variety of options are available for memory storage: a hard disk drive, such as an 80 megabyte, a 200 megabyte, a hard disk with removable platters, and CD ROM. Referring to FIG. 6b, a hard disk drive unit 600' which contains removable platters may also be used. This would provide virtually unlimited library storage capacity. Data will be stored in the memory storage unit in a compressed and encrypted format. As is also shown in FIG. 6b, the data will also contain a key or unique ID number that matches the ID or key of the viewer 266. This matching of a unique key or ID number prevents unauthorized transfer of text data from the memory storage unit to an unauthorized viewer. Small memory devices such as smart cards, electronic memory cards or PCM CIA cards (personal computer memory card industry association) may also be used to store the data.

ii. Power Circuitry

As shown in FIGS. 6b and 8, the library 262 will accept power from either AC wall power or optional battery power. It is preferred that the power circuitry provide all the voltage necessary from either the battery 624 or AC unit for the various circuitry in the library. Preferably the power circuitry will also provide power to the viewer through a single data cable when connected to the viewer. The power circuitry will recharge the battery using AC power when in operation. With the optional battery unit 624 installed, the library 262 becomes a portable unit and can still provide power to the viewer 266. In order to extend battery life, power conservation measures may be utilized, such as shutting down the memory system when not in use. When the viewer unit 266 is being utilized and the library circuitry is not being utilized, virtually all power may be shut down to the library 262.

iii. Connection to the Public Telephone System

The connection to the telephone system is preferably provided by a modem 611. Various available modems may be used to perform this function. As shown in FIG. 6b, cellular phone or PCN phone connections 611' may also be provided. When the home subsystem is first initialized, the modem will be used to transfer the name and credit card information of the consumer to the billing and collection subsystem. The telephone connection 270 may be utilized each time a book is purchased by a consumer to complete and record the transaction. The telephone connection 270 may also be used as a means for receiving the text data from the operations center, by-passing the video distribution system. The phone connection 270 may be a separate unit as shown in FIG. 6b.

iv. Library Processing

Figure 9:
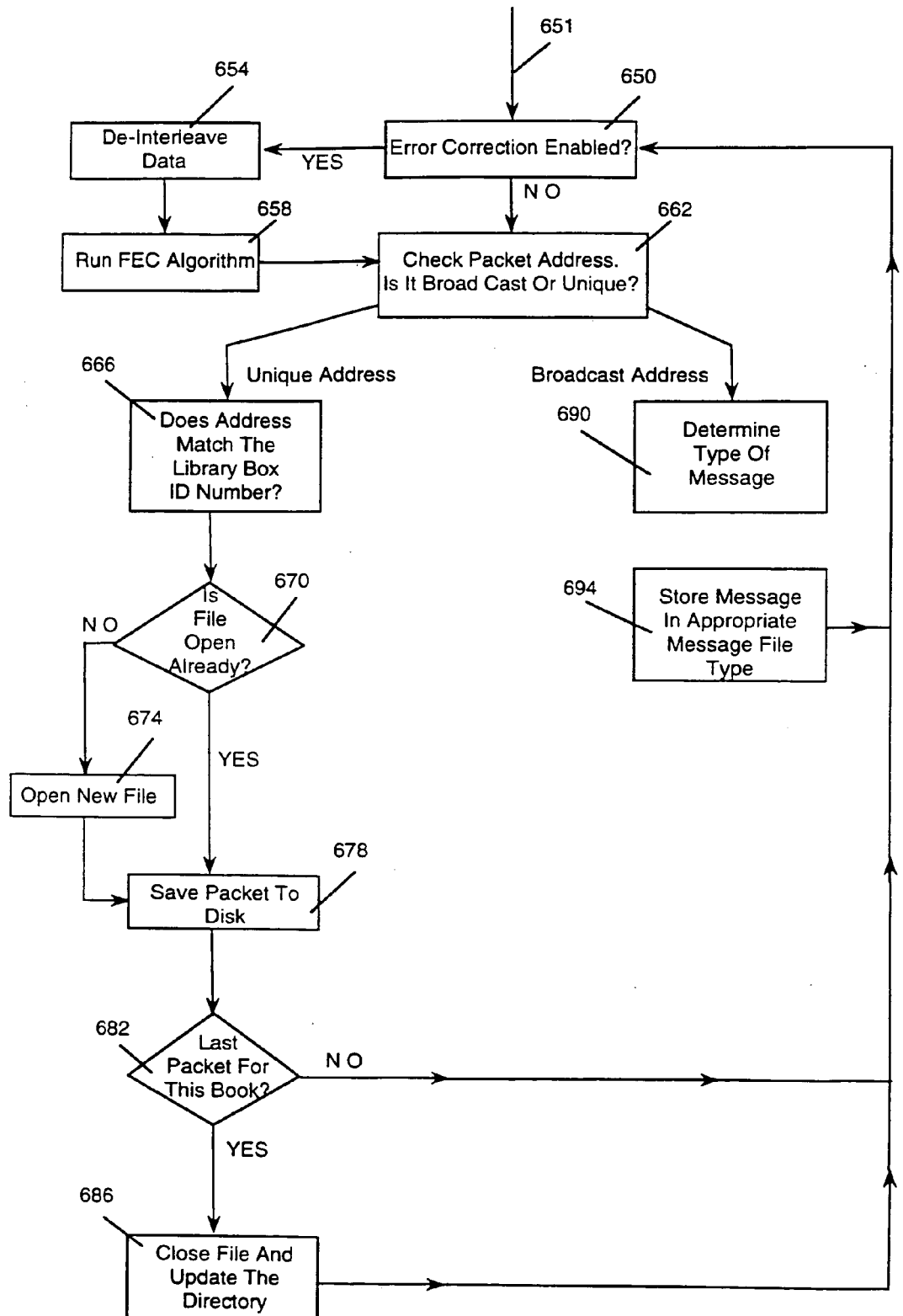
FIG. 9 is a flow diagram of some of the processes performed by the library on the received data stream.

FIG. 9 shows an example of some basic processing performed by the library 262 on the data stream received from the video connector 212 or stripper circuit 617. First the data stream is checked for error correction by block 650. If an error is detected, block 654 de-interleaves the data followed by block 658 running a FEC (Forward Error Correcting) algorithm. The combination of block 650, 654 and 658 perform the error correction needed on the data stream. If no error correction is necessary the data proceeds to block 662 where packets are individually checked for packet address.

If the address is a unique address, block 666 checks whether the address of the packet matches the library box ID number. The library box ID number is a unique number associated with that library 262 which is used to ensure security of the data. Block 670 determines whether an electronic file has already been opened into which the data packet can be saved. If no data file has been opened then block 674 opens a new data file for that packet. If an electronic file has been opened, then the packet is saved in that electronic file on disk, block 678. Next, the process checks to see if this is the last packet for a particular book for a particular textual data block being received 682. If it is the last packet of information, then the electronic file is closed and the directory of available electronic files is updated 686. Following either block 682 or 686, the process returns to receive another data packet from the data stream received from the data stripper block.

With the packet address is checked and the address is determined to be a broadcast address, the process determines the type of message that is being sent 690. The message is then stored in appropriate electronic message file 694 and the process is returned to block 650 to receive another data packet and perform another error check.

Using the process of FIG. 9, the library is able to receive, store and update directories related to the textual data and graphical data that can be used to depict pictures in a given book. Variations of the processes are possible depending on the format of the data and operating system of the library 262.

Figure 10:
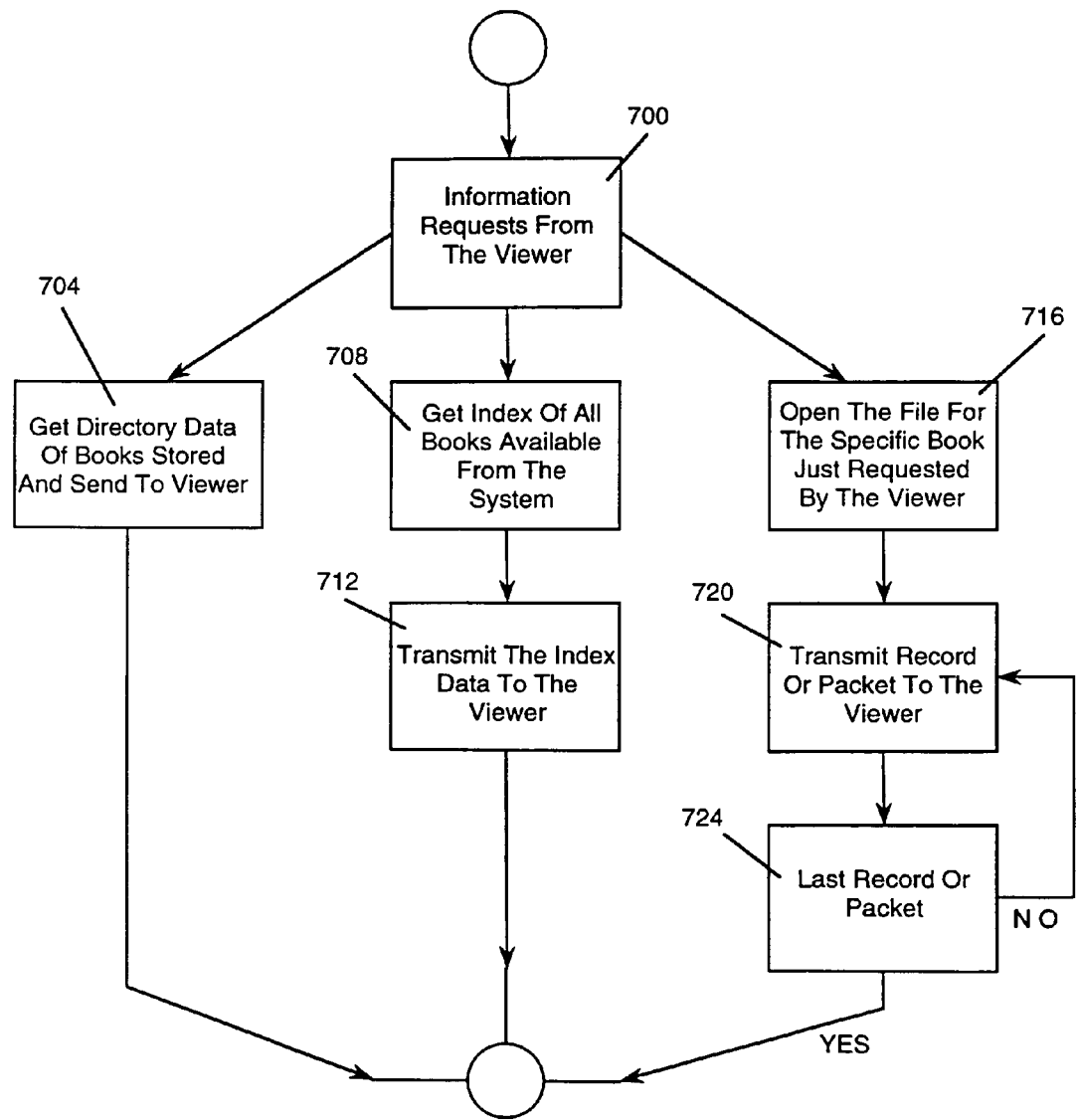
FIG. 10 is a flow diagram of the processes performed by the library unit on information requests from the viewer.

FIG. 10 shows an example of the processing of information requests from the viewer 266 at the library 262. Information requests from the viewer 266 are received either through the cable connecting the viewer 266 to the library 262 or through wireless transmissions such as RF. It is possible in some embodiments for subscribers' requests to come from a set top converter box 602.

Information requests received from the viewer 266 generally fall into three categories: (1) directory data of books stored in the library 262, (2) index of all available books on the system, and (3) requests for a specific book (Block 700). Process block 704 answers a request from the viewer 266 for a directory of data showing the books stored at the viewer 266. The directory of data is sent to the viewer 266 so that it may be displayed to the subscriber. Process block 708 handles requests from the viewer 266 for an index of all available books on the system. The library 262 will obtain an index of all the available books on the system and transmit that index, process 712, with menu information to the viewer box. Process block 716 replies to a request from the viewer 266 for a specific book. The library the record or transmits the information on a packet-by-packet basis to the viewer, 720. This process of transmitting the specific book, record, or packets to the viewer continues until the last record or packet has been sent, 724.

In addition to the processes shown on FIG. 10 in handling a request for a specific book, the library 262 also orders and receives specific books from the operations center 250 using the process as described in 716. Following a request for a specific book which is not stored at the library 262, the library 262 will proceed to determine the next available time the book will be on the video distribution system 208 and ensure reception and storage of that book (process not shown). In performing this process the library 262 will transmit to the viewer information on when it will obtain the text data for the book so that the subscriber may view the book. In addition to timing information, price and other ordering information may also be passed by the library unit 262 to the subscriber.

c. The Viewer

Figure 11:
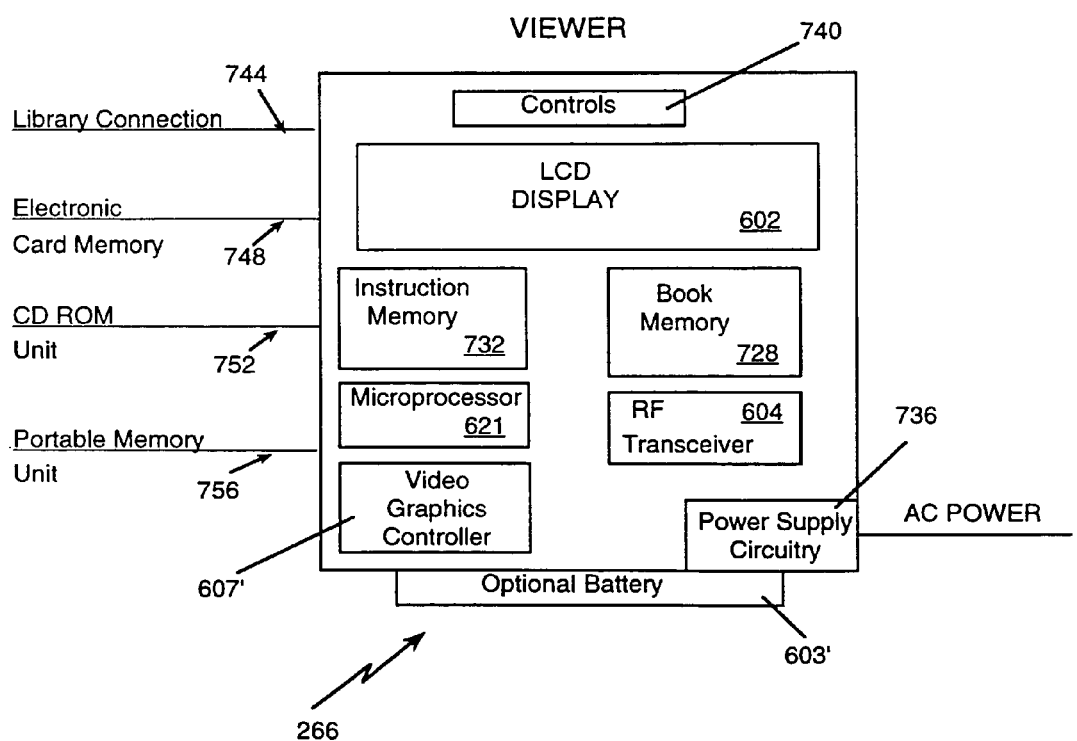
FIG. 11 is a block diagram showing the components for an example of a viewer.

FIG. 11 is a block diagram of a viewer 266 showing its internal components. The viewer 266 of FIG. 11 is similar to the viewer 266 depicted in FIG. 6b. The viewer 266 is designed to physically resemble a bound book. The viewer 266 is made up of five primary components and four optional components: (1) LCD display 602, (2) digital circuitry (not shown), (3) video graphics controller 607', (4) controls 740, (5) book memory 728, (6) optional power supply circuitry 736, (7) optional battery 603', (8) optional RF transceiver 604, and (9) optional cellular or mobile communicator (not shown).

(1) A high resolution LCD screen, preferably of VGA quality, is used by the viewer 266 to display text and graphic images. The screen is preferably the size of one page of a book.

(2) Digital circuitry that includes a secure microprocessor 621, instruction memory 732, and digital logic. Data is transferred to the viewer 266 in compressed and encrypted format. The secure microprocessor 621 compares the ID number of the viewer 266 with the incoming data stream and only stores the text data if the ID number of the viewer 266 matches that within the incoming data stream. It is preferred that the viewer 266 not output text data or other data and that the data is decompressed and decrypted only at the moment of viewing and only for the current page being viewed. These measures are preferred because they provide additional security against unauthorized access to data.

(3) A video graphics controller 607' that is capable of assisting and displaying VGA quality text and graphic images is included in the viewer 266. The graphics controller 607' is controlled by the digital circuitry described above. Text may be displayed in multiple font sizes.

(4) The viewer 266 of FIG. 11 has touch panel controls 740. The controls 740 allow the consumer to select stored books and books from catalogues, move a cursor, and turn pages in a book. Typically, the preferred controls include forward and reverse page buttons 741, a ball 743 for cursor movement, a selection button 745, a current book button 747 and a bookmark button 749 (see FIG. 14a).

(5) Book memory 728 for at least one book or more of text is included in the viewer 266. The memory 728 stores text and any graphics which represent pictures in a book. The memory 728 can also store menu graphics data. Two different memory 728 devices may be used in the viewer 266, one for the instructions for the microprocessor 621 in the digital circuitry and a second type of memory may be used for the book memory 728. Various memory devices available on the market may be used such as, ROM, RAM or a small hard disk. Since a book requires approximately 0.6 megabytes of storage, a small hard disk providing approximately 60 MBytes of storage provides memory to store approximately 100 books. Text for books may be stored in various font sizes so that larger or smaller fonts may be recalled from memory 728 as desired.

(6) Power supply circuitry 736 in the view will accept power from either an AC power source or from an optional battery 603', or the library 262. The power supply circuitry provides the necessary voltages to accommodate the various systems within the viewer 266.

(7) An optional battery 603' is provided in the preferred embodiment. The battery 603' is automatically recharged when AC power is available.

(8) An optional RF transceiver 604 which provided two-way data link between the viewer 266 and other components of the home subsystem can also be included in the viewer 266.

(9) Also, the viewer 266 may include a cellular transceiver (not shown) for mobile communications.

The viewer 266 of FIG. 11 has parts available for providing a library connection 744, electronic card memory 748, CD ROM units 752, and a portable memory unit 756 (such as that shown in FIG. 6b 600). Various electronic memory cards such as PCM CIA can be used with this viewer 266.

Security, low power consumption and excellent display technology are desired features of the viewer 266 design. The viewer 266 should be lightweight and portable. The viewer 266 contains a software operating system that allows books to be stored, read and erased and includes the capability to order books and retain them in memory for a predefined period of time determined by the system operator. The software can be configured to allow the book to be read during a period of time (i.e., two weeks) and then automatically erased, read once and erased, or held in memory permanently. Each viewer 266 has a unique key 605. All of the data storage is encrypted with the key 605 for an individual viewer 266 to prevent more than one viewer device 266 accessing the text file or book file.

Figure 12:
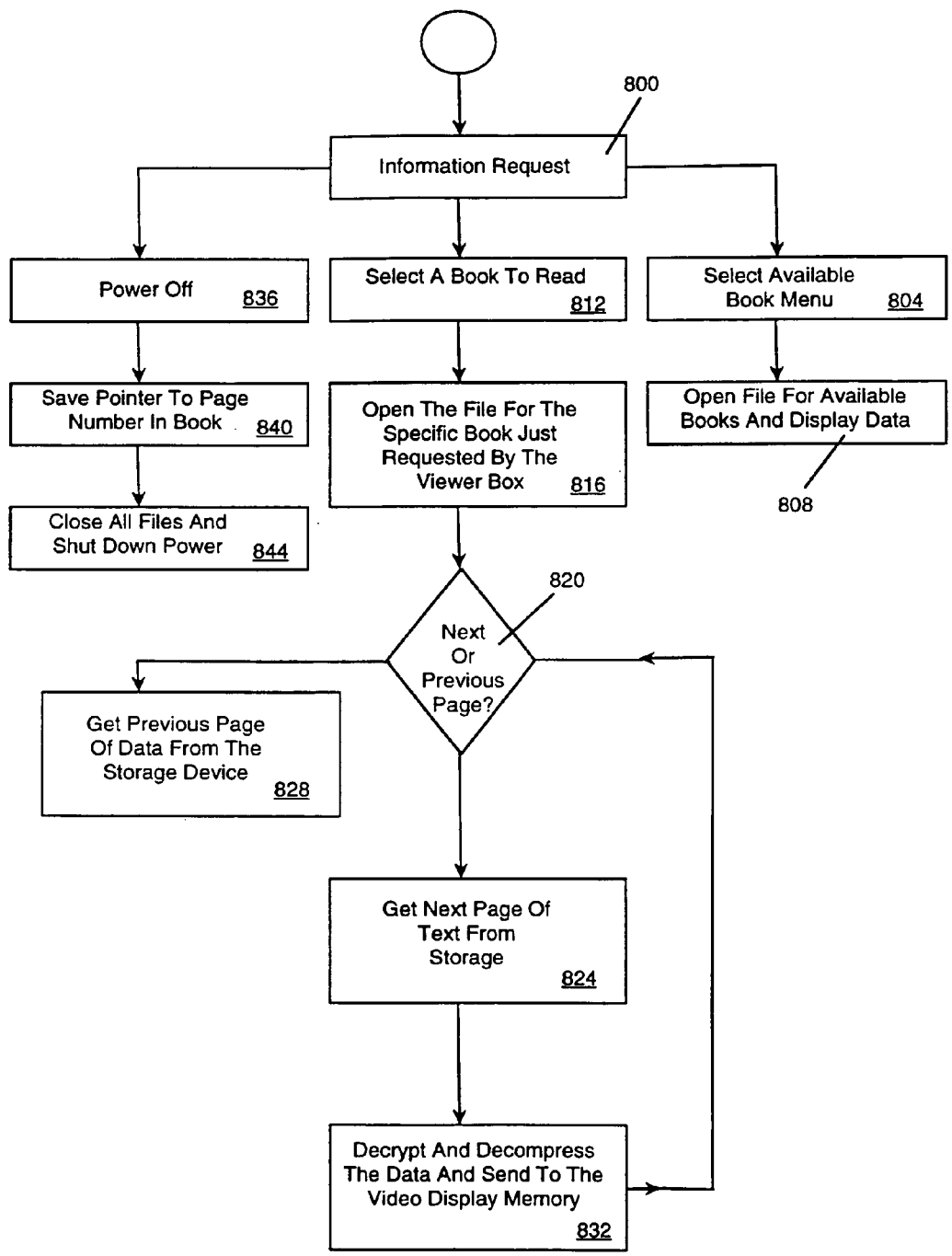
FIG. 12 is a flow diagram of some of the processes performed by the viewer on an information request from a subscriber.

FIG. 12 is a flow diagram of some of the processes executed by the viewer 266. Generally, the viewer 266 receives inputs from the subscriber through touch panel controls 740. The subscriber's information requests are then processed 800 by the viewer 266.

If the subscriber requests a menu of available books, process block 804 will select a book menu. Process block 808 will open the electronic files which list the books that are available (related to the category of topic of the menu) and display the menu with the names of the available books.

If the subscriber selects a particular book to read, then process block 812 will process the selection and determine the electronic file that contains the specific book. Process block 816 will open the file for that specific book and normally access the first page. (If a pointer has already been set in that books electronic file, the process may default to that printer.) Process block 820 will then determine which page needs to be displayed. Process block 820 will determine whether a next page, previous page or a bookmarked page needs to be displayed. If the pointer for the electronic file is not in the correct location then process block 828 will move the pointer and obtain the previous page of data from the stored file. Otherwise, process block 824 will normally obtain the next page of text from the stored electronic file. Process block 832 will decrypt and decompress the text data and send the data to the video display. The video display will generally have a video display memory associated with it and process block 832 will send the data directly to that video display memory. The circuitry for the display then completes the process of displaying the page of text.

If the subscriber, through the controls 740, requests (from process block 800) that the power be turned off, then the process, 836, of turning the power off will be initiated. Process block 840 saves the pointer in memory to the page number in the book that the viewer 266 is currently reading. Process block 844 closes all the electronic files and signals the power circuitry to shut down the power to the various circuits in the viewer 266. With these examples of basic processes the viewer 266 is able to display book selections and display text from those books.

d. Menu System

It is preferred that the electronic book system have a menu system for selecting features and books from the electronic book system. The operating software and memory required for the menu system is preferably located at the viewer 266. However, it can also be located at the library or the library and the viewer 266 can share the software and memory needed to operate the menu system. Since the menus are usually displayed on the viewer 266 and it is preferred that the viewer 266 be capable of operating in the absence of the library, the basic software and memory to create the menus is more conveniently located at the viewer 266.

The preferred menu system is a system which allows sequencing between menus and provides menu graphics for graphical displays such as on the viewer 266. In a system which uses a set top converter these menus may also be displayed on a television screen. In the simplest embodiment, the menus provide just basic text information for the subscriber to choose from. In more sophisticated embodiments, the menus provide visual displays and icons to assist the subscriber.

Figure 13:
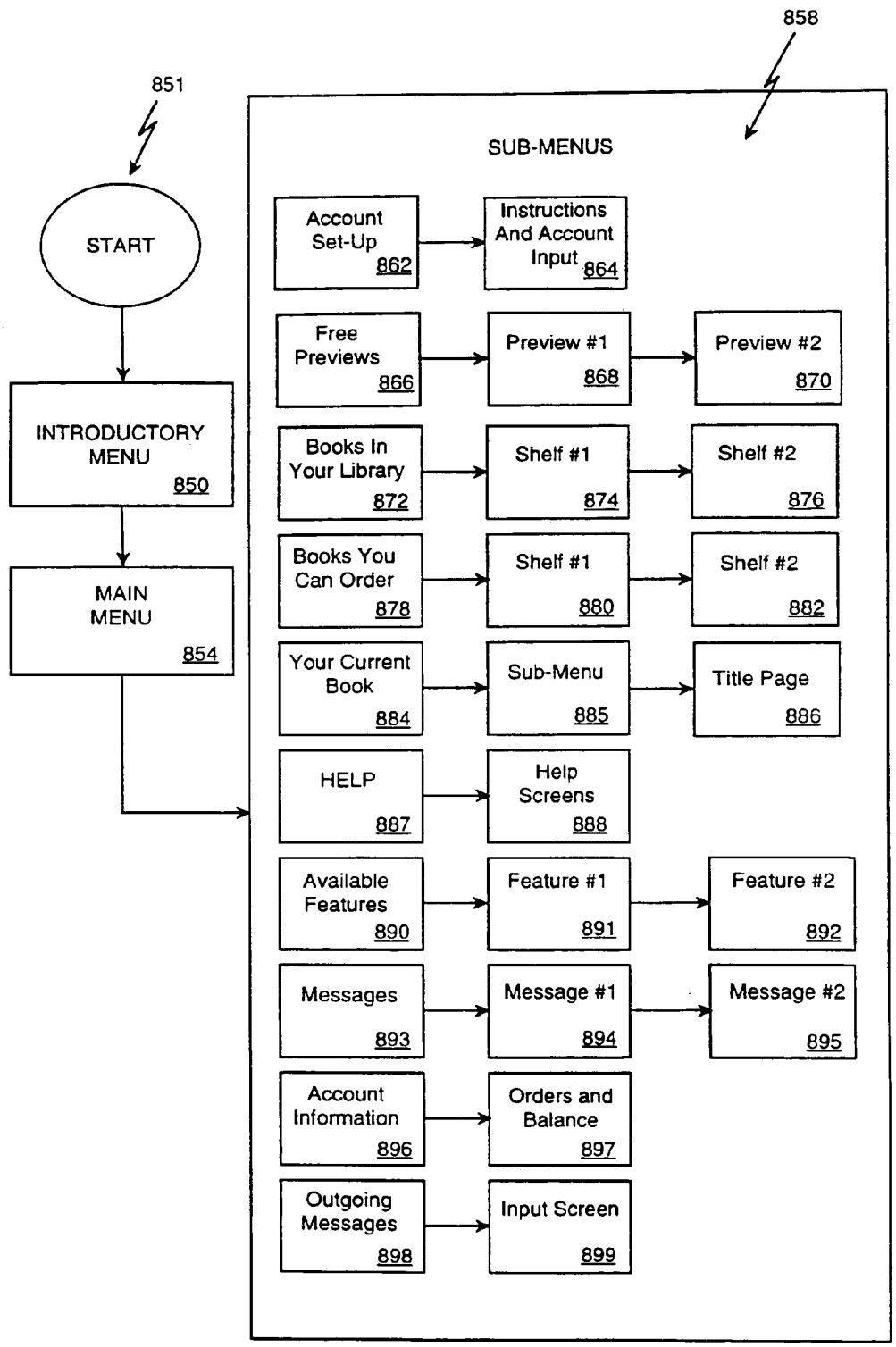
FIG. 13 is a chart depicting the menu structure and sequencing of menus in the menu system.

FIG. 13 depicts a menu system with sequencing. The primary menus in the system are an introductory menu 850, a main menu 854 and various submenus 858. In the embodiment shown, there are three levels of submenus. In certain instances one or two submenus is sufficient to easily direct the subscriber to the selection or information requested. However, there are features in which three or more submenus makes the user interface more friendly for the subscriber. Each level of submenus may consist of various menus. The particular menu displayed depends on the selection by the subscriber on the previous shown menu. An example of this tree sequence of menus are the help submenus 887, 888. Depending upon the specific help requested, a different menu is displayed.

Figure 14A:
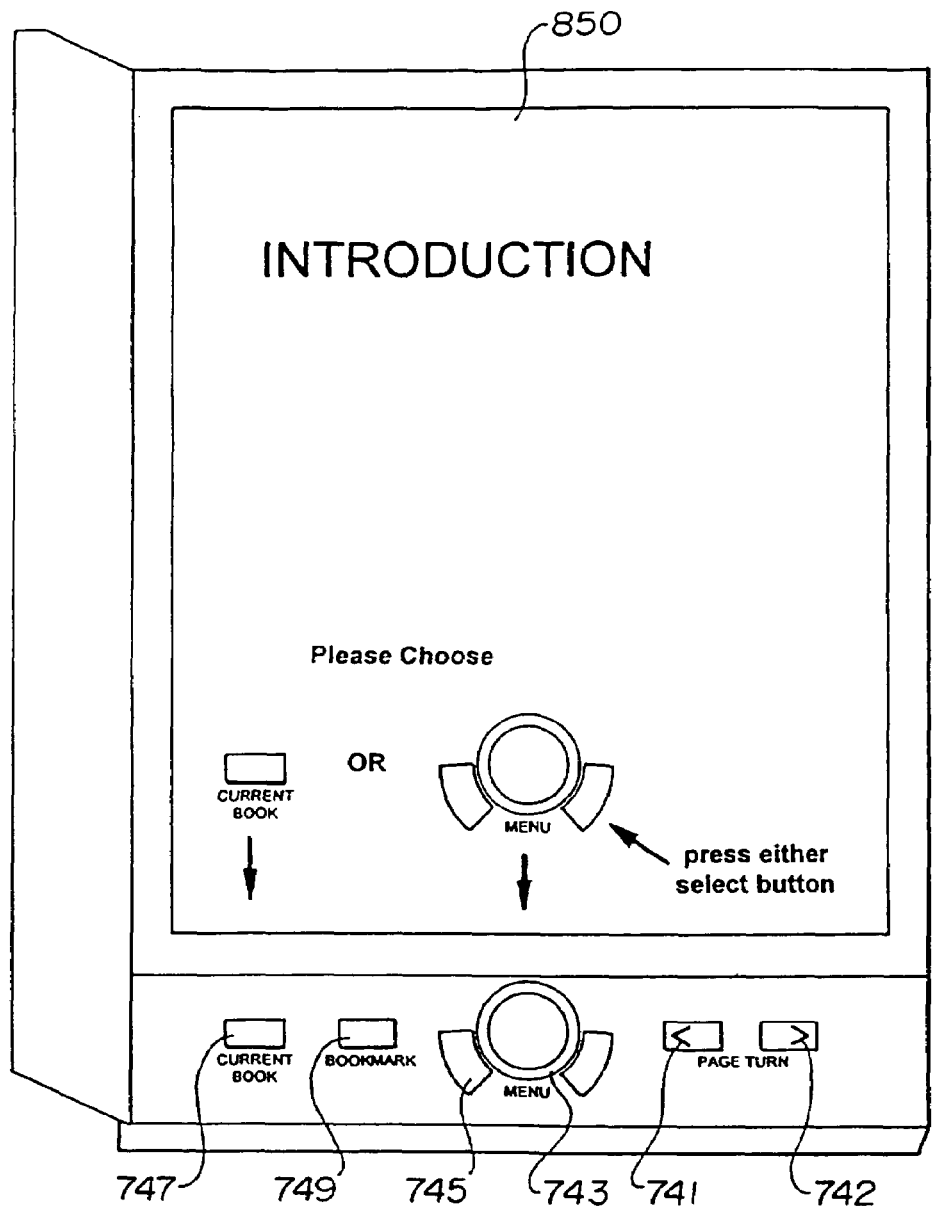
FIG. 14*a* is a schematic of an introductory menu.
Figure 14B:
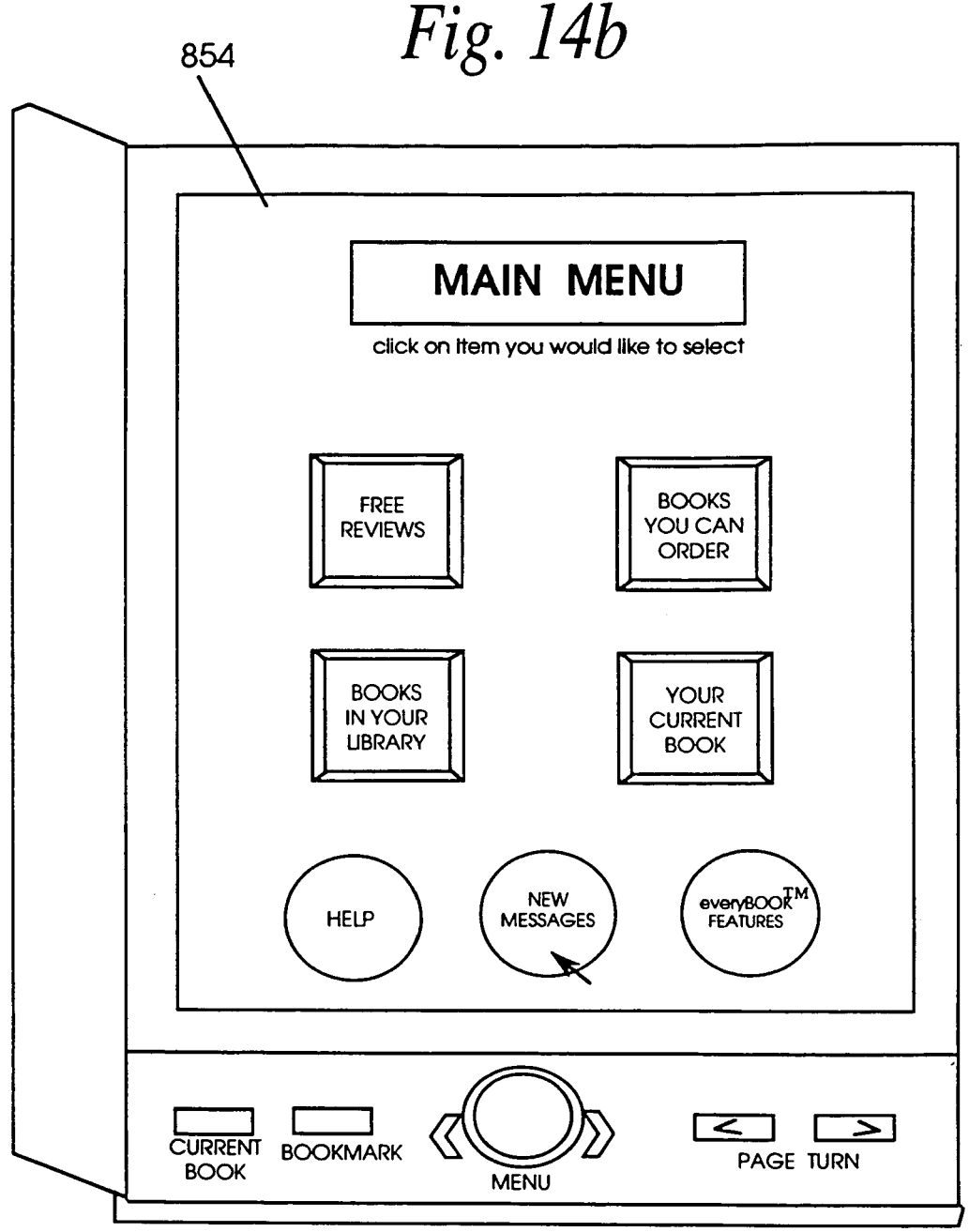
FIG. 14*b* is a schematic showing an example of a main menu.

An example of an introductory menu 850 is shown on FIG. 14*a*. Generally the introductory menu 850 introduces the viewer 266 to the system and provides initial guidance and instruction. The introductory menu 850 is followed by a main menu 854, an example of which is shown in FIG. 14*b*. The main menu provides the viewer 266 with the basic selection or features available in the system. For example, FIG. 14*b* shows that the viewer 266 is able to choose by a point and click method, six available options; (1) free previews, (2) books you can order, (3) books in your library, (4) your current book, (5) help, and (6) other system features. Following a selection on the main menu, a submenu is shown.

Figure 14C:
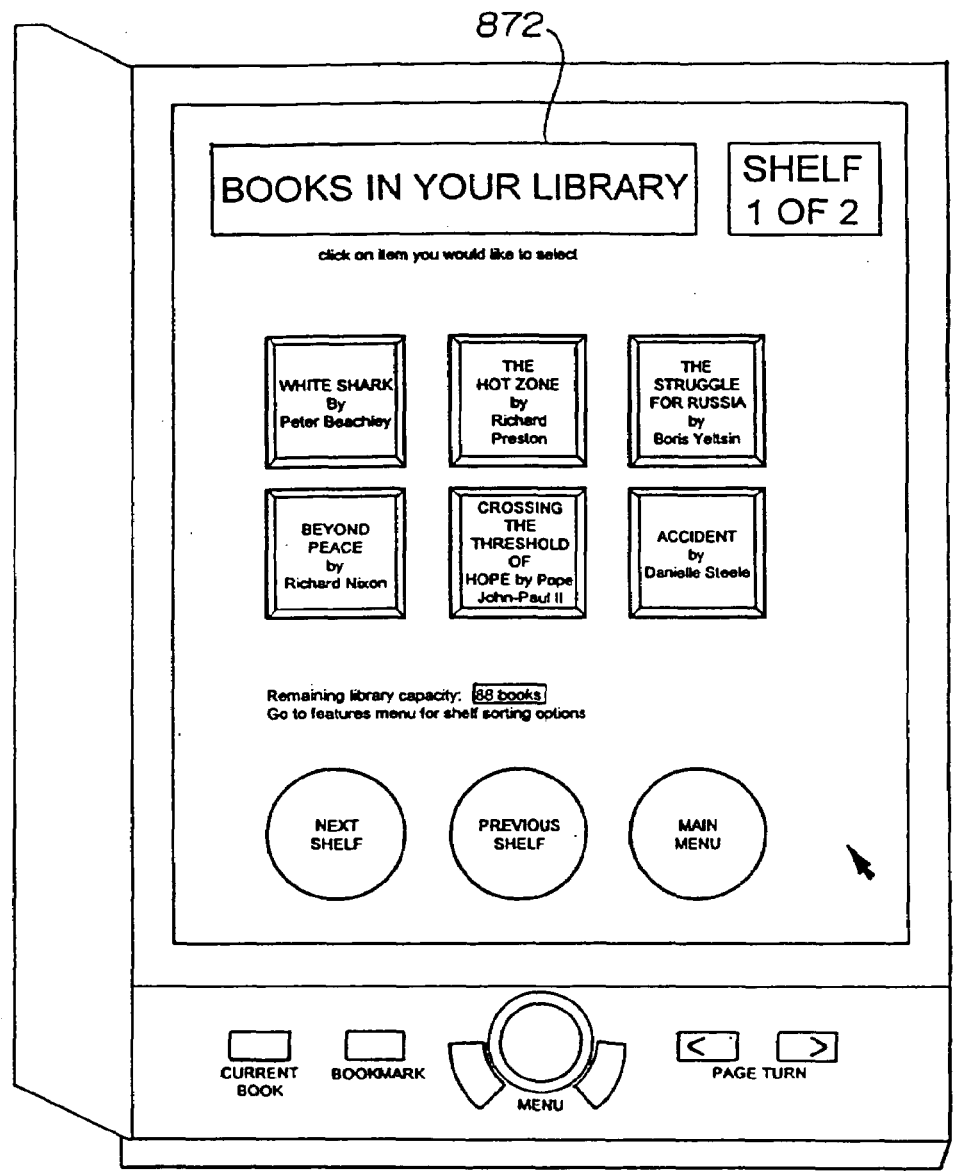
FIG. 14*c* through FIG. 14*q* are schematics showing examples of submenus.
Figure 14D:
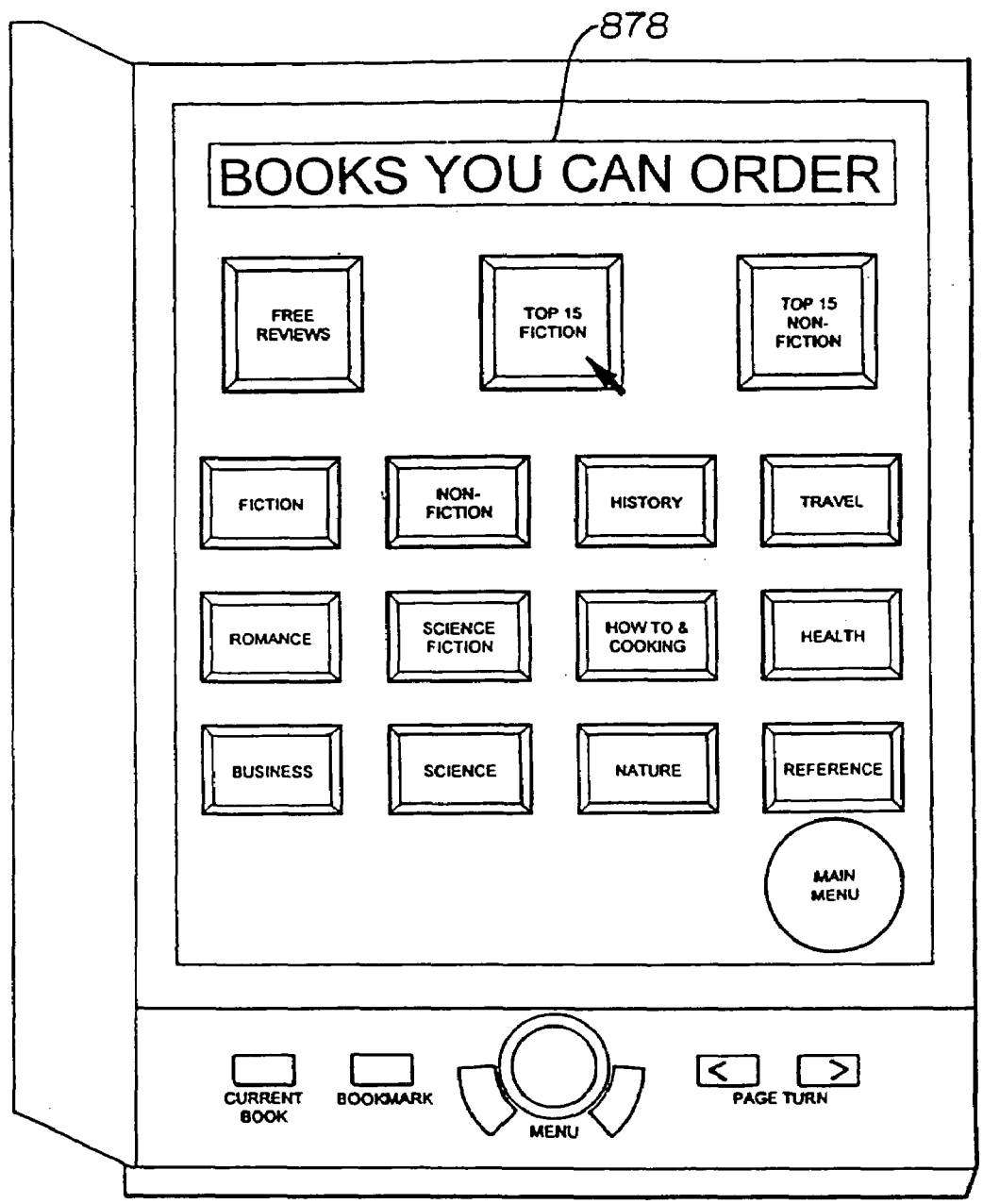
FIG. 14*r* is a schematic showing another example of a main menu.
FIG. 14*s* and FIG. 14*t* are schematics showing examples of screens for a book.
Figure 14E:
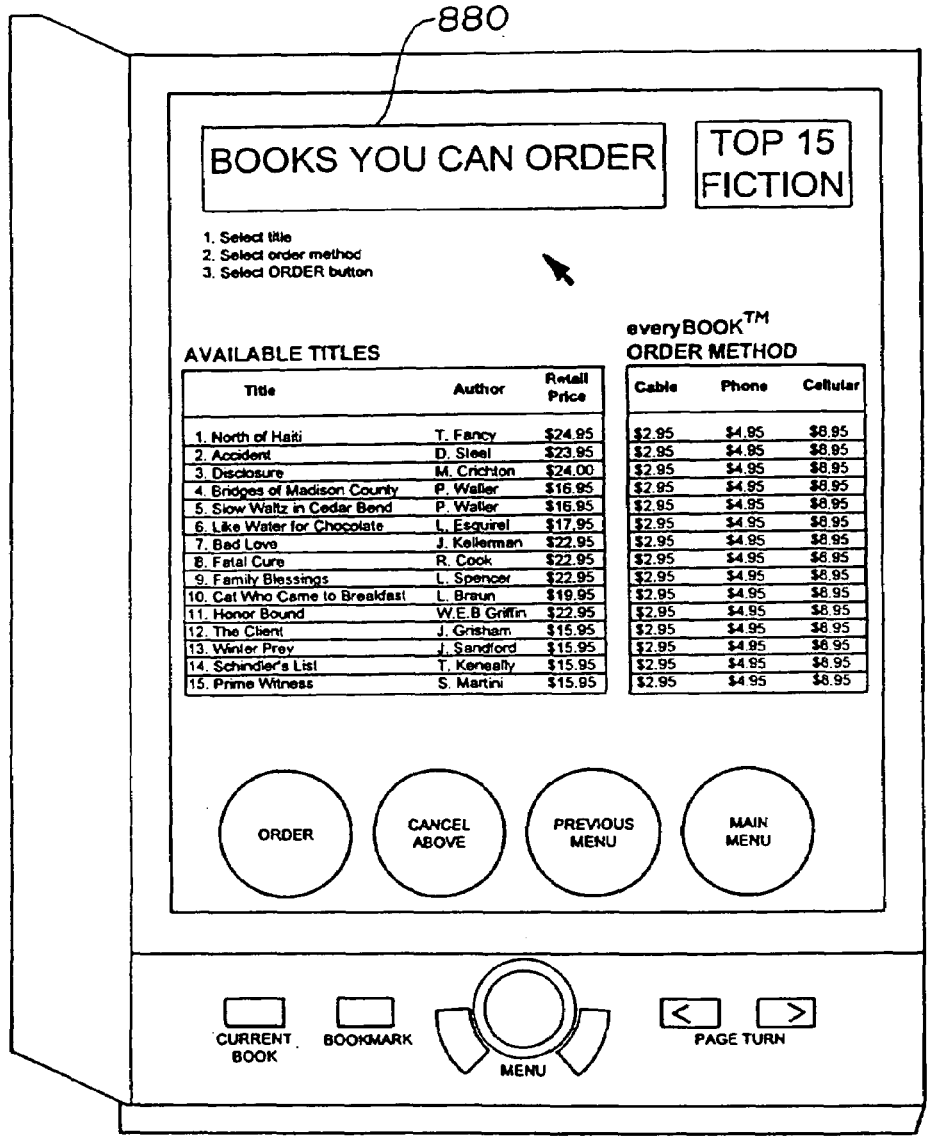
Figure 14F:
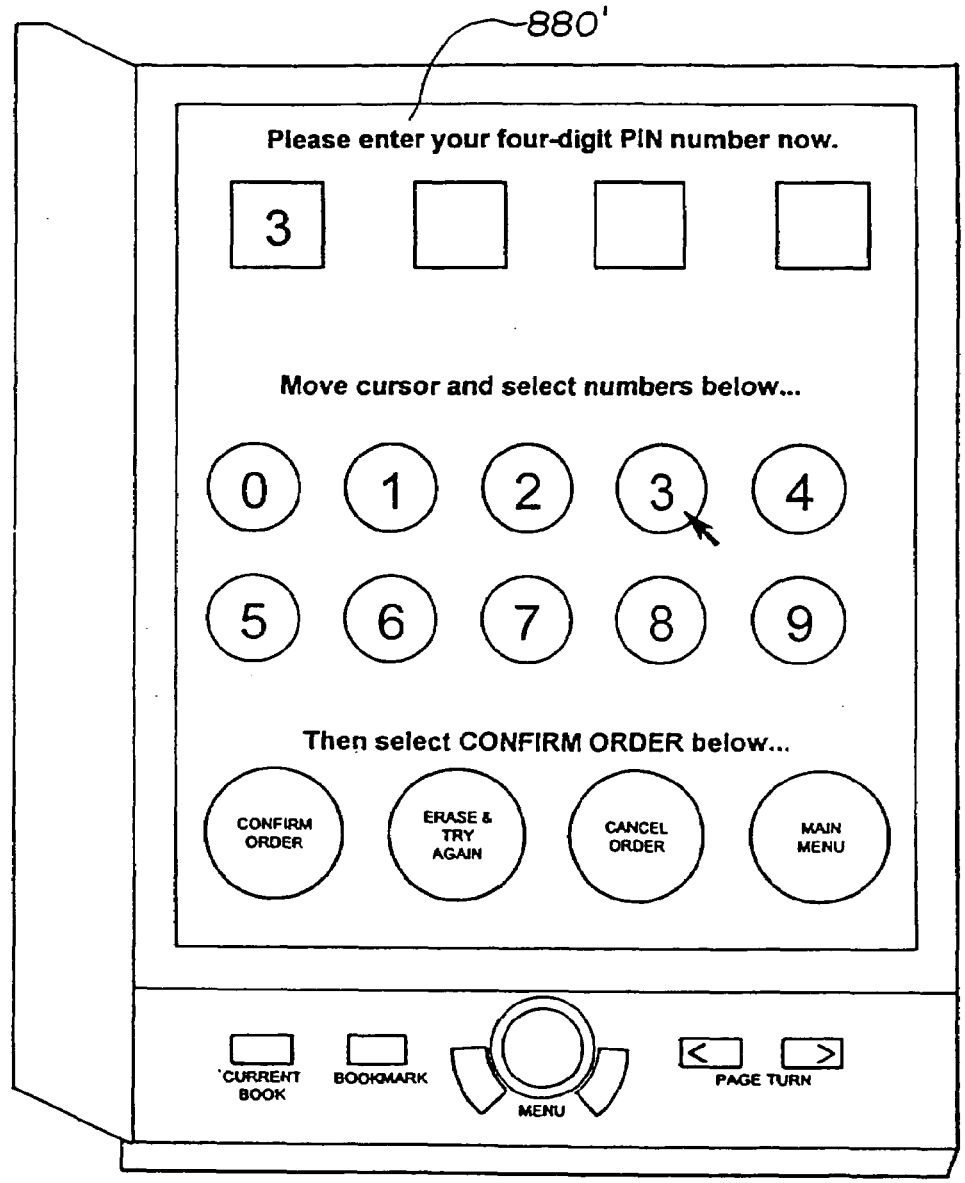
Figure 14G:
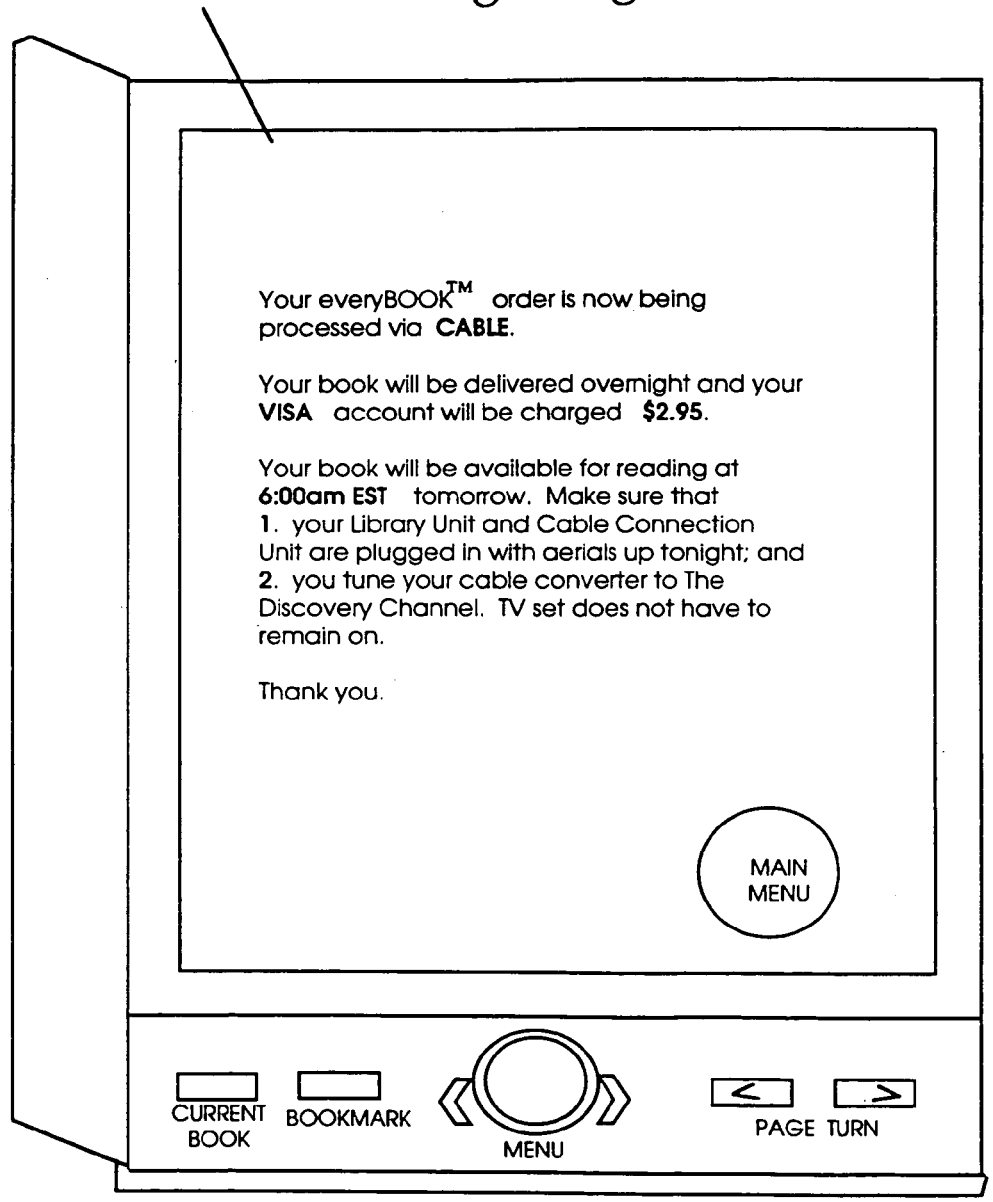
Figure 14H:
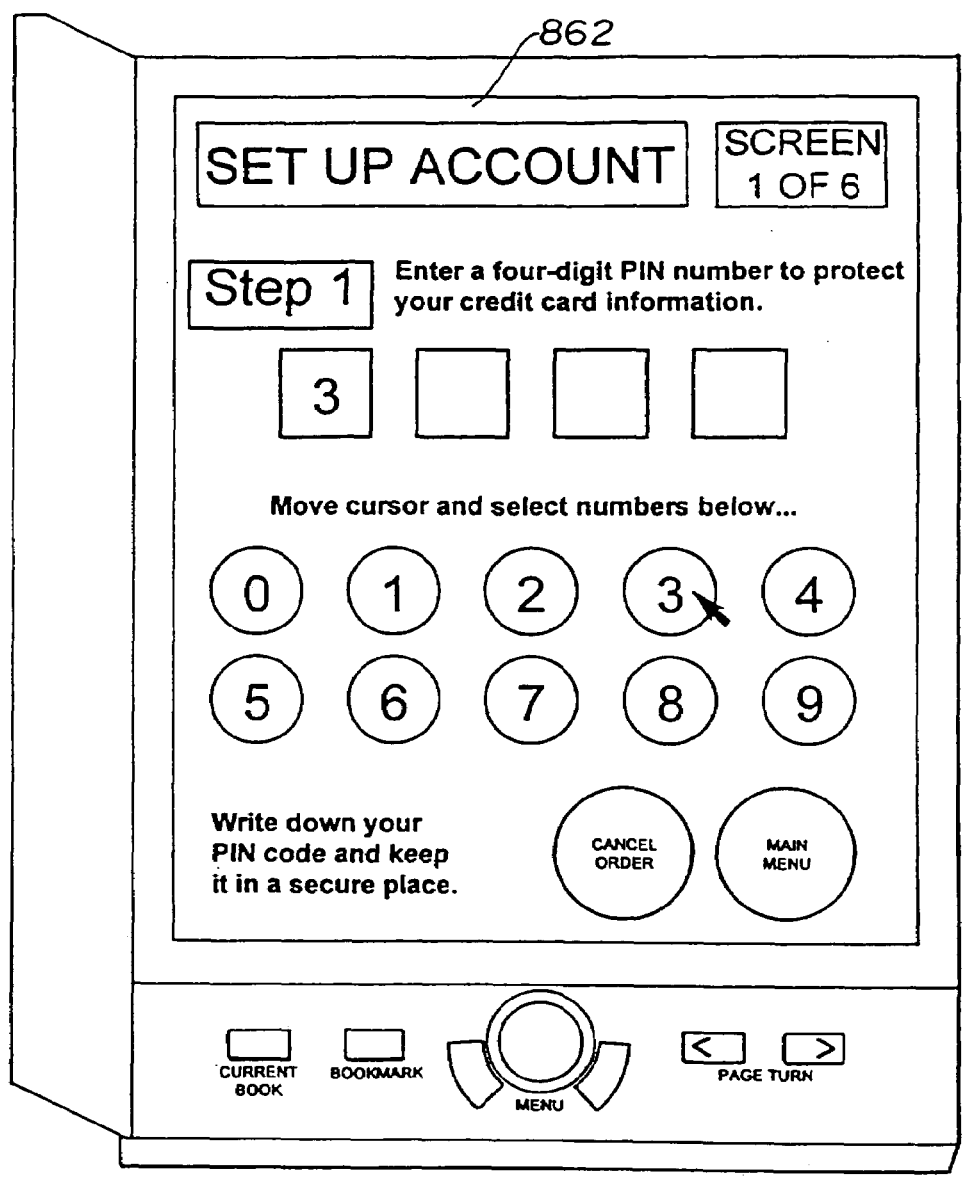
Figure 14I:
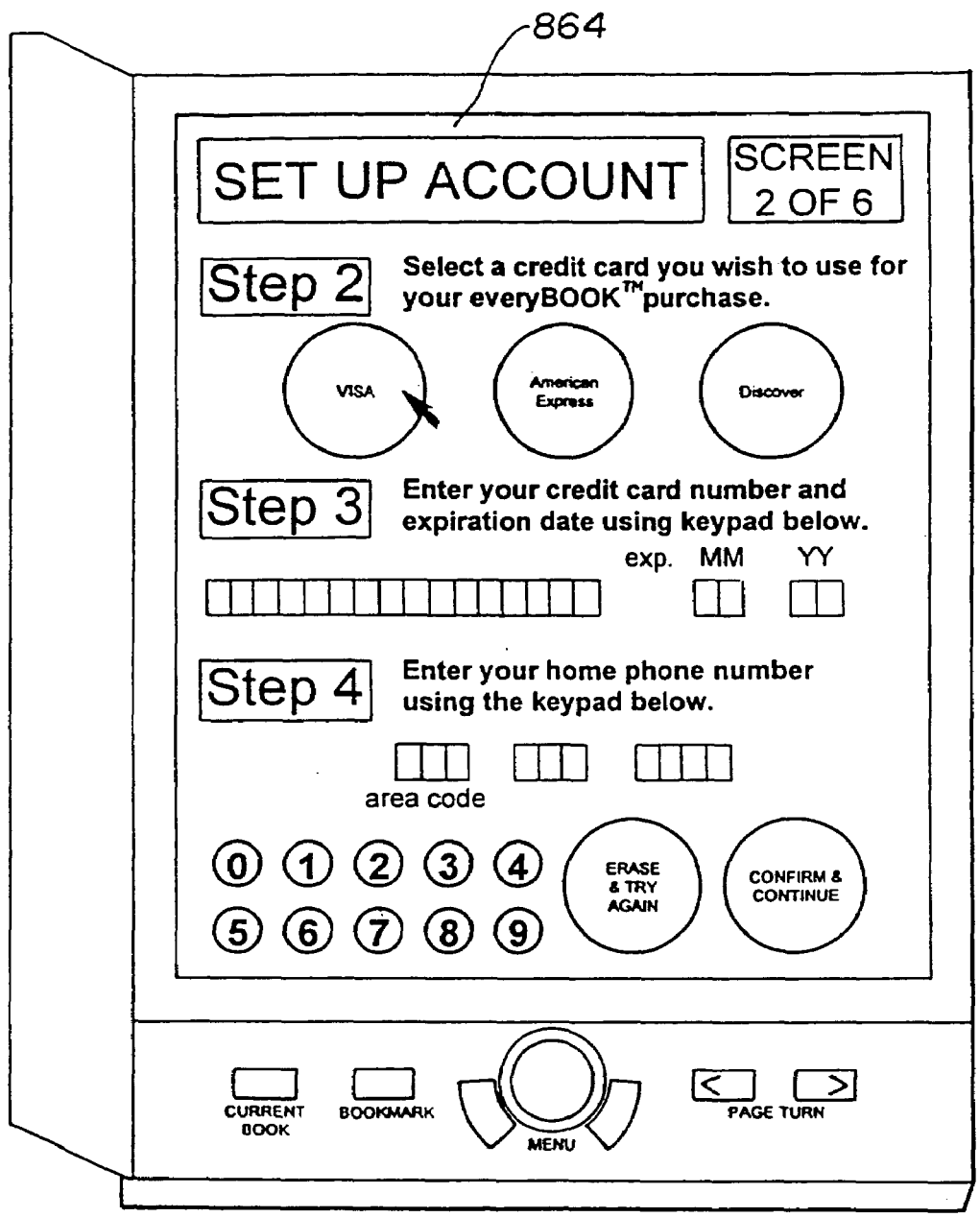
Figure 14J:
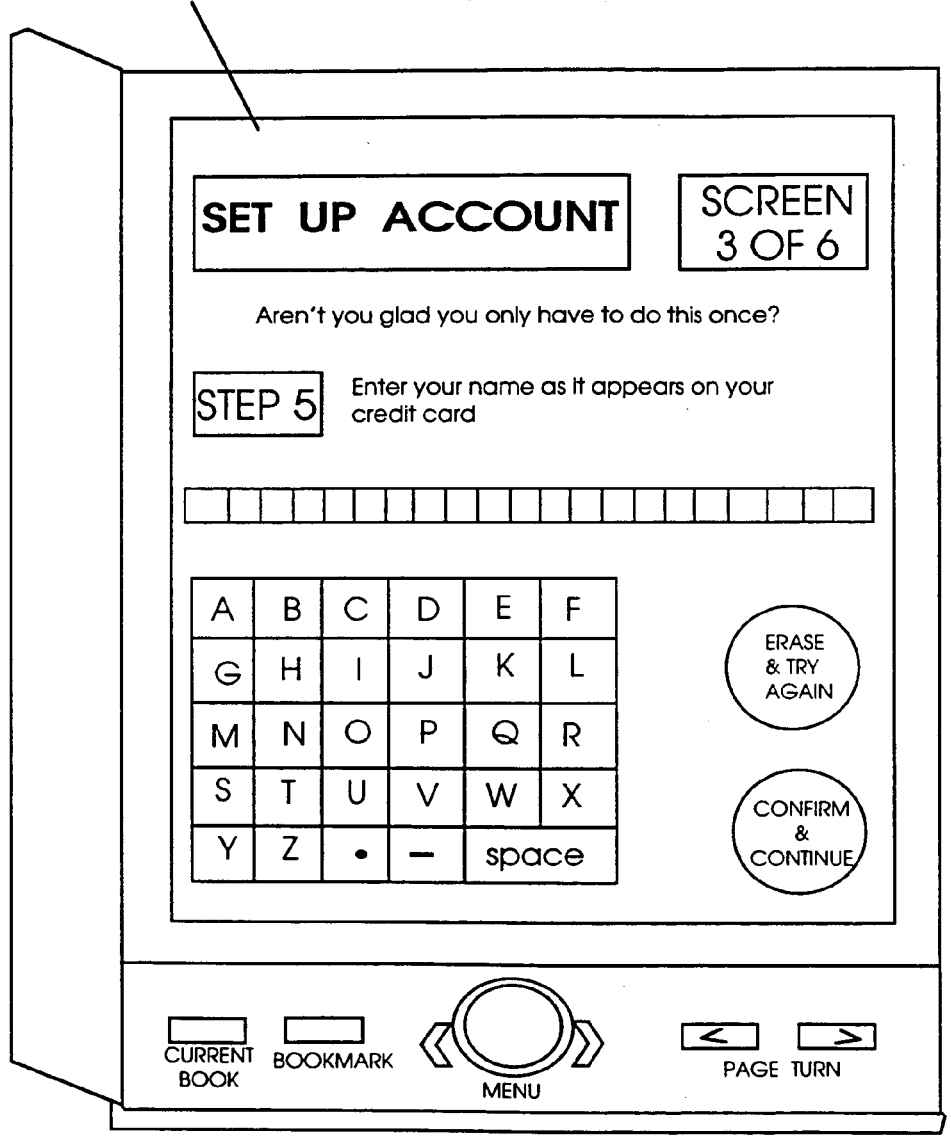
Figure 14K:
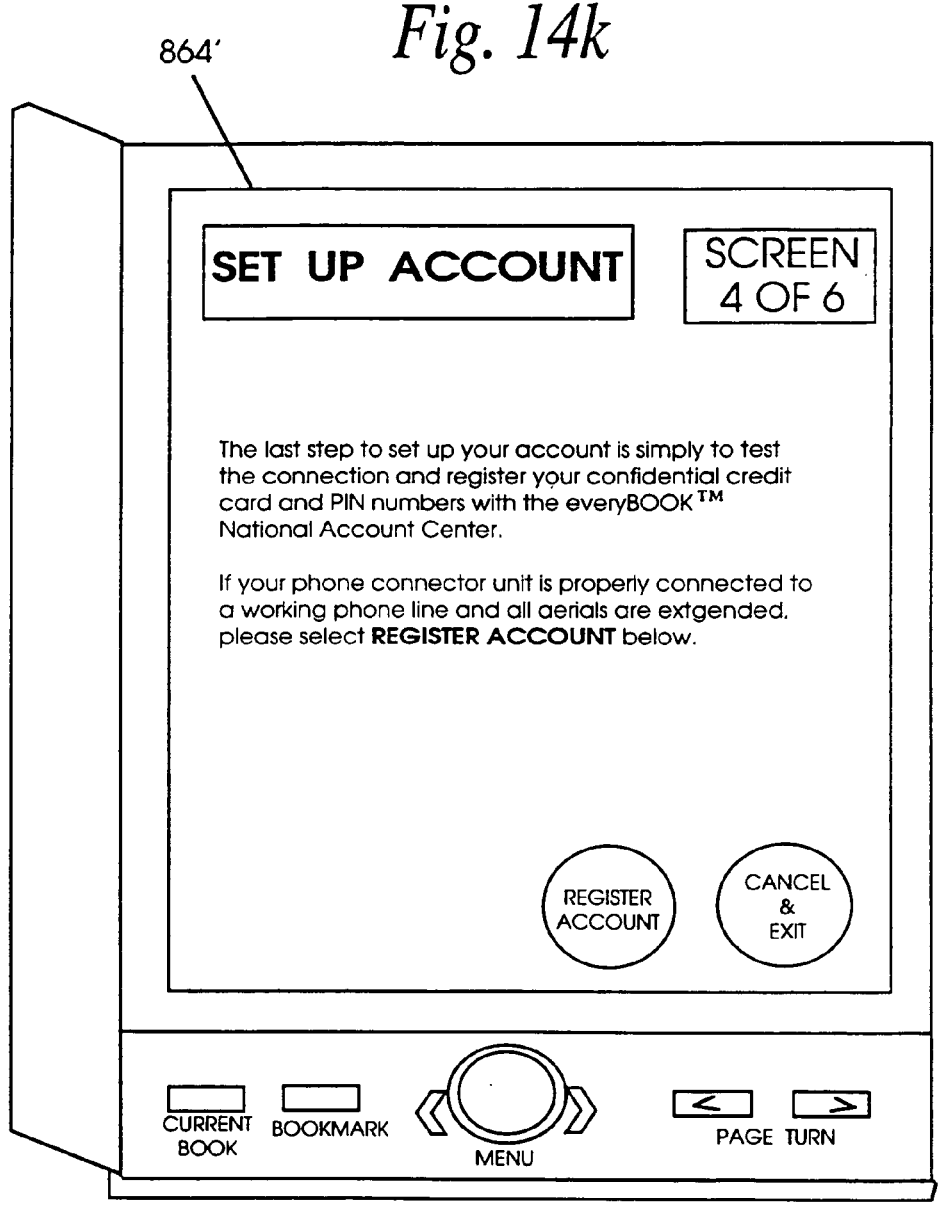
Figure 14M:
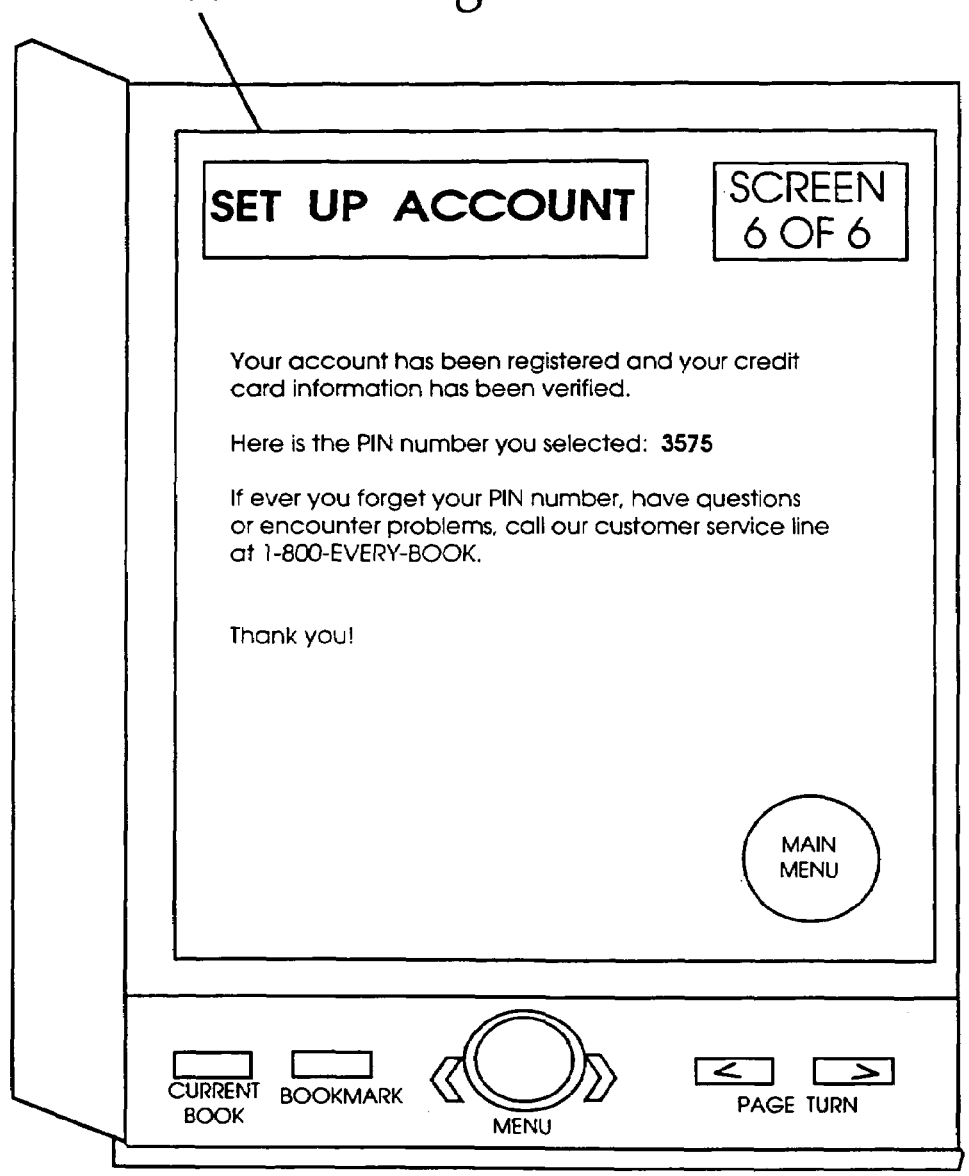

FIG. 13 shows ten available primary or first level submenus. They are (1) account set up 862, (2) free previews 866, (3) books in your library 872, (4) books you can order 878, (5) your current book 884, (6) help 887, (7) available features 890, (8) messages 893, (9) account information 896 (10) outgoing message submenu 898. FIG. 14*c* is an example of a first level submenu for books in your library 872. This "Book In Your Library" submenu shows six available books by title and author and provides the subscriber with the ability to check a different shelf of books or return to the main menu. FIGS. 14*d* and 14*e* show other submenus for books that may be ordered using the "Books You Can Order" submenu.

The "Account Set Up Menu" 862 and further submenu us related to account set up (which provide instructions and account input 864) are shown in FIG. 14*f* through FIG. 14*m*. These submenus allow initialization of an account at the operations center and orders to be charged to credit cards. The submenus include the ability to enter data related to your credit cards.

Figure 14N:
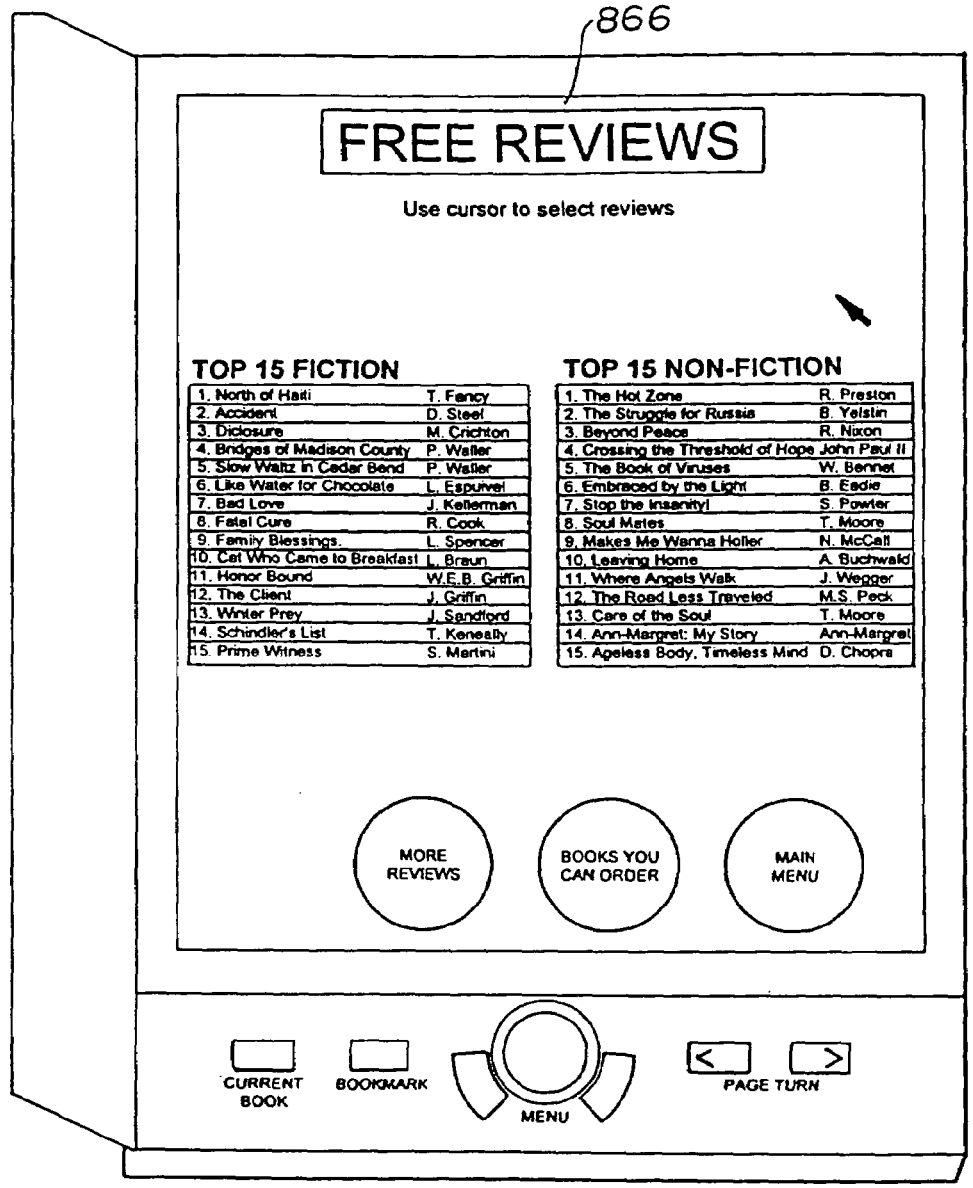
Figure 14O:
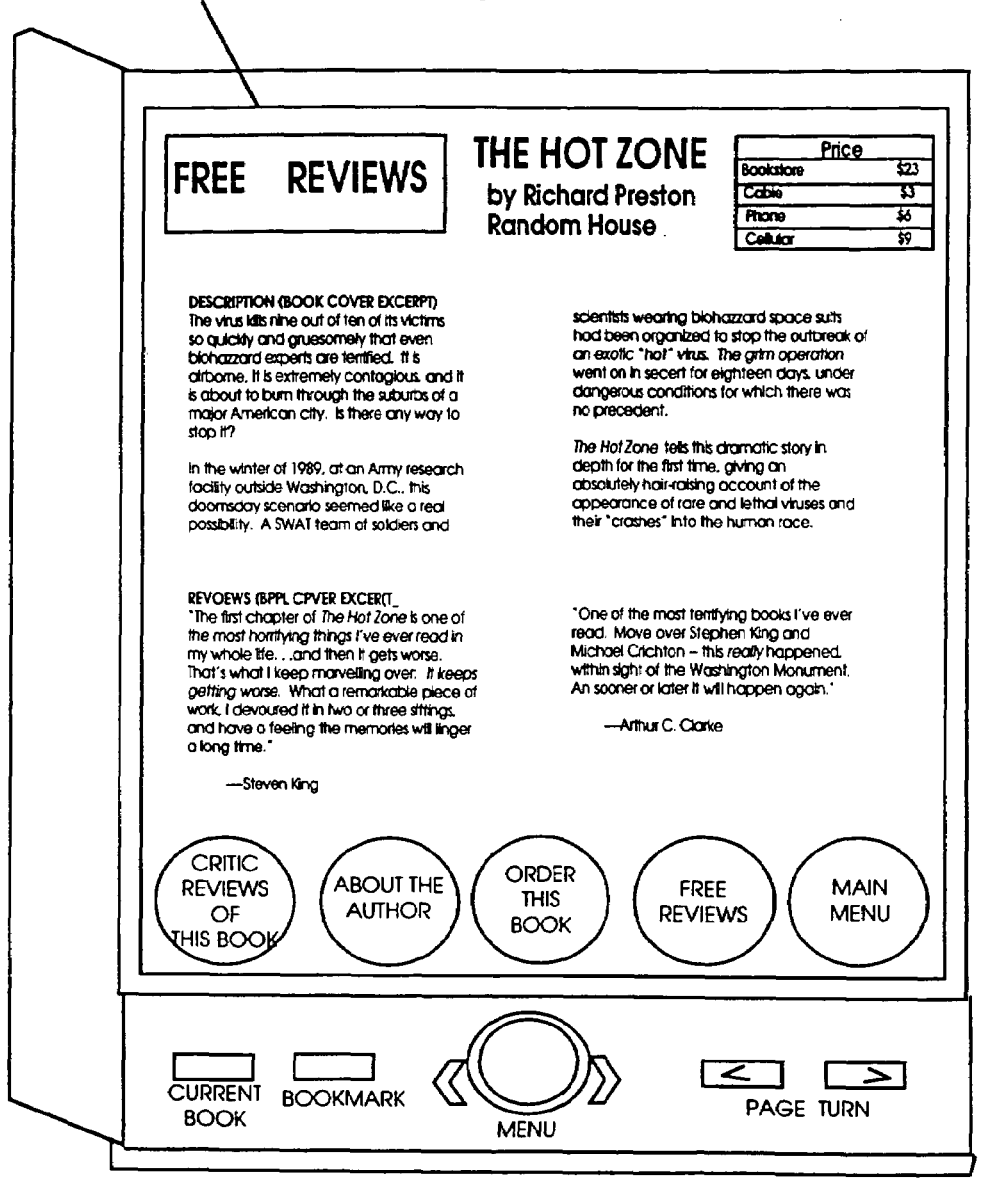
Figure 14P:
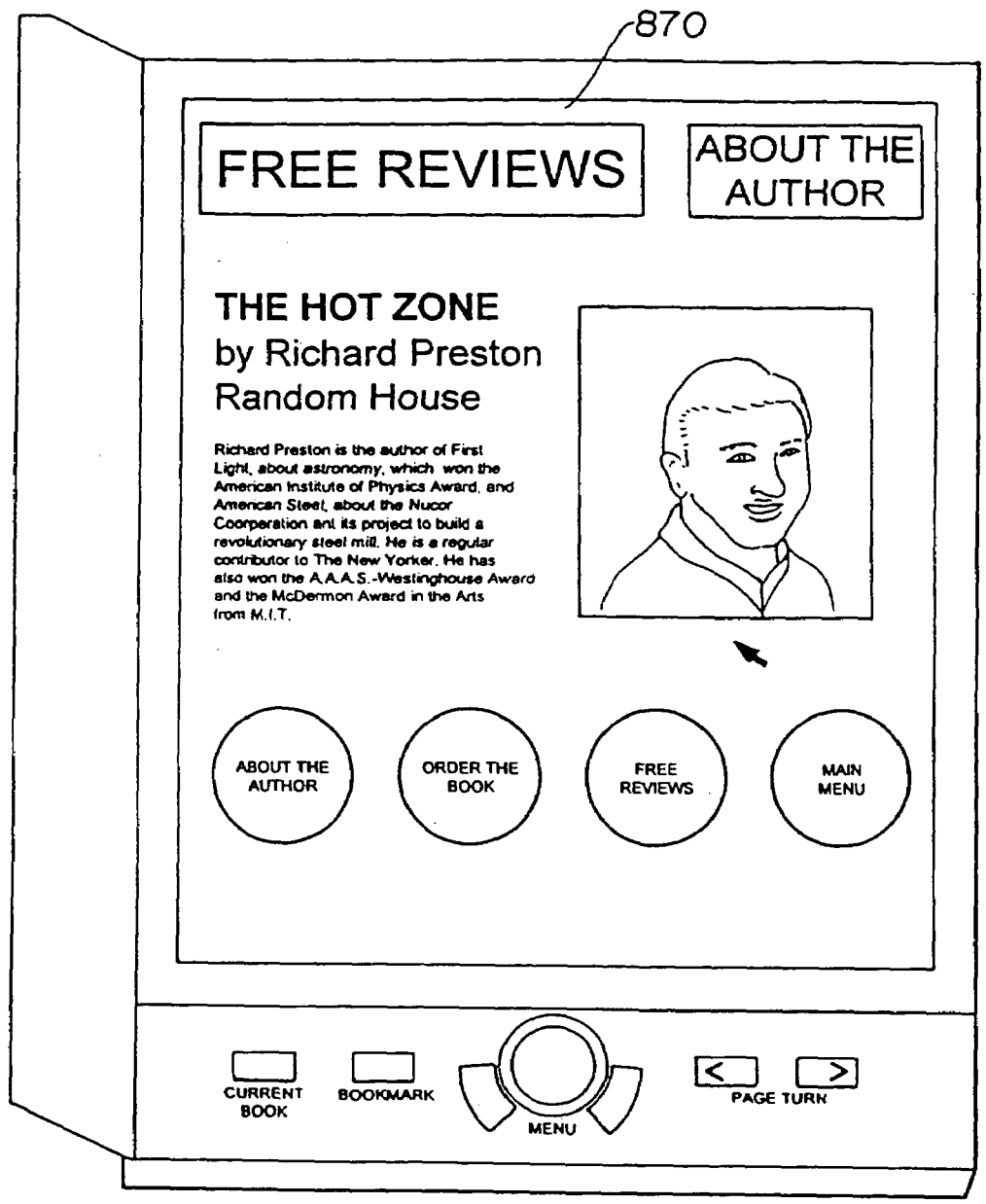

Free previews for books 866 are also provided by submenus (868, 870). Examples of the free preview menus are shown in FIG. 14*n*, FIG. 14*o*, and FIG. 14*p*.

Referring to FIG. 13, submenus are shown on the "Books In Your Library" submenu 872 and are preferably broken into shelf numbers with submenus for each shelf 874, 876. The submenus on the "Books You Can Order" submenu 878 is similarly broken out into submenus by shelves 880, 882. These shelves may each be a category or genre of books. Books may be grouped into categories such as best sellers, novels, fiction, romance, etc. See FIG. 14*d*.

Referring to FIG. 13, the submenu for "Your Current Book" allows a subscriber to select a current book 884 and then determine what page to view. This selection is confirmed with submenu 885. The help submenu provides the subscriber with additional help screens 888. The submenus for available features 890 are preferably broken out into a separate submenu for each feature 891, 892.

Referring to FIG. 13, messages can also be sent with the electronic book selection and delivery system. A level one message screen provides the subscriber with the ability to select from the various pending messages he has 893. Each message is then shown on a separate submenu screen 894, 895. An example of such a submenu is shown in FIG. 14*q*.

Referring to FIG. 13, account information is shown on a level one submenu 896 and then follow-on submenus show the recent orders and your account balance 897. There is also a level one submenu for outgoing messages 898 which has a follow-on submenu used as an input screen 899.

Figure 14Q:
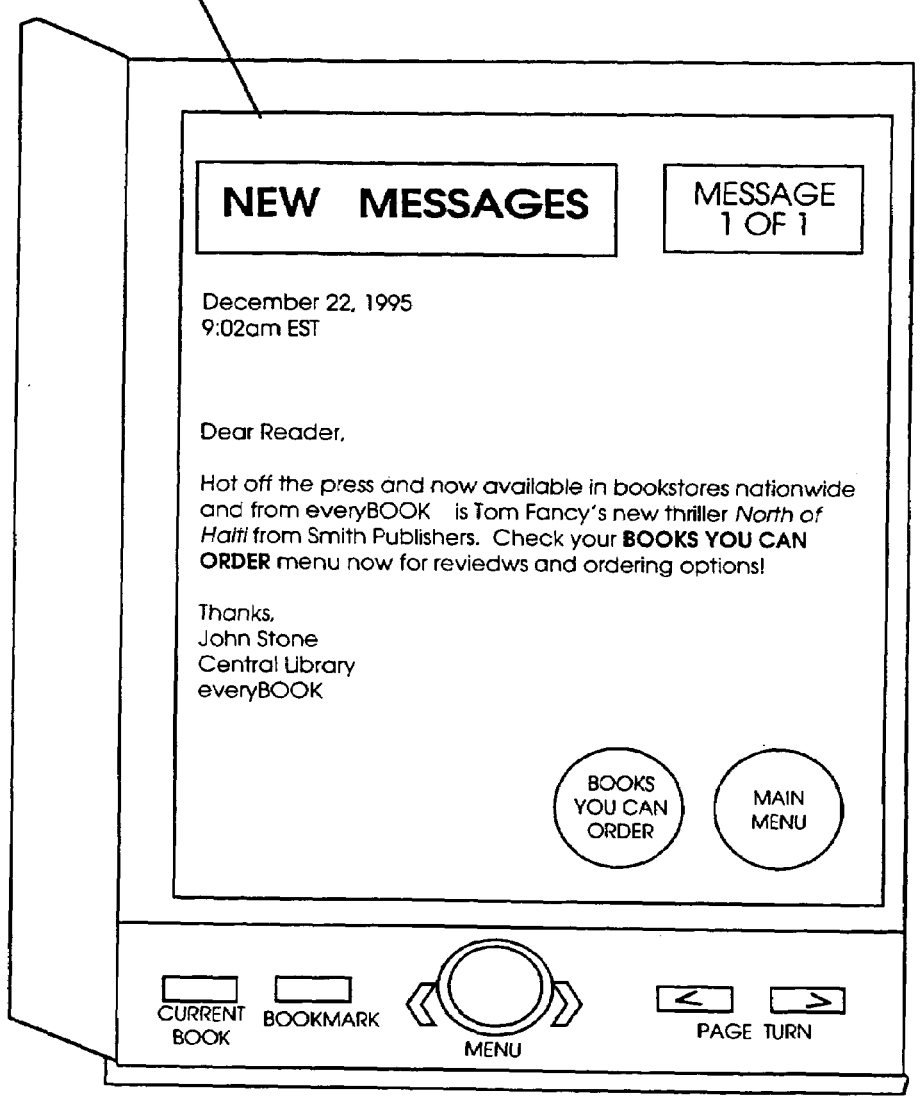
Figure 14R:
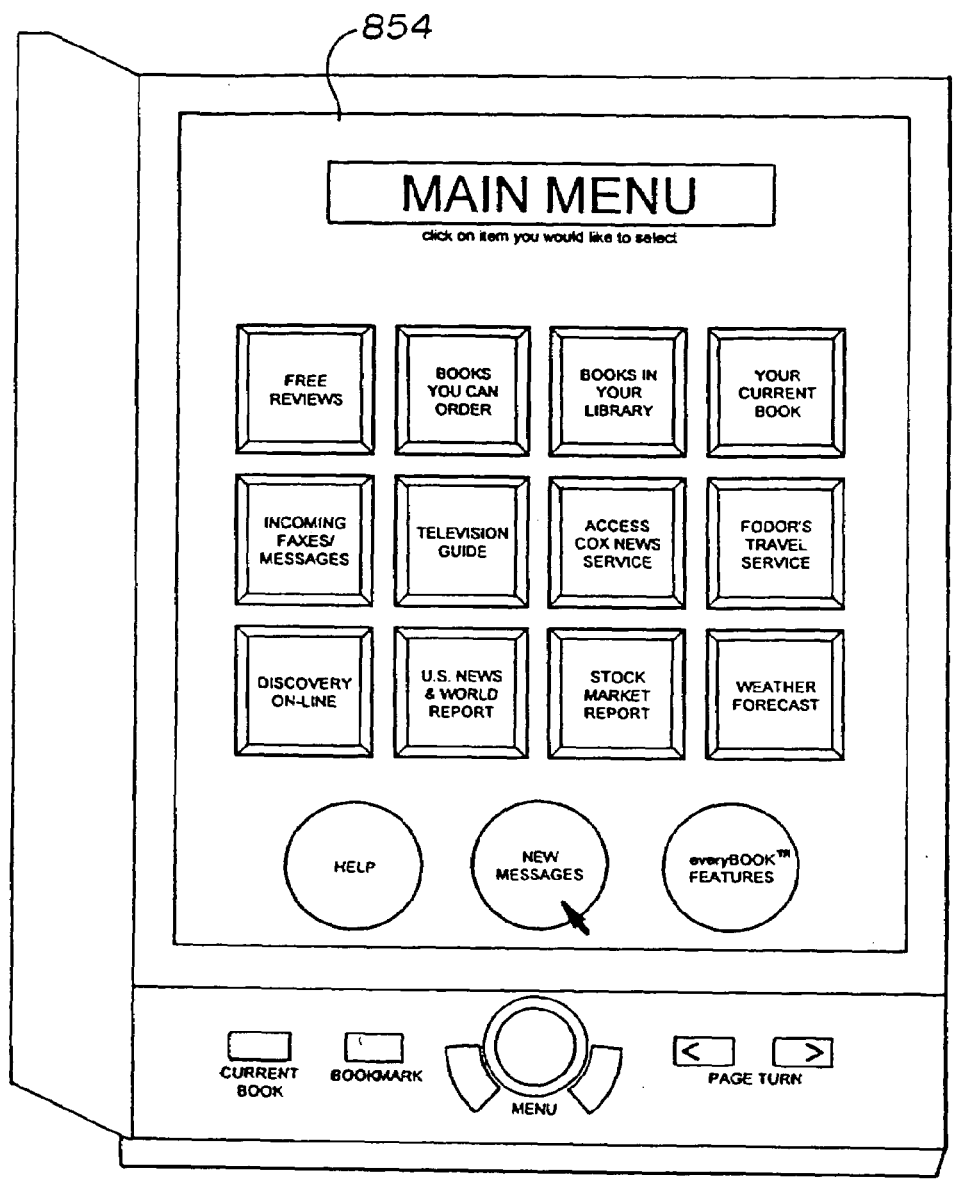

In addition to the specific features and submenus described in FIG. 13 and FIG. 14*a* through FIG. 14*q*, many other variations and features are possible. FIG. 14*r* is an example of a main menu with additional features and submenus available.

Figure 14T:
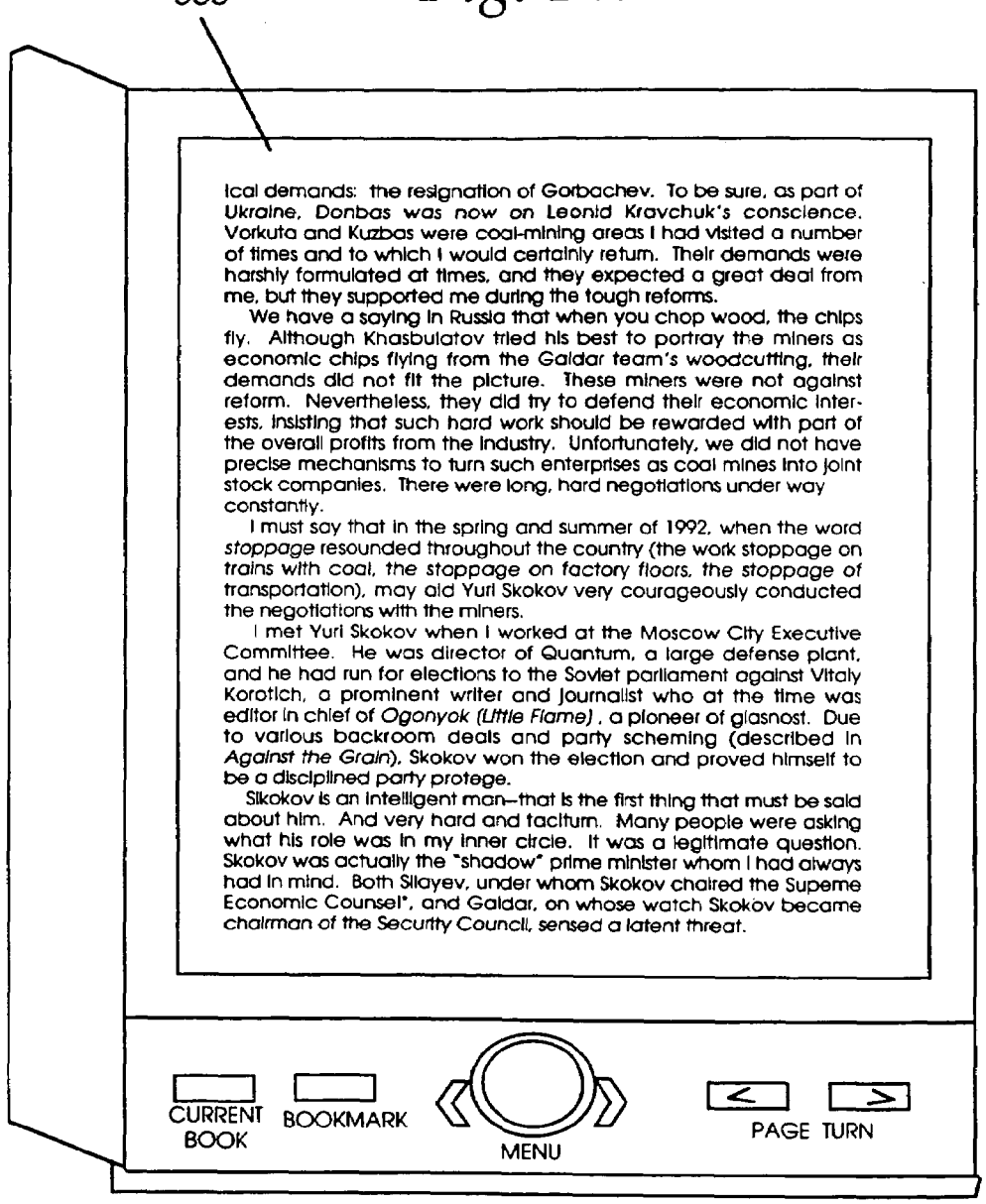

When a book is finally selected for viewing on the system it will appear on the screen as shown in FIG. 14*s* for the title and FIG. 14*t* for a page of text.

III. The Billing And Collection System

The billing and collection system utilizes the latest technology in electronic transaction and telephone switching to track orders, authorize deliveries, bill consumers, and credit publishers automatically. The telephone calls initiated by the phone connector are received by the billing and collection system which responds immediately without human intervention by placing the order and charging the consumers credit card account. Data is compiled periodically and publishers are credited for sales of their books. The billing and collection system may also connect with subscribers through two-way cable connections, cellular or other communication means.

It is preferred that the billing and collection system communicate with the operations center to track changes in available books and to provide statistical data to the operations center.

IV. Library and Bookstore System

Figure 15:
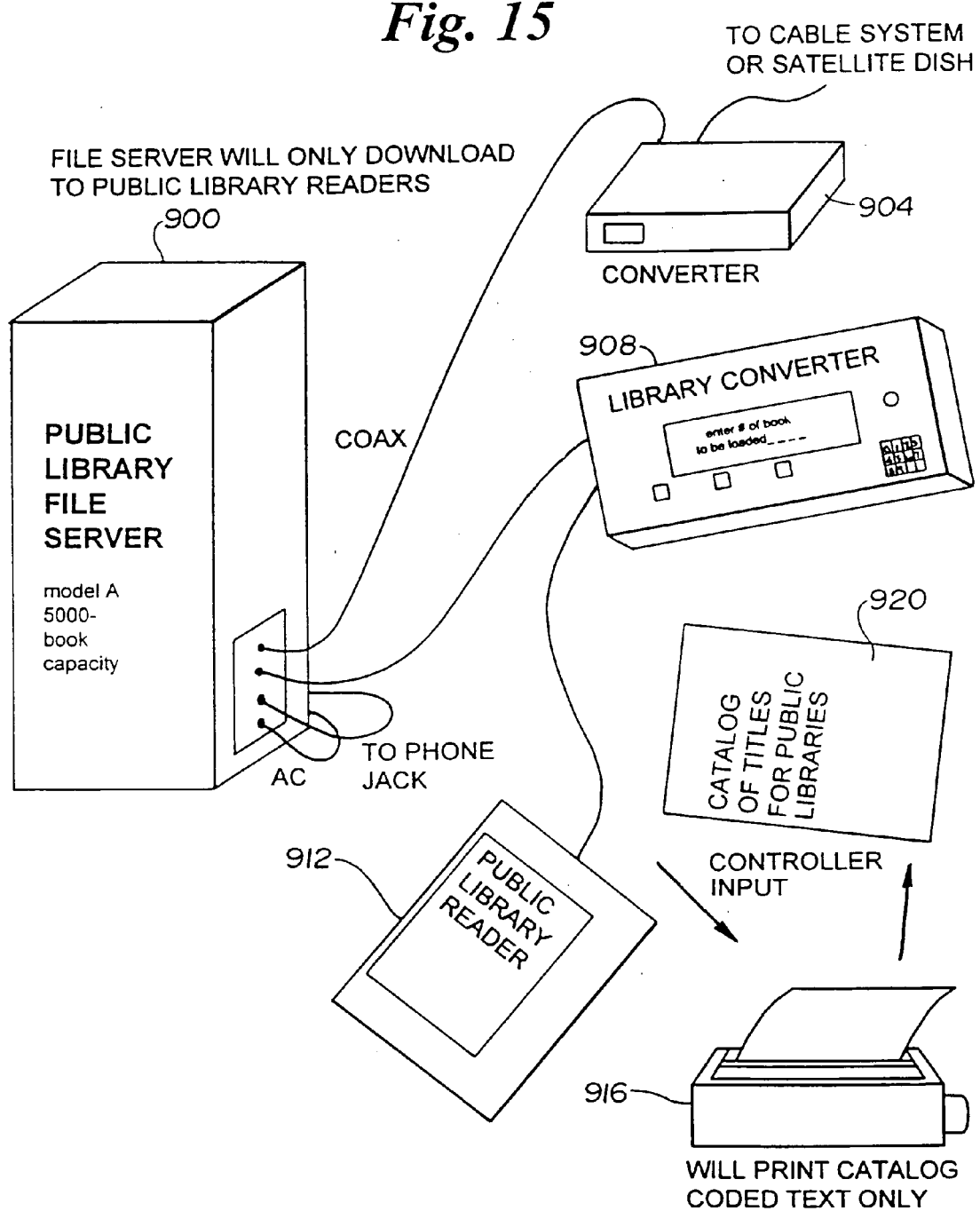
FIG. 15 is a schematic diagram of an electronic book system for a bookstore or public library.

The electronic book system can be modified to be used at public libraries and bookstores. FIG. 15 shows one possible arrangement of components for a public library or bookstore location. The main unit at public library or bookstore is the file server 900. The file server 900 is a large electronic memory unit that can store thousands of books. Various electronic storage means may be used in the file servers, such as hard disks and read-write CD ROMs and read only CD ROMs.

The system comprises five components; a converter or video connector 904, a controller 908, a viewer 912, and a catalog printer 916. The software for controlling the system is primarily located in the controller. The converter or video connector 904 is similar to those described above. In this configuration the controller unit 908 monitors the data being transferred to the file server by the converter 904. The controller 908 is preferably provided with a viewing screens and several control buttons. When it is necessary to have a larger screen to perform more sophisticated controlling of the system a viewer may be connected to the controller 908 and the viewer screen and controls may be used.

The controller 908 is only able to download books to the viewer 912 which are authorized to receive books from the particular file server. For security reasons it is not desirable that the public viewer 912 have access to more than one file server. In this way, security can be maintained over the text data for books. It is preferred that the public viewer 912 be limited to receiving one or two books at a time from the controller 908. When the user of the public viewer 912 needs a new or additional book he returns the viewer 912 to the library where he receives a new book from the controller 908.

In order to track the books that are available on the file server, the titles of the available books may be printed on a catalog printer 916. The catalog printer 916 is connected to the library controller 908 and the titles of the books are downloaded to the catalog printer 916. None of the coded text for any of the books can be printed using the controller 908 and catalog printer 916 of this system. In order to maintain security over the data, none of the book data is allowed to be downloaded to the printer. Once a complete printout of available book titles, magazines, or other textual material is complete, a hard copy of the catalog 920 can be maintained at the file server.

The system shown may also be used at bookstores. The bookstores can rent the public viewer 912 to customers with the text for one or two books loaded onto the viewer 912. The viewer 912 may be provided with an automatic timeout sequence. The timeout sequence would erase the textual data for the books after a certain period of time, for example, two weeks. It is expected that after a period of time (perhaps within two weeks) the renter would return the public viewer 912 to the bookstore and receive additional books for viewing. Using this arrangement, it is also possible for the bookstore to (permanently) sell a viewer 912 to a regular customer. The customer then returns to the bookstore from time to time to receive textual data for a book which the customer can then store permanently on his own viewer 912. Various other configurations are possible for bookstores and libraries using the file server and viewer 912 described.

V. Use Of Set Top Converter

Existing set top converter boxes such as those made by Scientific Atlanta or General Instruments are presently unequipped to handle the book selection system of the present invention. Although set top converters may be built which include the library functions, hardware modifications are necessary in order to use the book selection system with existing set top converter technology.

Figure 16A:
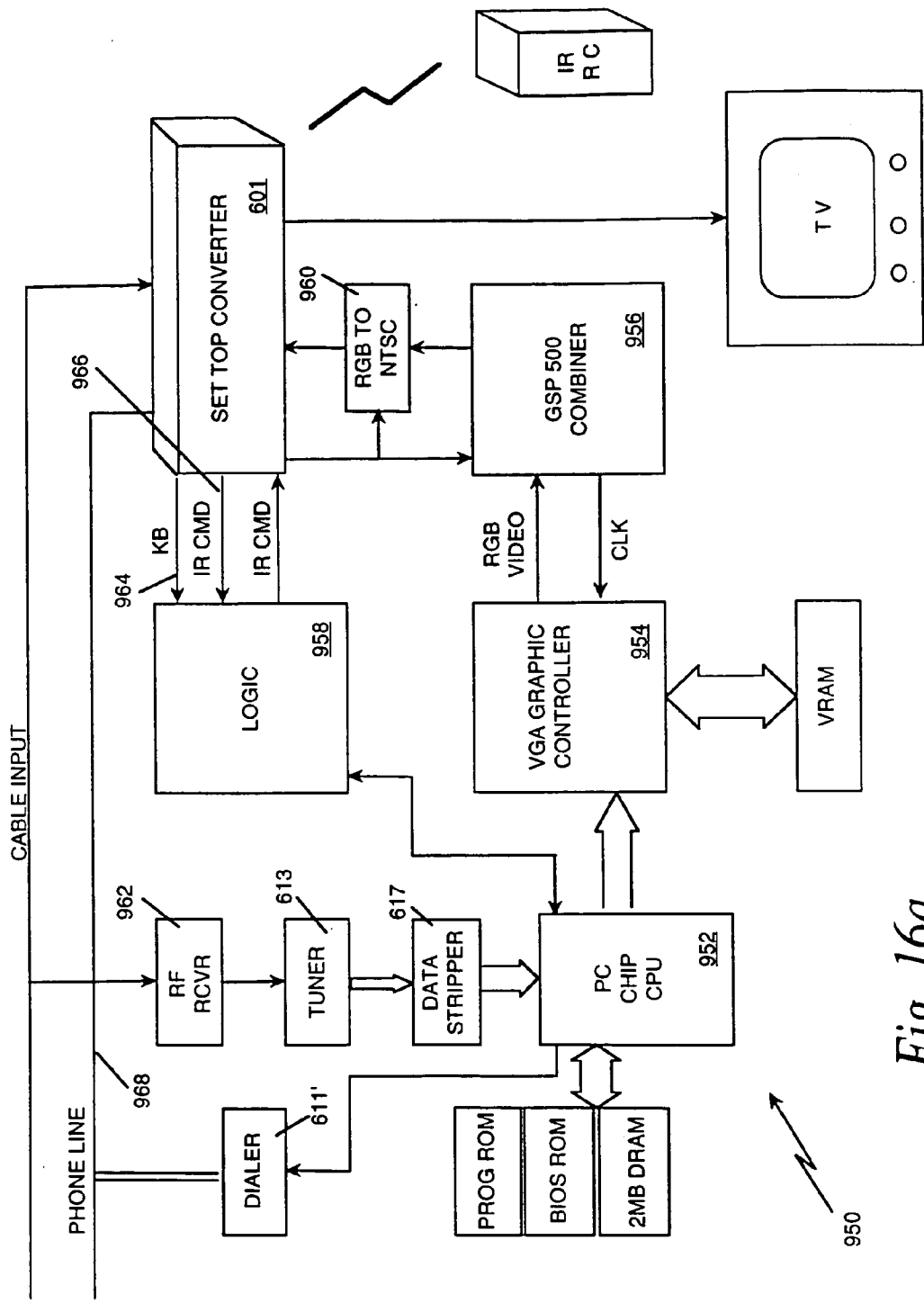
FIG. 16*a* and FIG. 16*b* are schematics of hardware modifications or upgrades to a set top converter.
Figure 16B:
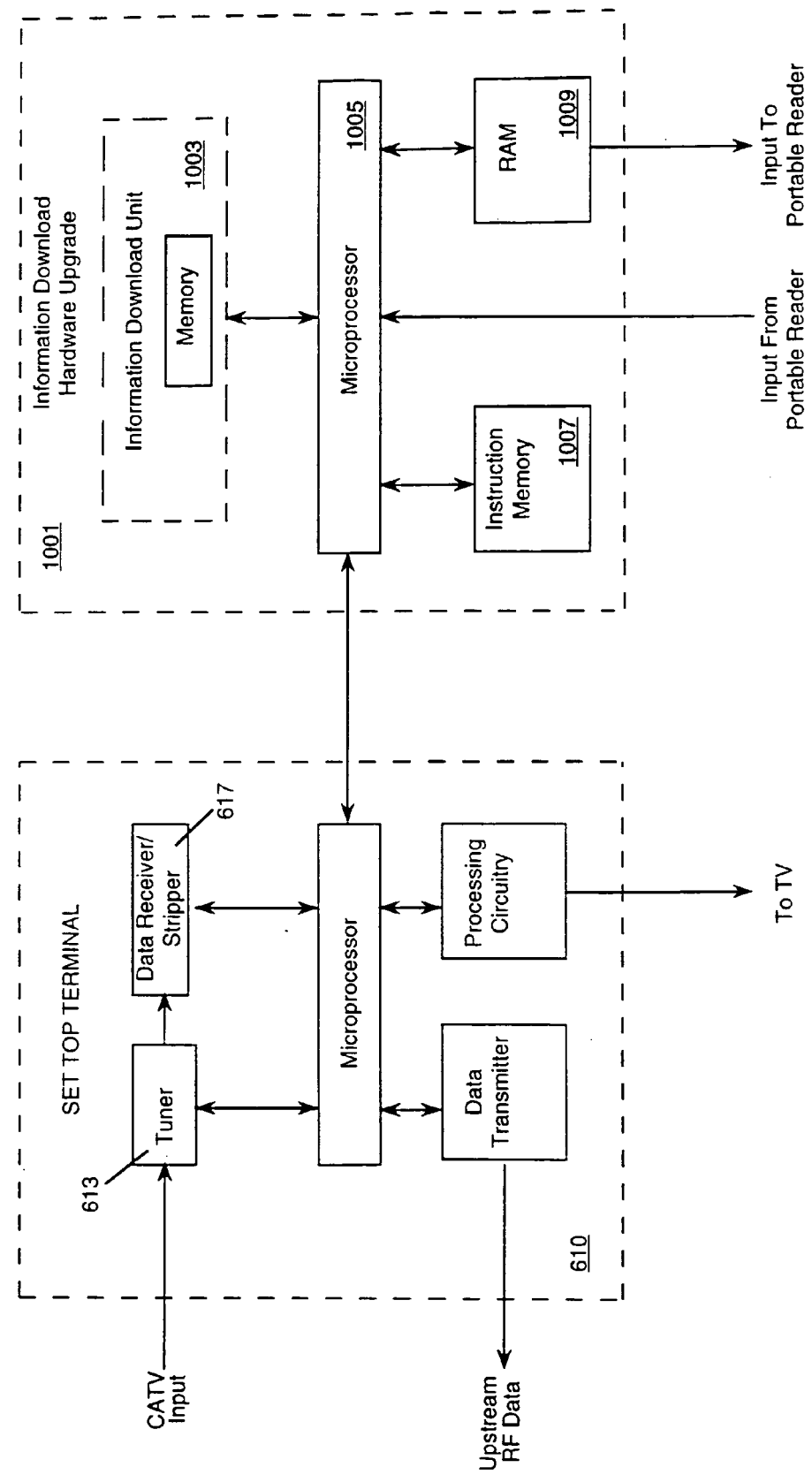

FIGS. 16a and 16b are examples of hardware modification. A port is used to attach hardware upgrades described below to a set top terminal. Two upgrades are possible to set top converters 601 to assist in receiving and selecting electronic books. A menu generation card upgrade (FIG. 16a) and an information download unit (FIG. 16b). Each of these upgrades may be connected to the set top terminal unit through an upgrade port. A four wire a cable, ribbon cable or the like may be used to connect the upgrade to the set top converter 601.

A card addition 950 to a set top converter 601 is depicted in FIG. 16a. The card 950 shown provides the additional functionality needed to utilize the book selection system with existing set top converter 601 technology. The card 950 may be configured to slip inside the frame of a set top terminal and become part of the set top terminal, an advanced set top terminal. The primary functions the card 950 adds to the set top converter 601 are the interpreting of data signals, generating of menus, sequencing of menus, and, ultimately, the ability of the viewer 912 to select a book using either the television or a viewer 912. The card 950 also provides a method for a remote location, such as the cable headend, to receive information on books ordered. The books ordered information and control commands may be passed from the cable headend to the card 950 using telephone lines.

The primary components of the card 950 are a PC chip CPU 952, a VGA graphic controller 954, a video combiner 956, logic circuitry 958, NTSC encoder 960, a receiver 962, demodulator (not shown), and a dialer 611'. The card 950 operates by receiving the data text signal from the cable headend through the coaxial cable. The logic circuitry 958 of the card 950 receives data 964, infrared commands 966, and synchronization signals (not shown) from the set top converter 601. Menu selections made by the viewer 912 on the remote control are received by the set top converter's 601 IR equipment and passed through to the card 950. The card 950 interprets the IR signal and determines the book (or menu) the subscriber has selected. The card 950 modifies the IR command to send the information to the set top converter 601. The modified IR command contains the channel information needed by the set top converter 601. Using the phone line 968 and dialer 611', the card 950 is able to transmit books ordered information to the cable headend. It is also possible to receive the books over the telephone lines and by-pass the video distribution system.

These commands are passed through the interface linking the set top terminal's microprocessor with the microprocessor of the hardware upgrades. In this way, subscriber inputs, entered through the set top terminal keypad or remote control, can be transferred to any of the hardware upgrades for processing and responses generated therein can then be sent back to the set top terminal for display. In the preferred embodiment the IR commands 966 are transferred from set top terminal 601 to hardware upgrade.

Hardware upgrades may include a microprocessor, interactive software, processing circuitry, bubble memory, and a long-term memory device. In addition to these basic components, the hardware upgrade may make use of an additional telephone modem or CD-ROM device.

The information download hardware upgrade 1001 (shown in FIG. 16b) allows the subscriber to download large volumes of information from the operations center or cable headend using the set top converter 601. The hardware upgrade 1001 will enable subscribers to download data, such as books and magazines, to local storage. Primarily, the hardware upgrade 1001 is an additional local storage unit 1003 (e.g., hard disk, floppy, optical disk or magnetic cartridge and may include a microprocessor 1005, instruction memory 1007, and a random access memory 1009, as shown in FIG. 16b). Preferably, a small portable viewer 912 is also provided with the upgrade 1001 to enable downloaded text to be read without the use of a TV.

The downloadable information may be text or graphics supplied by the operations center or cable headend. With this upgrade, books may be downloaded and read anywhere with the portable reader. Using this upgrade, books may be downloaded and stored in compressed form for later decompression. The books would be decompressed only at the time of viewing. Important text that the public desires immediate access may made available through this system. Text such as the President's speech, a new law, or a recent abortion decision rendered by the Supreme Court may be made immediately available.

In the preferred embodiment, book ordering information is stored at each set top terminal until it is polled by the cable headend using a polling request message format. An example of a polling request message format consists of six fields, namely: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message. A similar response frame format for information communicated by the set top terminal to the cable headend in response to the polling request may be used.

Figure 17:
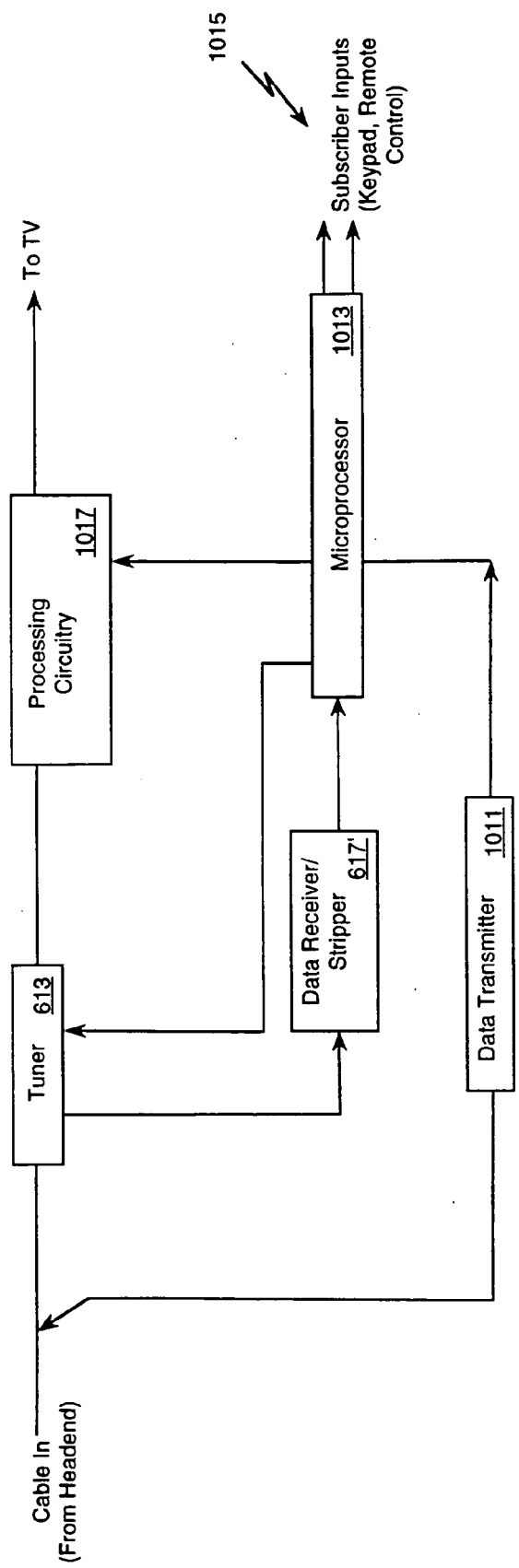
FIG. 17 is a schematic showing a set top terminal that includes a data receiver and data transmitter.

FIG. 17 shows a preferred set top terminal that includes a data receiver 617' and a data transmitter 1011. The data transmitter provides upstream data communications capability between the set top terminal 601 and the cable headend. Upstream data transmissions are accomplished using the polling system described and, using a data transmitter 1011. Both receiver 617' and transmitter 1011 may be built into the set top terminal 601 itself or added through an upgrade module. Regardless of the specific hardware configuration, the set top terminal's data transmission capabilities may be accomplished using the hardware shown in FIG. 17.

FIG. 17 shows RF signals, depicted as being received at by a data receiver 617' and tuner 613 working in unison. Both of these devices are interfaced with the microprocessor 1013, which receives inputs 1015, from the subscriber, either through a set top terminal's keypad, a remote control unit or viewer 912. All cable signals intended for reception on the subscriber's TV are accessed by the tuner 613 and subsequently processed by the processing circuitry 1017. This processing circuitry 1017 typically includes additional components (not shown) for descrambling, demodulation, volume control and remodulation on a Channel 3 or TV carrier.

Data targeted to individual set top terminals is received by the data receiver 617' according to each set top terminal's specific address or ID. In this way, each addressable set top terminal only receives its own data. The data receiver 617' may receive set top terminal 601 specific data in the information field of the signal frame described or on a separate data carrier located at a convenient frequency in the incoming spectrum.

Any received data includes information regarding books and menus available for selection. The subscriber may enter a series of commands 1015 using a keypad or remote control in order to choose a channel or program. Upon receipt of such commands, the set top terminal's microprocessor 1013 instructs the tuner to tune to the proper frequency of the channel carrying data and subsequently instructs the processing circuitry 1017 to begin descrambling of this data.

Upon selection of a book, the microprocessor 1013 stores any selection information in local memory (not shown) for later data transmission back to the cable headend. The set top terminal's microprocessor 1013 coordinates all CATV signal reception and also interacts with various upstream data transmission components. Typically, the data transmitter 1011 operates in the return frequency band between 5 and 30 MHZ. In an alternative embodiment, the frequency band of 10 to 15 MHZ may be used. Regardless, however, of the frequency band used, the data transmitter 1011 sends information to the cable headend in the information field of the response frame described. Those skilled in the art will recognize that a number of variations and combinations of the above-described set top terminal hardware components may be used to accomplish upstream data transmissions.

VI. Books-On-Demand System

Figure 18A:
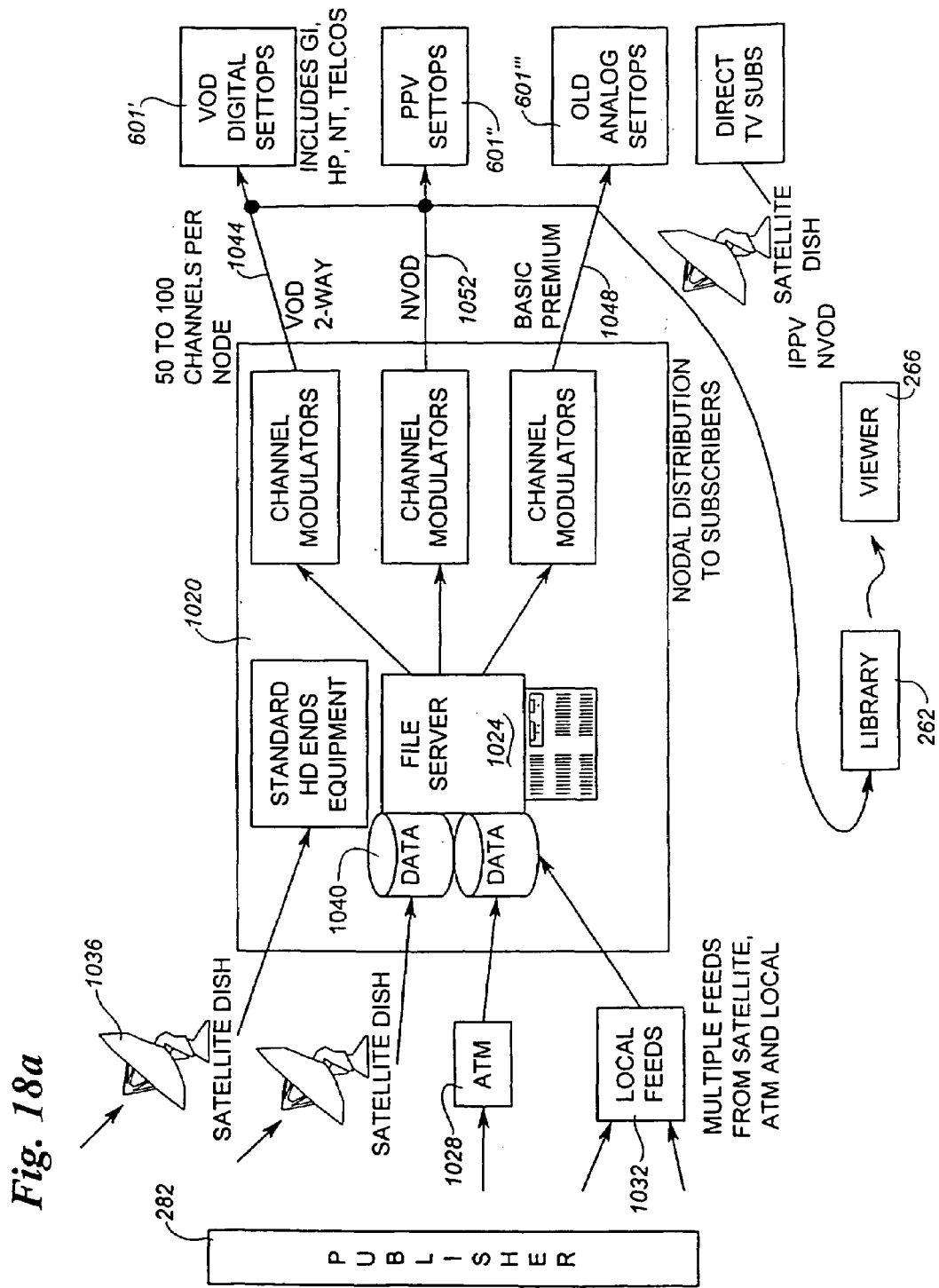
FIG. 18*a* is a schematic of a book-on-demand system.

The electronic book system described may also be configured in a book-on-demand style. FIG. 18*a* shows one example of a configuration for a book-on-demand system. A book on demand system requires more powerful two-way communications between the consumer's home, bookstore or library and either the operations center or a distribution site 1020 such as the cable headend. This type of two-way communication can be provided by the hardware shown in FIG. 17 and described above.

Referring to FIG. 18*a*, in a book-on-demand system, the subscriber selects the book to be download from an available menu of books. The available menu is usually sent to the subscriber location by the distribution site 1020. After his selection, information about his selection (or request) is then communicated to either a distribution point 1020 (such as a cable headend) or the operations center. Upon receipt of this request, the needed textual and graphical information for the book is spooled and sent to the subscriber. In this manner, books are only sent when requested by the subscriber and are sent immediately upon demand for the book.

In order to support such a demand system, the text delivery and distribution must be conducted on a strong nodal architectured distribution system, such as, a video-on-demand cable or telephone television system, or through use of individual telephone calls on the public telephone system.

The book-on-demand system allows for a greater selection of books to the subscriber and limits the amount of communicated book data that is unnecessary or unneeded. It also provides the book to the subscriber in a much timelier fashion.

In addition to a stronger distribution system, a book-on-demand system requires a distribution point 1020 to have more sophisticated equipment to spool out the textual information. This can be accomplished using file server technology 1024 for storing the books and ATM 1028 or telephone-type switching (not shown) to distribute the textual information. The file server 1024 and distribution technology that can be used in configuring such a book-on-demand system is described in U.S. Pat. No. 5,262,875 and U.S. Pat. No. 5,218,695, cited above.

FIG. 18*a* shows an embodiment for a book-on-demand system that utilizes file server technology. In addition to books, the embodiment of FIG. 18*a* will support distribution of nearly any digital data. Books or textual files are received from publishers 282 and other sources through local feeds 1032, ATM 1028, or by satellite dish 1036. The data is then stored in memory 1040 at the file server 1024. Preferably, distribution point 1020 is a cable headend that receives requests from subscribers and delivers text to subscribers over a two-way communication system (such as a video-on-demand system (VOD) 1044).

The library unit 262 can be connected to either a basic premium-type service cable system 1048, a near video-on-demand type cable system (or pay-per-view (PPV) 1052) or a video-on-demand cable system 1044. In connecting with either of these three systems the library 262 may access the cable directly or may access the system through a set top terminal 601', 601'', or 601'''.

Using the two-way video-on-demand system 1044, a subscriber is able to request a specific book title and receive that text immediately following its request. To accomplish this, the distribution point 1020 transmits a list of available books through the cable delivery system to the library 262. The library 262 displays the list of available books on a menu or similar format. As described earlier, it is preferred that the library 262 use menus which list categories of available books to form its request from the distribution point 1020. After selecting a book the library 262 then sends a request signal on the two-way communication system 1044 back to the distribution point 1020. This request signal can be handled in two ways. Either the library 262 initiates the request or the distribution point 1020 polls the various libraries on to the two-way system 1044. Upon receiving the request for the book title, the text associated with that book title is transmitted to the library 262 using the two-way cable system 1044.

Figure 18B:
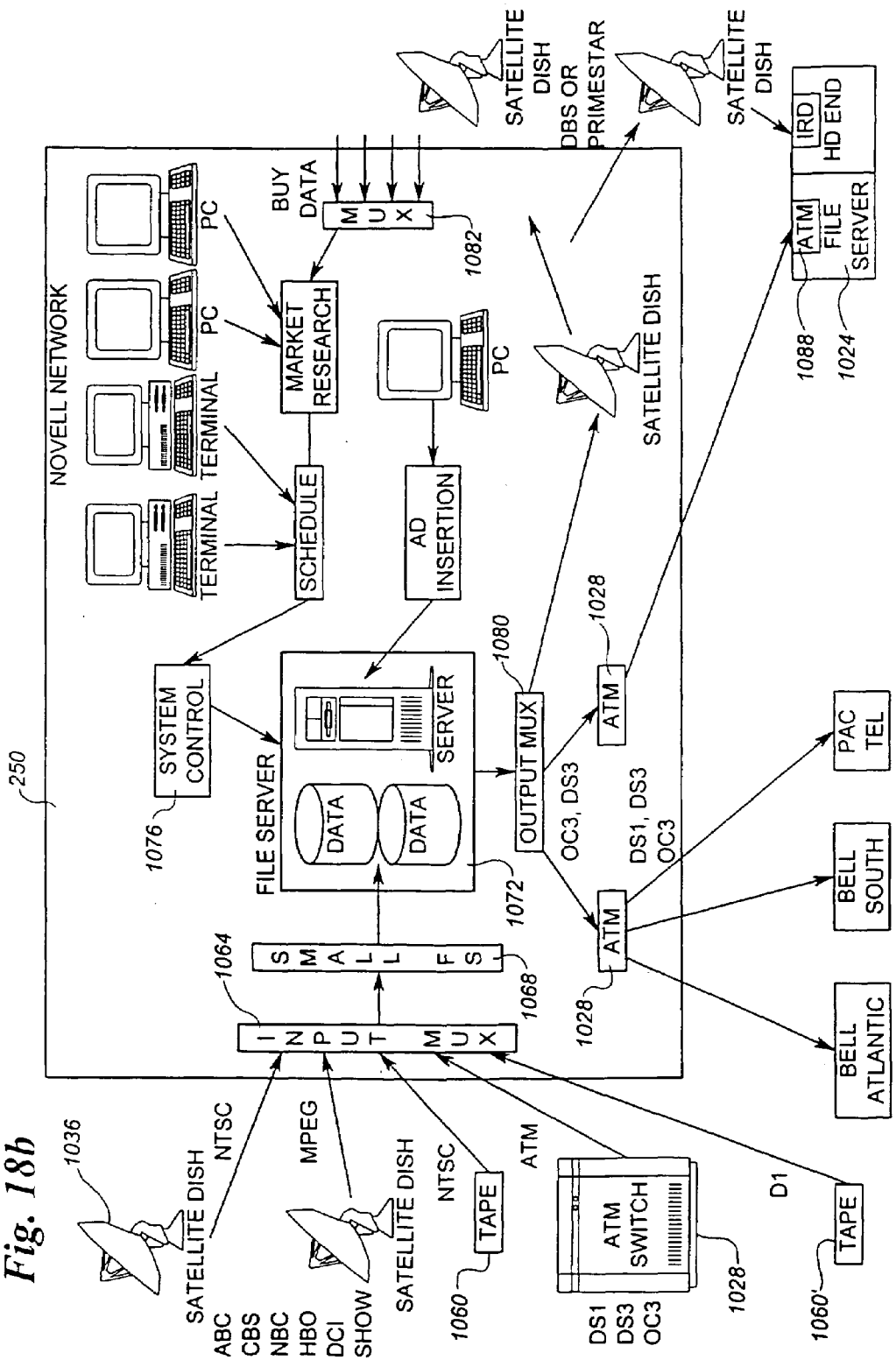
FIG. 18*b* is a schematic of an operations center supporting a book-on-demand system.

FIG. 18*b* is an expanded view of an operations center 250 that supports a regional or national book-on-demand system. In fact, the operations center 250 shown supports distribution of nearly any digital data. The operations center 250 supports multiple feeds to receive digital information by tape 1060, 1060', ATM 1028, or satellite 1036. The information is processed through an input MUX 1064 and a small file server 1068 before reaching the master file server 1072. Digital data such as books received from publishers 282 is then stored on the master file server 1072. It is preferred that the digital data is stored compressed in a standard format such as MPEG2.

A system controller 1076 provides control over the regional or national book-on-demand system. Books may be packaged into groups to provide feeds to various cable headends. In addition, scheduling and marketing research are conducted at the operations center 250. In order to handle the scheduling and market research, book buy data is received at the operations center 250 through a multiplexer 1082. Book buy information can be provided by the operation center 250 to the billing and collection subsystem.

The operations center 250 is also equipped to insert messages or advertisements into the file server. These messages or advertisements will eventually be received by the subscribers.

The master file server 1072 uses an output multiplexer 1080 and ATM 1028 as well as satellite connections to distribute digital data. In the preferred embodiment, cable headends receive text data on books from the master file server 1080 through the output multiplexer 1028 and an ATM system 1028. After receiving the digital book data, the cable headends store the books in a local file server 1024. FIG. 18*a*'s distribution point 1020 is an example of a cable headend which may receive data from the operations center 250 of FIG. 18*b* through an ATM hookup 1088 or satellite hookup.

What is claimed is:

1. A system for viewing electronic books retrieved from a file server comprising:
    means for selecting an electronic book from the file server, wherein the file server receives electronic book files from a video connector that receives a signal from a distribution system, converts the signal into electronic book files, and stores the electronic book files to the file server;
    a memory that stores the selected electronic book;
    a viewer that displays the selected electronic book, wherein the memory receives the selected electronic book from the file server, and wherein the viewer is adapted for connection to the selecting means that delivers the electronic book to the viewer; and
    a storage feature providing an option to a system operator for the selected electronic book to be stored in the memory:
        until the electronic book is read once, wherein the electronic book is automatically erased after being read once;
        until a predetermined period of time has passed, wherein the electronic book is automatically erased after the predetermined period of time has passed; and
        permanently, wherein the electronic book is not automatically erased.

2. The system of claim 1, wherein the selecting means is a controller that controls access to the file server.

3. The system of claim 2, wherein the controller retrieves a selected electronic book from the file server and sends the selected electronic book to the viewer.

4. The system of claim 2, wherein the controller monitors data being transferred to the file server by a converter.

5. The system of claim 2, wherein the controller prevents the viewer from accessing more than one file server at the same time.

6. The system of claim 1, wherein the viewer uses an automated timeout sequence that erases textual data for the selected electronic books after a period of time.

7. A method for distributing electronic books from a vendor to a purchaser comprising:
    receiving a selection corresponding to an electronic book from a file server, wherein the file server receives electronic book files from a video connector that receives a signal from a distribution system, converts the signal into electronic book files, and stores the electronic book files to the file server;
    providing an option to a system operator for the selected electronic book to be stored in a memory of a viewer:
        until the electronic book is read once, wherein the electronic book is automatically erased after being read once;
        until a predetermined period of time has passed, wherein the electronic book is automatically erased after the predetermined period of time has passed; and
        permanently, wherein the electronic book is not automatically erased;
    downloading the selected book to the viewer; and
    storing the selected book in the memory of the viewer.

8. The method of claim 7, further comprising providing a menu catalog that displays titles of the books on the file server.

9. The method of claim 7, wherein the step of selecting comprises using a controller to access the file server.

10. The method of claim 7, further comprising connecting the viewer to a controller to access the file server.

11. The method of claim 7, further comprising determining whether the viewer is connected to another file server, and if the viewer is connected to another file server, preventing the viewer from accessing the file server.

12. The method of claim 7, further comprising limiting the controller to downloading books to the viewer if the viewer is authorized to receive books from the file server.

* * * * *